United States Patent [19]
Rosen

[11] Patent Number: 5,774,553
[45] Date of Patent: Jun. 30, 1998

[54] FOREIGN EXCHANGE TRANSACTION SYSTEM

[75] Inventor: Sholom S. Rosen, New York, N.Y.

[73] Assignee: Citibank N.A., New York, N.Y.

[21] Appl. No.: 754,694

[22] Filed: Nov. 21, 1996

Related U.S. Application Data

[60] Provisional application No. 60/007,420 Nov. 21, 1995.

[51] Int. Cl.$^6$ .............................. H04L 9/00; H04L 9/30; H04L 9/32; G07F 19/00

[52] U.S. Cl. .................................. 380/49; 380/9; 380/23; 380/24; 380/25; 380/30; 235/379; 235/380; 395/235; 395/237; 395/239; 395/241; 395/242; 395/244

[58] Field of Search .................................. 380/9, 23, 24, 380/25, 49, 50, 59, 29, 30; 235/379, 380; 395/201, 230, 235, 239, 241, 242, 243, 244, 237; 901/1, 2, 4, 5, 24, 25, 26, 37, 39, 41

[56] References Cited

U.S. PATENT DOCUMENTS

| | | | |
|---|---|---|---|
| 5,258,908 | 11/1993 | Hartheimer et al. | 395/237 |
| 5,453,601 | 9/1995 | Rosen | 235/379 |
| 5,455,407 | 10/1995 | Rosen | 235/380 |
| 5,508,913 | 4/1996 | Yamamoto et al. | 395/237 |

FOREIGN PATENT DOCUMENTS

| | | |
|---|---|---|
| 0 421 808 A2 | 4/1991 | European Pat. Off. . |
| 0 542 298 A2 | 5/1993 | European Pat. Off. . |
| WO 95/30211 | 11/1995 | WIPO . |

*Primary Examiner*—Bernarr E. Gregory
*Attorney, Agent, or Firm*—Morgan & Finnegan LLP

[57] ABSTRACT

A realtime multilateral foreign exchange settlement system having a computer implemented netting system, a processor-based multilateral settlement coordinator (MSC) having a first money module and a first host application, where the first host application receives debit and credit data from said netting system. A plurality of processor-based multilateral settlement agents (MSAs) each having a second money module and a second host application. A plurality of processor-based counterparty settlement agents (CSAs) each having a third money module and a third host application. The second and third money modules communicate via cryptographically secure sessions. The first money module receives electronic money from the third money modules of net debit CSAs via the second money modules. When all net debit counterparties have paid, the first money module sends the electronic money to the third money modules of net credit CSAs via the second money modules.

23 Claims, 68 Drawing Sheets

FOREIGN EXCHANGE TRANSACTION SYSTEM

Priority is claimed to provisional application 60/007,420 filed Nov. 21, 1995.

FIELD OF THE INVENTION

The present invention relates to a foreign exchange transaction system for implementing the realtime exchange of electronic money in multiple monetary units.

BACKGROUND OF THE INVENTION

In commonly assigned, U.S. Pat. No. 5,453,601, U.S. Pat. No. 5,557,518 and U.S. patent application Ser. No. 08/427,287, filed Apr. 21, 1995 (corresponding to PCT International Publication WO 96/33476 published Oct. 24, 1996), which are hereby incorporated by reference, an electronic monetary system (EMS) is described that utilizes electronic money that is interchangeable with traditional cash and is universally accepted. The described EMS provides a method and system for securely and reliably transferring economic value including currency and credit among subscribers, among financial institutions, and between subscribers and financial institutions. The EMS also provides for electronic money in the form of multiple currencies.

Foreign exchange trading has grown from $1 billion per day in 1974 to almost $1 trillion per day in 1994. Hundreds of billions of dollars per day pass through the international payment systems to settle these transactions. The risk of failure by any of the participants has the central banks of the major economies concerned. These concerns and potential solutions were set out in the report by the Bank for International Settlements "Central Bank Payment and Settlement Services with Respect to Cross-Border and Multicurrency Transactions." This report spawned two responses from the private sector: "Reducing Foreign Exchange Settlement Risk" by the New York Foreign Exchange Committee and "Risk Reduction and Enhanced Efficiency in Large-Value Payment System: A Private Sector Response" by the New York Clearing House Association.

The problem was first demonstrated in 1974 when the Herstatt Bank in Germany was declared insolvent at the end of the banking day. Foreign exchange trading is by convention settled two business days following the trading day. This is termed the value day. In order to settle a dollar Deutsche Mark trade, for example, funds have to be transferred between the counterparties dollar accounts and their Deutsche Mark accounts. These transfers are made final at the appropriate central banks, i.e., the Federal Reserve and the Bundesbank. Since Germany is seven hours ahead of the time in New York, the Bundesbank closes before the Federal Reserve. Thus the transfer of marks could be final before the dollars transferred. If the counterparty to the Herstatt Bank had paid his marks and had not received his dollars by the end of the banking day in Germany, then the marks could be lost. This risk is called foreign exchange settlement risk or Herstatt risk.

All of the foregoing reports suggest solutions incorporating extended banking hours, coordinating central bank accounting systems, and setting up multicurrency clearing banks. Each of the proposed solutions reduces the risk but does not eliminate it. We propose a system to eliminate the risk which incorporates EMS with an augmented transaction called Settle Foreign Exchange which eliminates the risk by coordinating the multicurrency payments outside the central bank systems.

SUMMARY OF THE INVENTION

Accordingly, it is an object of the invention to provide a system that will allow realtime exchange of electronic money in multiple monetary units, between remotely located counterparties communicating over a network.

It is another object of the invention to provide a realtime gross or bilateral foreign exchange settlement system using counterparty settlement agents.

It is another object of the invention to provide a realtime multilateral foreign exchange system using a multilateral settlement coordinator, multilateral settlement agents and counterparty settlement agents.

According to one aspect of the invention, a cryptographically secure session is established between a first money module and a second money module. A first subscriber sends first exchange data, including a plurality of amounts by different monetary units, to the first money module which sends it to the second money module, via the cryptographically secure session. The second money module prompts a second subscriber for verification of the first exchange data and the second subscriber sends second exchange data, including a plurality of amounts by different monetary units, to the second money module. The second money module sends the second exchange data to the first money module, via the cryptographically secure session, and the first money module prompts the first subscriber for verification of the second exchange data. In a first transfer, the first money module transfers first electronic representations of money to the second money module via the cryptographically secure session, wherein each of the first electronic representations of money have a monetary unit identifier, and wherein the first electronic representations of money are in the amounts and in the monetary units specified by the first exchange data. In a second transfer, the second money module transferring second electronic representations of money to the first money module via the cryptographically secure session, wherein each of the second electronic representations of money have a monetary unit identifier, and wherein the second electronic representations of money are in the amounts and in the monetary units specified by the second exchange data. The first and second money modules each unconditionally updating a transaction log to separately finalize the first transfer and the second transfer.

According to a second aspect of the invention, a gross or bilateral netting process sends the first and second exchange data to the first and second subscribers which are first and second realtime host applications.

According to a third aspect of the invention, a multilateral settlement coordinator (MSC) receives net counterparty debit and credit data from a netting system, and sends the net counterparty debit data to multilateral settlement agents (MSAs). The MSAs send the net counterparty debit data to net debit counterparty settlement agents (CSAs). The net debit CSAs transfer electronic money to the MSAs, via first cryptographically secure sessions established between the second and third money modules, in accordance with the net counterparty debit data. The second money modules of the MSAs transfer the electronic money to the first money module of the MSC. When all net debit CSAs have paid, the MSC transfers the electronic money to the second money modules of the MSAs, for the net credit counterparties. The MSAs transfer the electronic money to the net credit counterparty CSAs via second cryptographically secure sessions established between the second and third money modules, in accordance with the net counterparty credit data.

DESCRIPTION OF THE DRAWINGS

Additional aspects, features, and advantages of the invention will be understood and will become more readily apparent when the invention is considered in the light of the following description made in conjunction with the accompanying drawings, wherein.

DETAILED DESCRIPTION OF THE INVENTION

In accordance with the present invention, a foreign exchange transaction system is presented which expands the foreign exchange capabilities disclosed in commonly assigned U.S. patent application Ser. No. 08/427,287, filed Apr. 21, 1995, which is herein incorporated by reference. The U.S. Ser. No. 08/427,287 application itself describes enhancements to the EMS originally described in U.S. Pat. No. 5,453,601. The following is a list of these enhancements.

1) Securing the network sign-on so that no one can spoof the money module or intercept any of its information in the clear, as described below with reference to FIG. 5.

2) Creating a method for assigning security server, money generator and teller identifiers (see Module Numbering Scheme). These identifiers are checked in:
   a) Establishing a session (see FIG. 7);
   b) Transferring notes—check transfer records (see FIG. 8).

3) Implementing a two-tier security server structure (see Security Hierarchy and Security Network), including a primary security server, wherein all modules carry the public keys of the primary security server, and a security server which certifies all other modules.

Figure 8A:
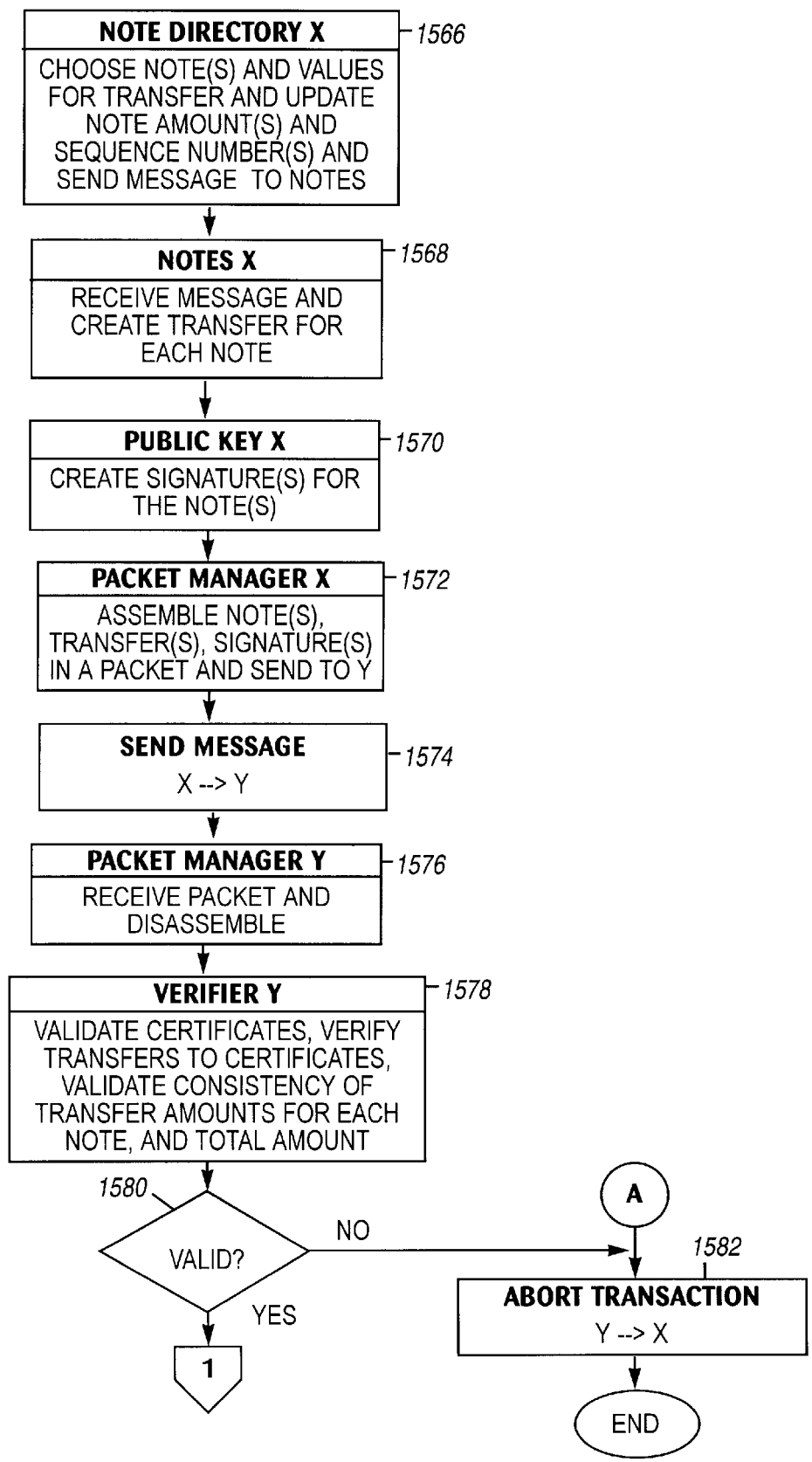
FIGS. 8A–8B illustrate a Transfer Notes protocol.
Figure 8B:
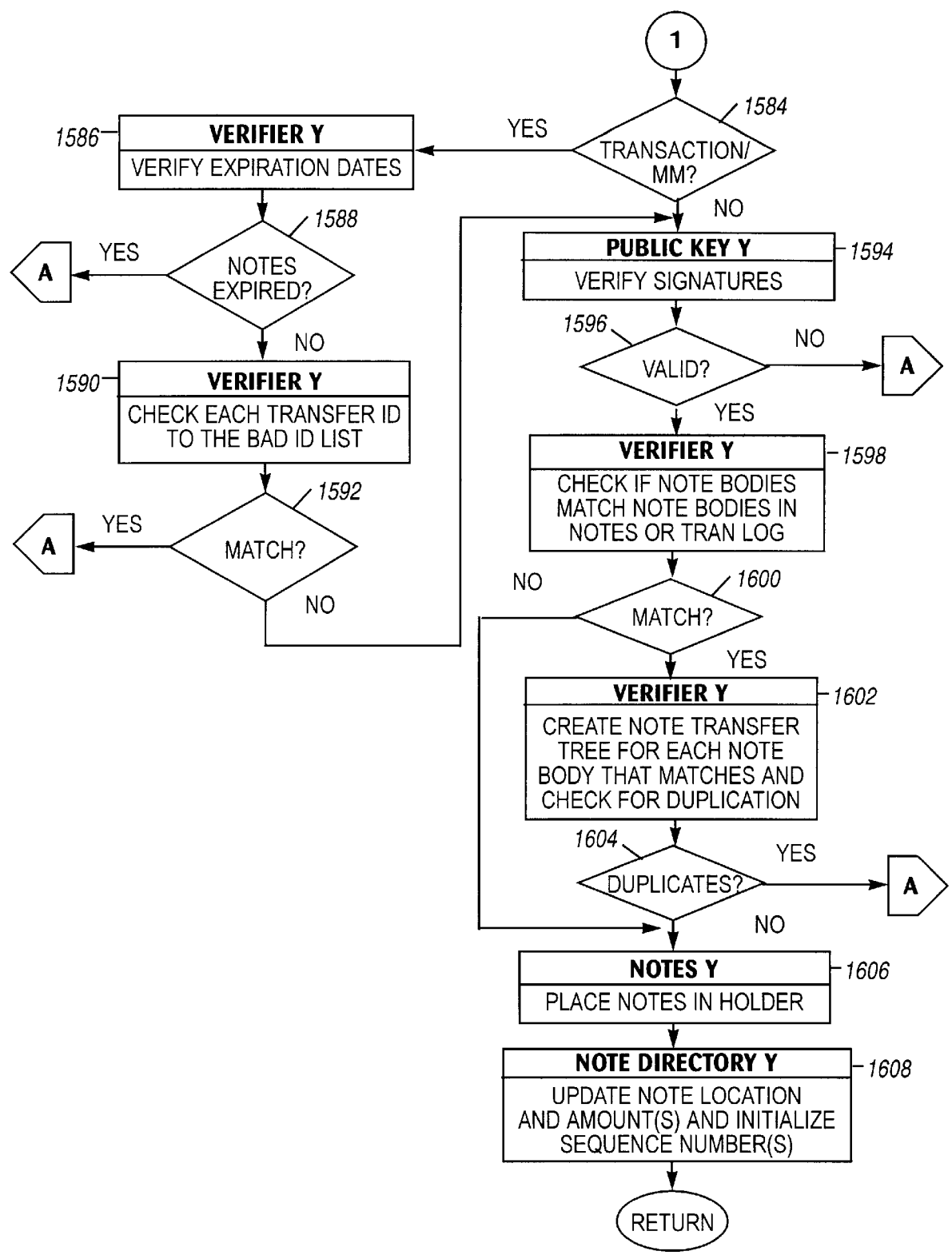
Figure 9A:
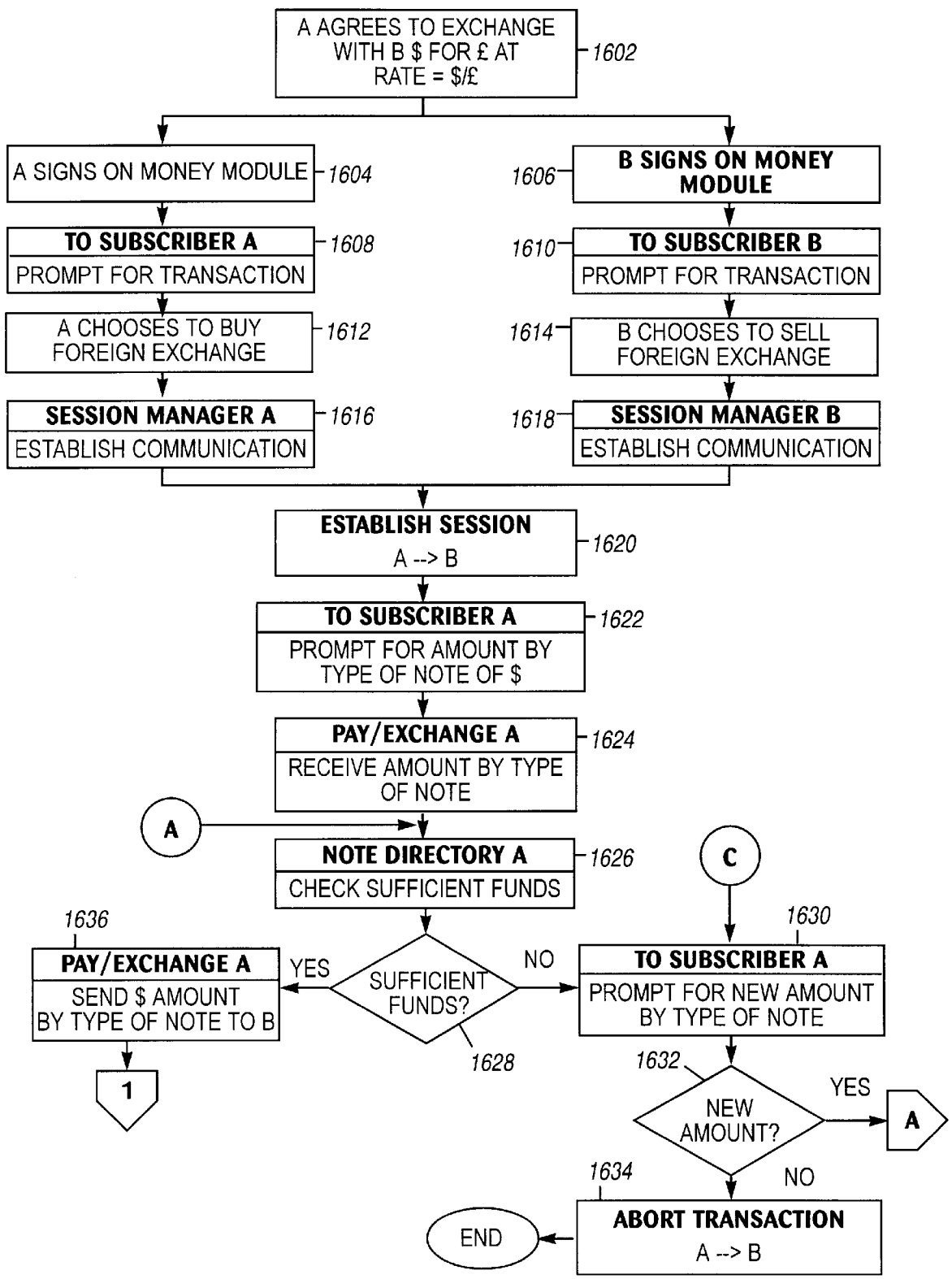
FIGS. 9A–9D illustrate a Foreign Exchange protocol.
Figure 9B:
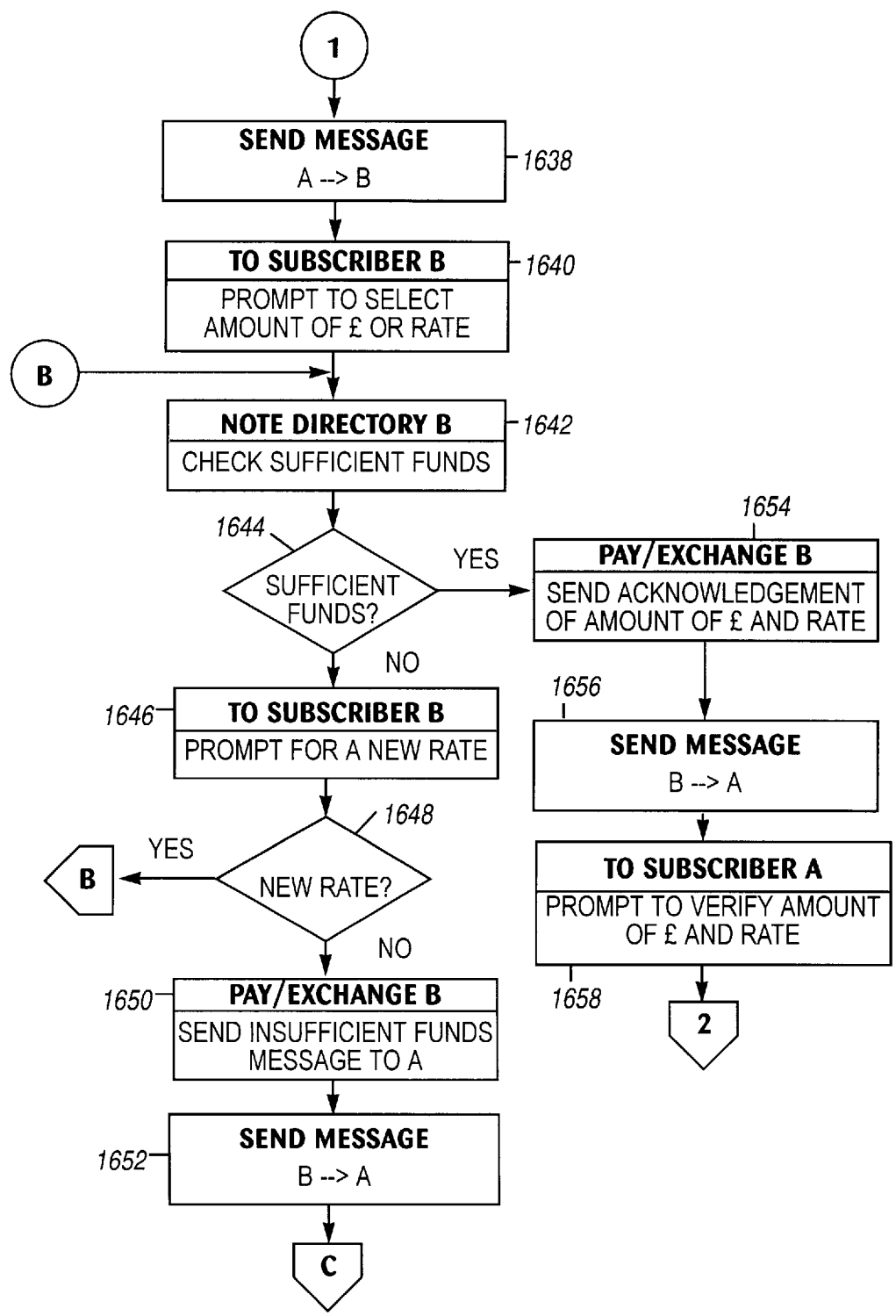
Figure 9C:
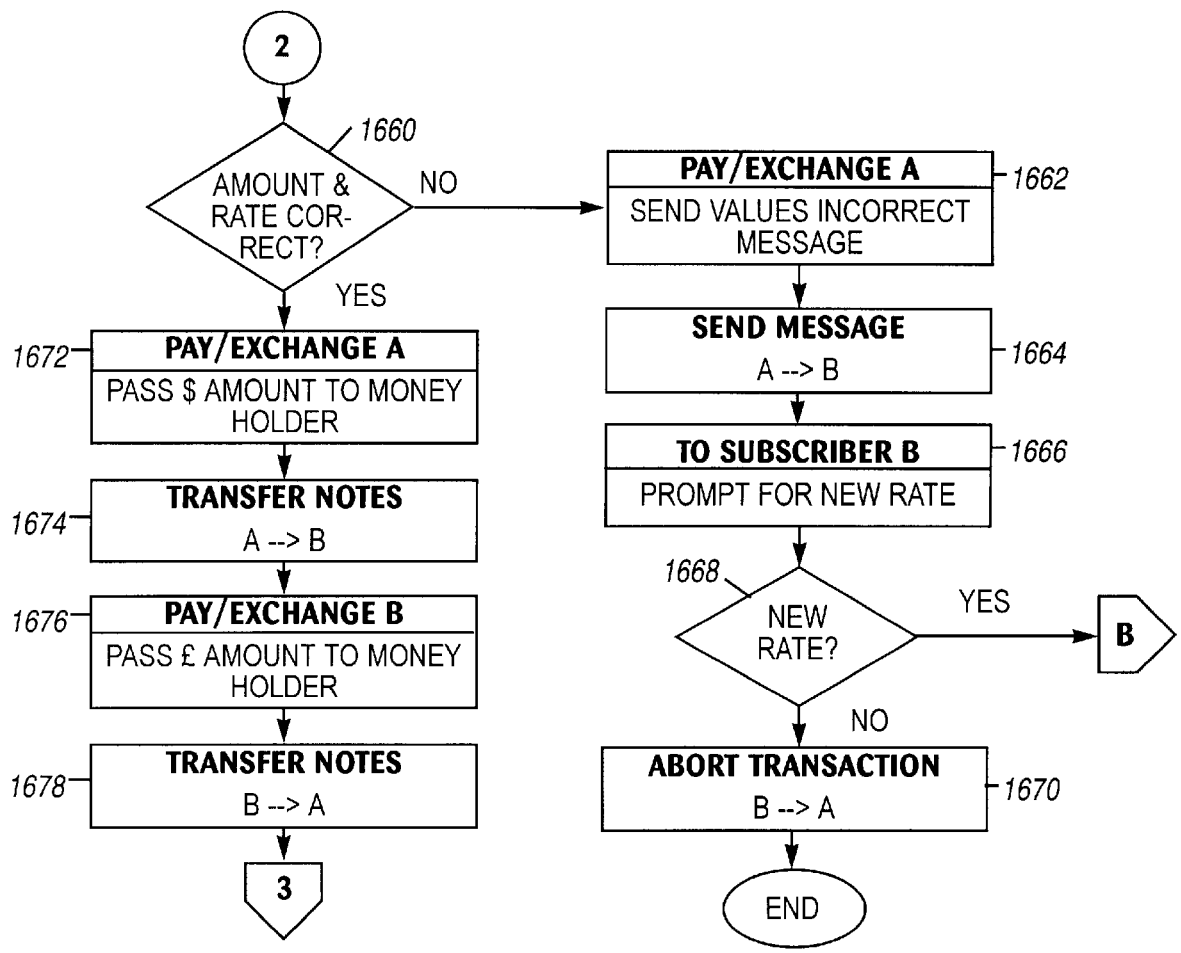
Figure 9D:
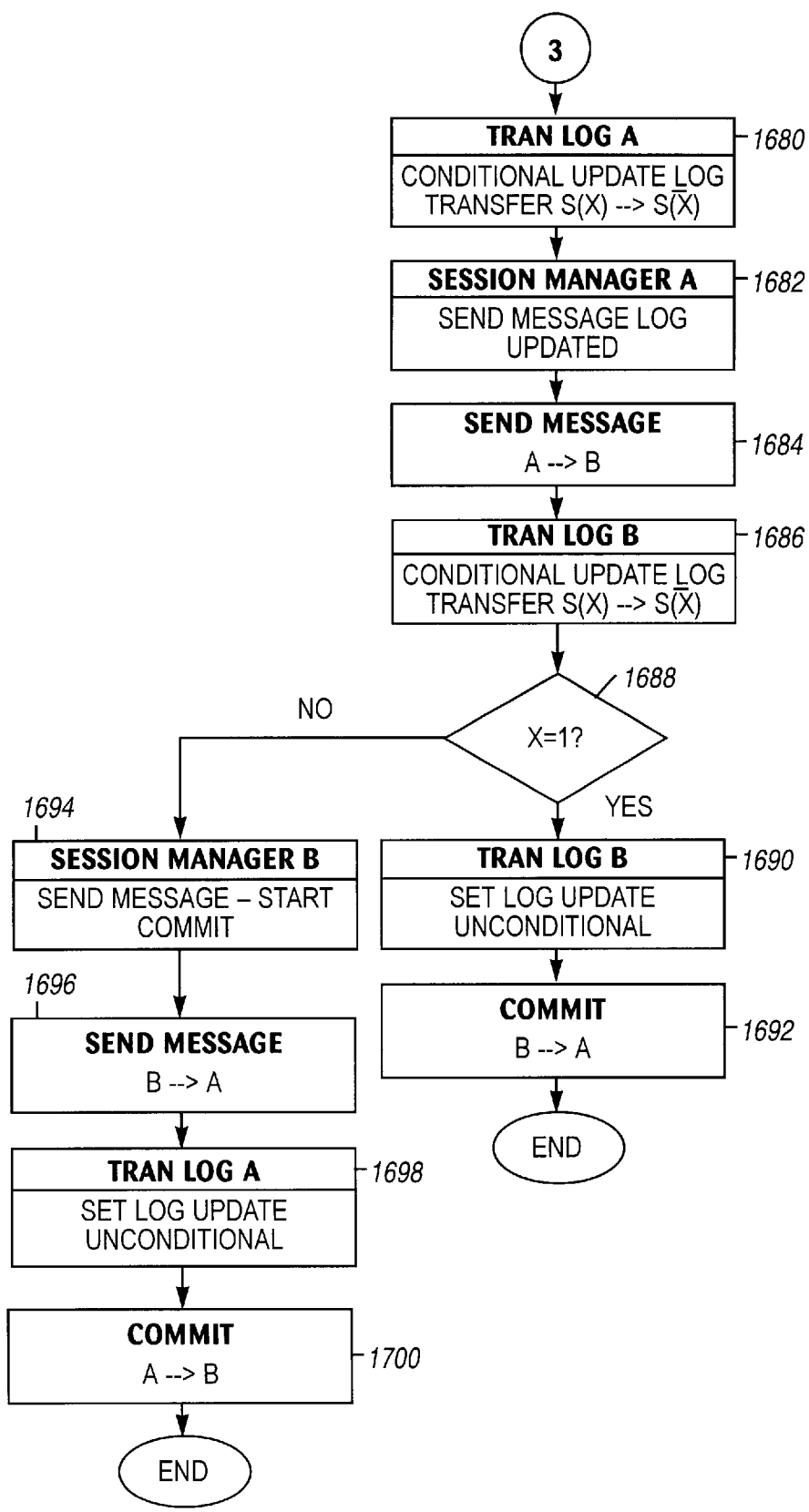

4) Improving Transfer Notes to check bad ID list against all transfers before accepting notes in payment or Foreign Exchange (F/X), and to check for duplicated notes (see FIG. 8).

5) Encrypting all certificates using private keys of a security server (see Certificate Structure and Validation).

6) Varying the size of the public keys dynamically (see Security Network and FIG. 6).

Figure 10:
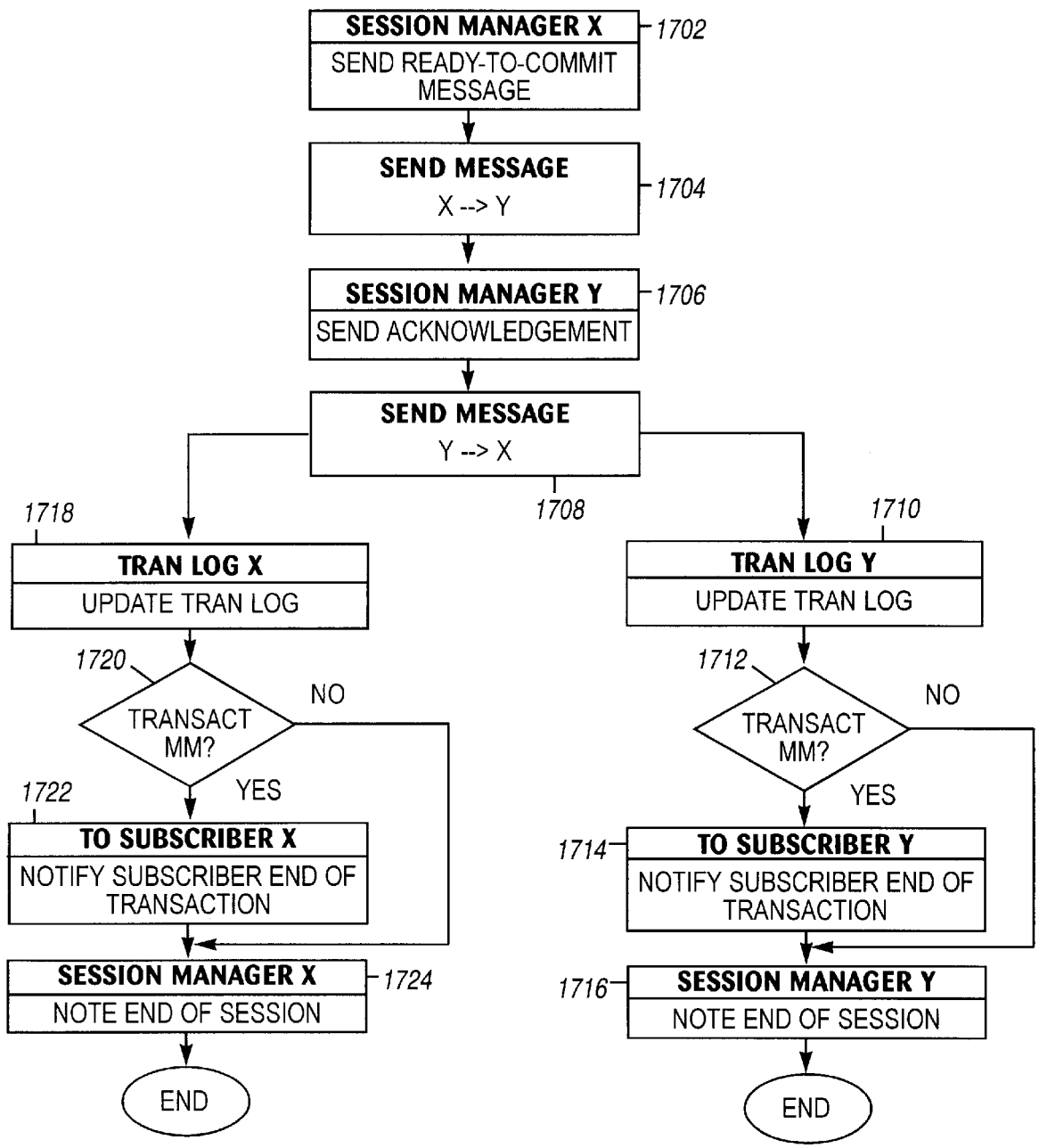
FIG. 10 illustrates a Commit protocol for modules in the EMS.

7) Changing the commit protocol so that failure does not duplicate money (see FIG. 10).

8) Changing F/X so that neither party can interrupt the commit, in order to cheat with certainty, by receiving money and not sending any money (see FIG. 9).

Figure 11A:
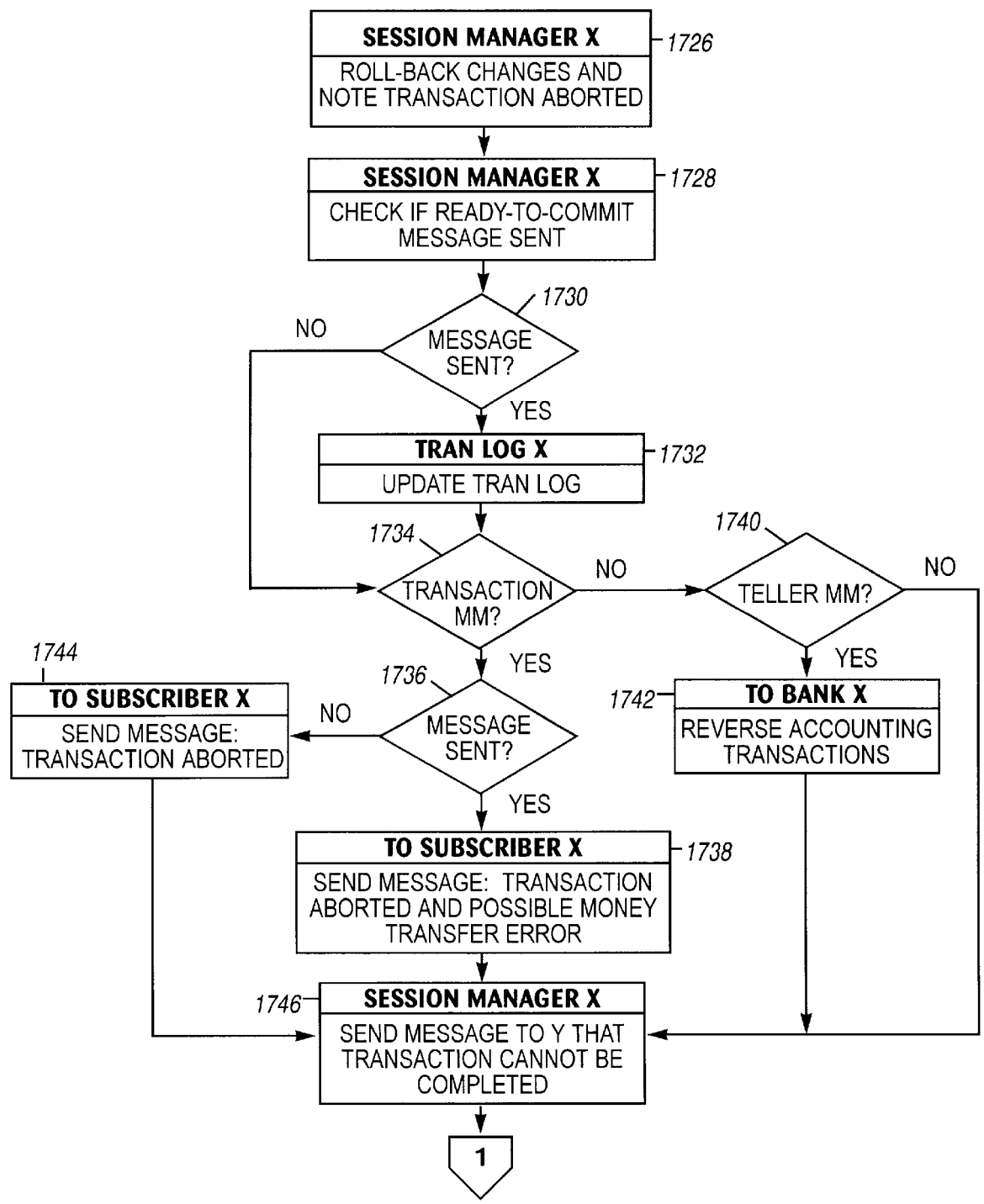
FIGS. 11A–11B illustrate an Abort Transaction protocol for modules in the EMS.
Figure 11B:
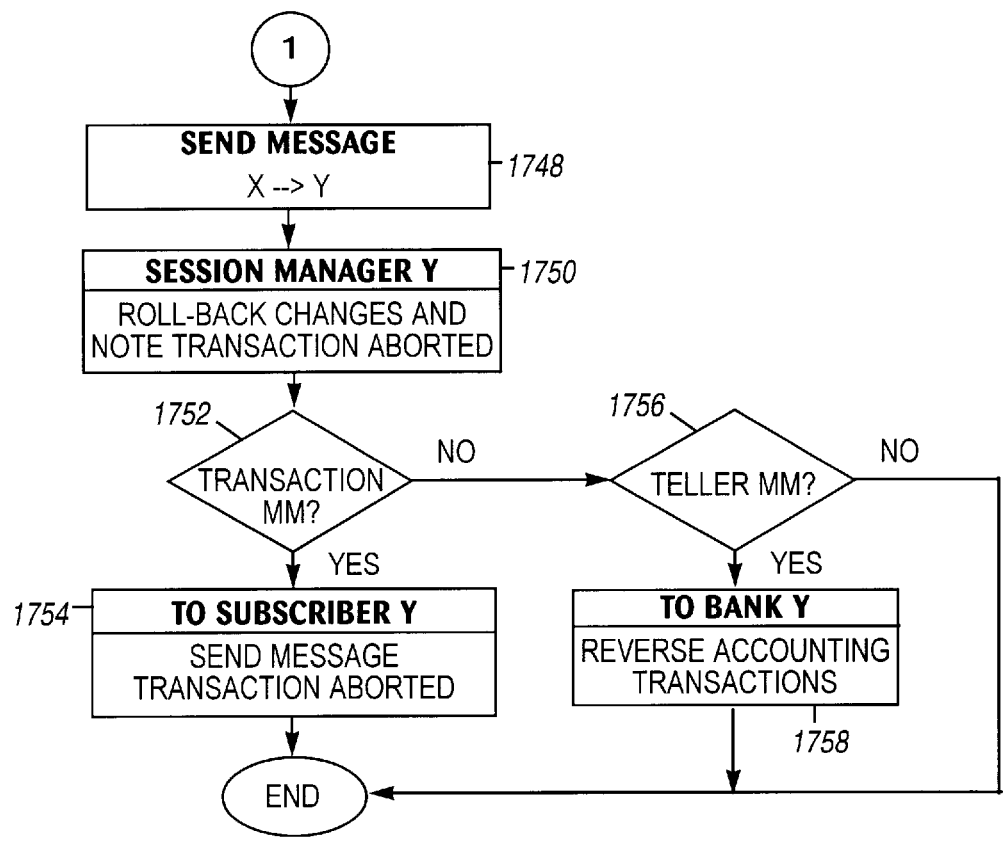

9) Changing Abort to log information on a failed commit if payer commits but receiver aborts (see FIG. 11).

10) Allowing global recertification if needed (see Security Network and FIG. 6).

The following is a detailed description of the above-listed enhancements.

Security Hierarchy

Figure 1A:
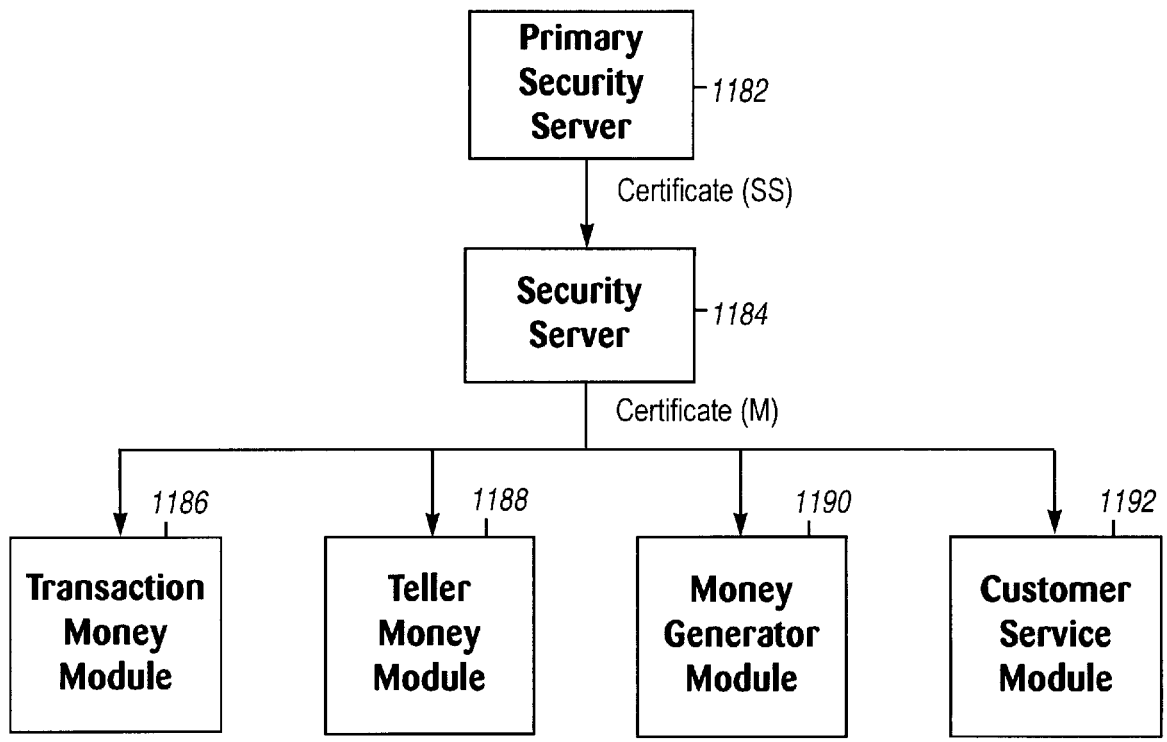
FIG. 1A is a diagram showing the EMS Security Hierarchy.

A preferred embodiment for EMS system security may be provided as follows. Referring to FIG. 1A, EMS will have two types of security servers, primary 1182 and ordinary 1184. The primary security servers 1182 certify the (ordinary) security servers 1184. The security servers 1184 certify all other modules (transaction MMs 1186, Teller MMs 1188, money generator modules 1190, and customer service modules 1192) in the system.

Figure 2:
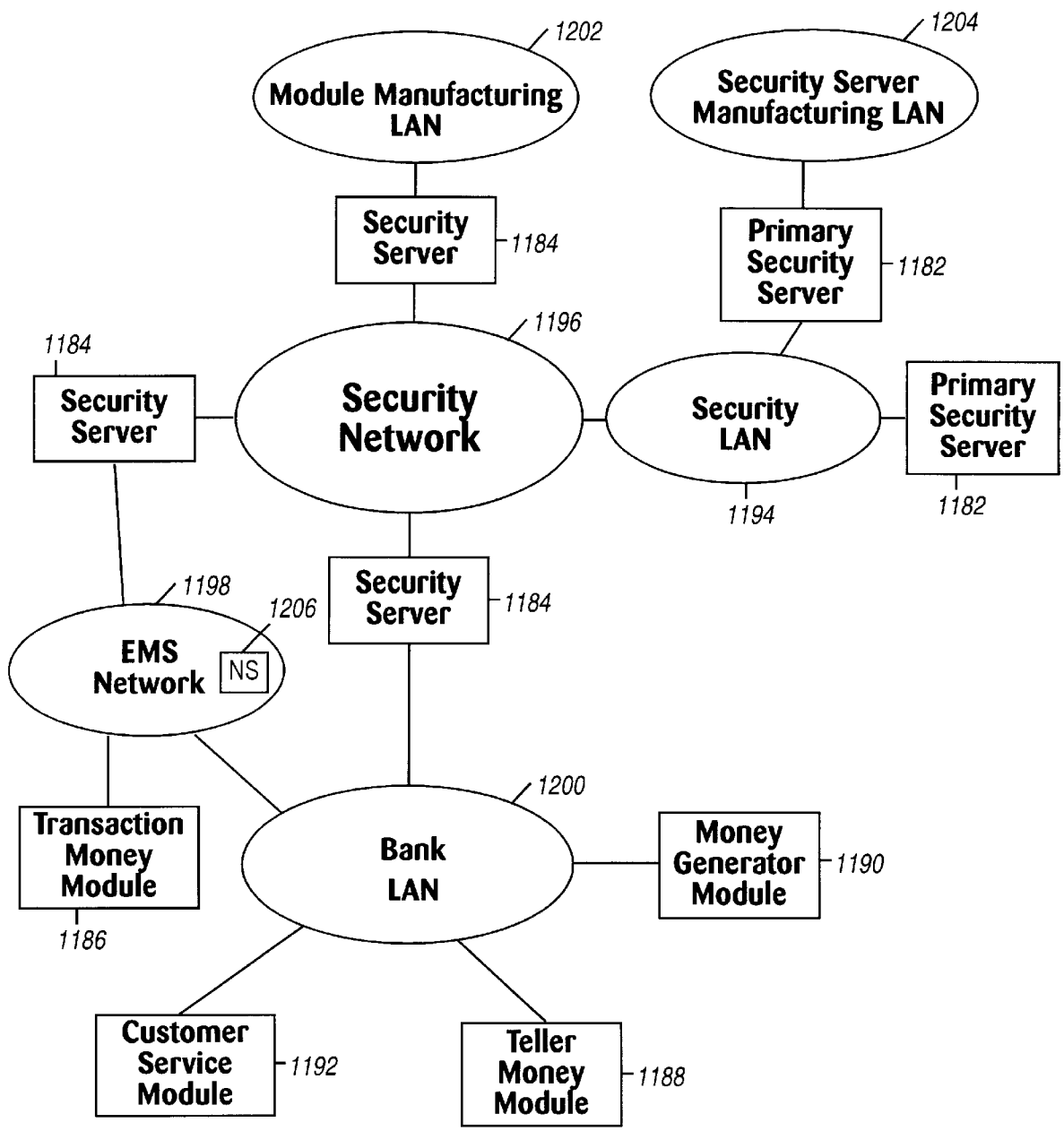
FIG. 2 is a diagram showing the security network structure for the EMS.

The primary servers 1182 only interact with other primary servers 1182 or the security servers 1184. Referring to FIG. 2, the primary security servers 1182 are housed in a secure facility connected to each other by a Security LAN 1194. The LAN 1194 is connected through a secure gateway to the Security Network 1196. Only the security servers communicate over this network. All security servers are physically protected devices.

Security servers 1184 are also attached to the EMS Network 1198 and bank local networks 1200. Security servers are treated as if they could be compromised and are validated upon all interactions with other modules.

Only the security servers 1184 and modules have certificates. The primary security server's public keys are carried by these devices. There are two types of certificate: security server and module.

Certificate Structure And Validation

The structure of a certificate is as follows:

Cert(SS) =

$$\underbrace{E_{PSS}[SS(id)\|SS(PK)\|\text{expire date}\|\sigma_{PSS}(X)]\|[PSS(id) \text{ XOR } C]}_{X}$$

$$\text{Cert}(M) = \underbrace{E_{SS}[M(id)\|M(PK)\|\text{expire date}\|\sigma_{SS}(Y)]\|\text{Cert(SS)}}_{Y}$$

The certificate validation protocols are:
1) Validate Cert(SS)
   a) PSS(id)=[PSS(id) XOR C]XOR C
   b) $D_{PSS}(E_{PSS}(X\|\sigma_{PSS}(X)))=X\|\sigma_{PSS}(X)$
   c) Check if SS(id) is authentic (see module numbering scheme)
   d) Check if date is valid
   e) Check if $D_{PSS}(\sigma_{PSS}(X))=h(X)$
2) Validate Cert(M)
   a) Validate Cert(SS)
   b) $D_{SS}E_{SS}(Y\|\sigma_{SS}(Y)))=Y\|\sigma_{SS}(Y)$
   c) Check if M(id) is authentic (see module numbering scheme)
   d) Check if date is valid
   e) Check if $D_{SS}(\sigma_{SS}(Y))=h(Y)$

---

| | |
|---|---|
| Where PSS = Primary Security Server | PK = Public Key (includes length of key) |
| SS = Security Server | |
| M = Module | σ = Digital Signature = E ° h |
| ‖ = Concatenate | Cert = Certificate |
| id = identification number | E = Algorithm with private key used for encrypting and for creating digital signature |
| h = Hash function | |
| C = Constant random number shared by all modules | |
| | D = Algorithm with public key used for decryption and for checking digital signature |

Note E and D may also be used for decrypting and encrypting, respectively, when applied in other applications.

---

Module Numbering Scheme

The primary security servers 1182, security servers 1184, teller money modules 1188, money generator modules 1190, customer service modules 1192, and transaction money modules 1186 are assigned identification numbers (id's) so that the numbers can be checked for authenticity. A 48-bit prime number "p" is generated and a primitive root "a" module p (where $a^n \neq 1(p)$ for all $1 \leq n < p-1$) is found via a secure process. Both a and p are loaded to all modules in the system securely by the primary security servers when they are manufactured.

The scheme works as follows:
If $a^n \equiv m(p)$ and
(1) $1 \leq m \leq 99{,}999$ then n is assigned as the id of a primary security server,
(2) $100{,}000 \leq m \leq 999{,}999$ then n is assigned as the id of a security server,
(3) $1{,}000{,}000 \leq m \leq 6{,}999{,}999$ then n is assigned as the id of a teller money module,
(4) $7{,}000{,}000 \leq m \leq 9{,}999{,}999$ then n is assigned as the id of a money generator module,
(5) $10{,}000{,}000 \leq m \leq 11{,}999{,}999$ then n is assigned as the id of a customer service module,
(6) $m \geq 12{,}000{,}000$ then n is assigned as the id of a transaction money module.

If a module or server is validating a certificate, it checks the authenticity of the identification number (e.g., M(id), SS(id), or PSS(id)) n by computing $a^n \equiv m(p)$ and then checks if m is in the correct range.

Security Network

As shown in FIG. 2, the Security Network 1196 and the Security LAN 1194 connect the security servers 1184 to the primary security servers 1182. Security servers 1184 initially certify the money modules and customer service modules 1192 at manufacturing. Such security servers may be connected by a Module Manufacturing LAN 1202. They pass security information such as the bad id list and the list of primary security servers and their public keys to the modules. The bad id list contains the identities of the money modules, customer service modules, and security servers which are blocked from transacting. Recertification of these modules is described subsequently in the network sign-on flow diagram.

Figure 1B:
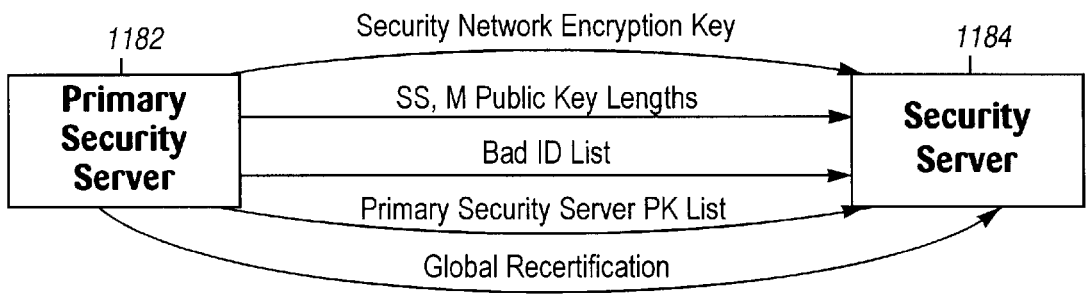
FIG. 1B is a diagram showing the security network messaging between a primary security server and an ordinary security server.

The security servers 1184 are initially certified by the primary security servers 1182 at manufacturing. Such primary security servers may be connected by a Security Server Manufacturing LAN 1204. Referring to FIG. 1B, the security servers 1184 receive various security information which they pass to the other modules. The security servers provide security services for the EMS Network 1198 and the bank LANs 1200, such as network sign-on where they pass updated security information. The security servers 1184 receive this information from the primary security servers 1182 over the Security Network 1196. Transaction money modules 1186 communicate with the EMS Network 1198 via network servers 1206 (NS). Participating banks have teller money module(s) 1188 and perhaps money generator (s) 1190 connected to their LANs 1200.

The Security Network 1196 is link encrypted. In addition, the primary security servers and security servers share a common symmetric key (a Security Network encryption key). This key is changed periodically by a designated primary server 1182 by public key, key exchange.

The list of bad id's is maintained by a designated primary server 1182. The list is accumulated from interactions with participating banks, law enforcement authorities, and subscribers to the system.

Periodically the length of the public keys for the security servers and the modules will be changed. The key length will be normally lengthened to maintain a high security level. The new designated key lengths will be communicated to the primary security servers by a designated primary server. The new lengths will be communicated to the security servers by the primary servers when new bad id lists are sent or upon recertification. In case of a dangerous breach of security, a primary security server can call for global recertification.

The length of the public key for each primary server will not change. A timetable will be created which will schedule the implementation and decommission of primary security servers. The new servers will most likely have longer keys unless they are implemented because of increased transaction volume. The list of active PSS public keys is created by a primary security server and signed by the server with its private key. The list is then broadcast to other security servers.

Figure 3A:
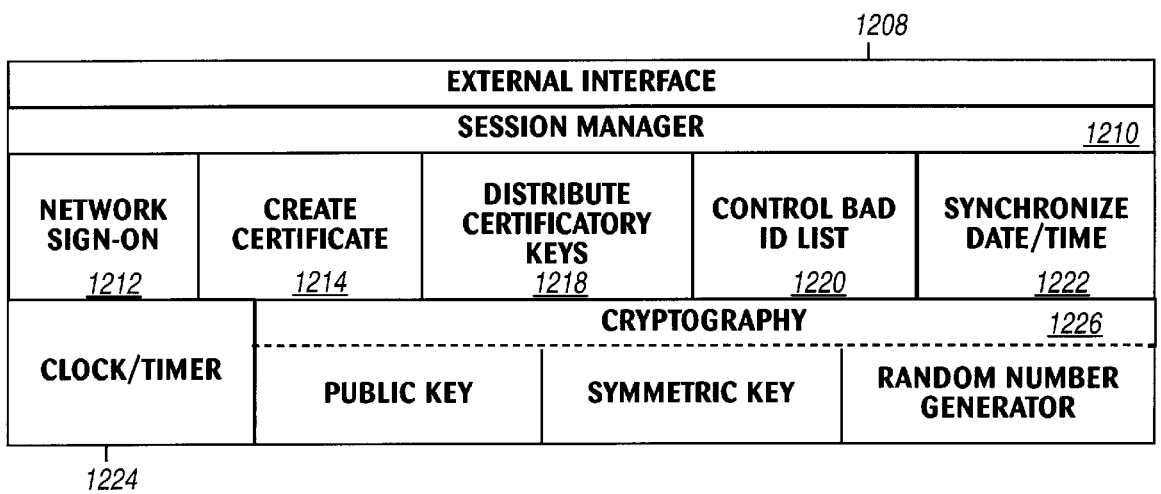
FIG. 3A illustrates the functional components of a security server.

FIG. 3A shows the functional components of a security server 1184. An External Interface function 1208 provides a communications layer for network interfacing. A Session Manager function 1210 controls the security aspects of a transaction session. A Network Sign-On function 1212 manages the security functions for network sign-on. A Create Certificate function 1214 certifies a certificate for any of the money modules (in a primary security server, this function certifies security servers). A Distribute Certificatory Keys function 1218 distributes the Certification Agency's list of valid primary security server public keys to the money modules (primary security server also distributes global recertification message). A Control Bad ID List function 1220 controls and distributes the list of bad identifiers. A Synchronize Date/Time function 1222 keeps money module Clock/Timer services synchronized to a system time. Clock/Timer 1224 and Cryptography functions 1226 are identical to those functions in the money modules.

Figure 3B:
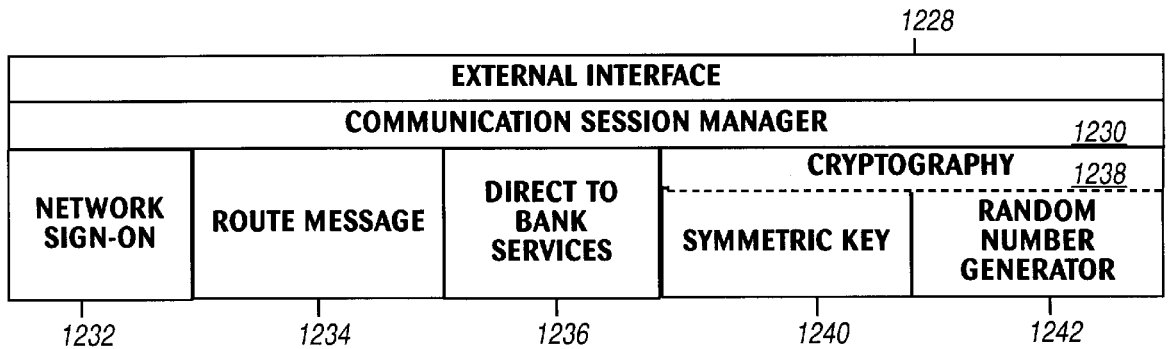
FIG. 3B illustrates the functional components of a network server.

FIG. 3B shows the functional components of a network server 1206. An External Interface function 1228 provides a communications layer for network interfacing. A Communication Session manager function 1230 manages a communication session between money modules, and between a money module and a security server. A Network Sign-On function 1232 controls the money module network sign-on process. A Route Message function 1234 provides directory services for routing messages, controlling message routing during sign-on and during a money module session. A Direct to Bank Services function 1236 provides information on services provided by participating banks. A Cryptography function 1238 provides a Symmetric Key function 1240 and a Random Number Generator function 1242. The Symmetric Key function 1240 encrypts messages between the network server 1206 and the modules accessing the network and between the network server 1206 and the security servers 1184. The Random Number Generator function 1242 generates random numbers for encryption keys and verification messages.

In the present EMS, another secure processing component, a customer service module (CSM) 1192, is preferably employed. A CSM is a tamper-proof device used for creating and updating account profiles. CSMs contain a unique certificate like those found in money modules and security servers. CSMs can establish secure sessions with other modules (e.g., security servers). The CSM requires a host to interface to a customer service representative and the on-line banking systems.

The CSM has two primary functions. First, the CSM creates account profiles so that a money module can access bank accounts, revalidate the money module link to bank accounts, and validate account numbers. These transactions are more fully described hereinbelow with reference to FIGS. 18–20. Second, the CSM functions to claim lost notes in response to a request from a host customer services representative, which is described in further detail in FIG. 21 and FIG. 22. A CSM has the same security functions as a money module and a special range of numbers for its identifier (see "Module Numbering Scheme"). The performance of these functions by the CSM simplifies the validate account number process for the Teller Module.

In accordance with an embodiment of an EMS which employs a CSM, the account profile structure for each bank changes to:

$$\underbrace{\text{Expire date} \| M(id) \| B(id) \| LA \| \sigma_{csm}(X)}_{X} \| \text{Cert(CSM)}$$

Where $M(id)$ = module identifier $B(id)$ = bank identifier $LA$ = list of account numbers and type of account (deposit or loan)

$\sigma_{csm}$ = signature of CSM $\text{Cert(CSM)}$ = certificate of (CSM)

$\|$ = concatenate

A validation procedure for such a profile is described hereinbelow with reference to FIG. 20.

Figure 4A:
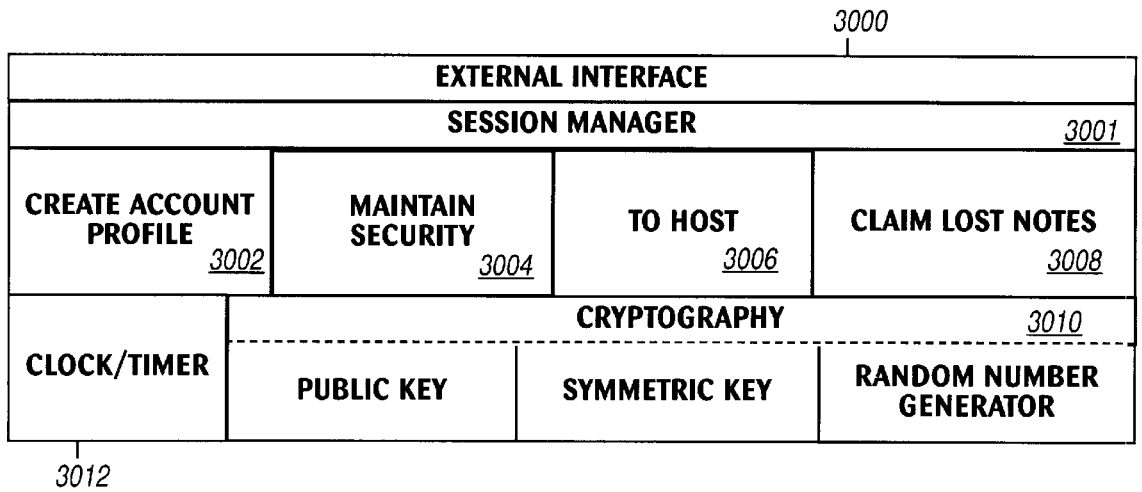
FIG. 4A illustrates the functional components of a customer service module.

FIG. 4A shows the functional components of a Customer Service Module (CSM) 1192. The External Interface 3000 interfaces the CSM to other processing and communications means within the Customer Service Module Host (CSMH) processor; the Session Manager 3001 acts to control and commit (i.e., finalize) or abort a transaction session between the CSM and a transaction money module or customer service representative. A Create Account Profile function 3002 constructs from customer account information an account profile that allows a money module to access the subscriber's different bank accounts. A Public Key function certifies and signs a bank account profile. Since the CSM requires a host to interface to a customer service representative and the on-line banking systems, a To Host function 3006 mediates the separation of duties between the CSM applications and the host applications. A Claim Lost Notes function 3008 is responsive to subscriber lost note claims, which the CSM validates and distributes to the issuing banks. The Maintain Security function 3004 manages the list of compromised money modules, applies for certificates, synchronizes the clocks, and manages the creation of new digital keys. Clock/Timer 3012 and Cryptography functions 3010 are identical to those functions in the money modules.

Figure 4B:
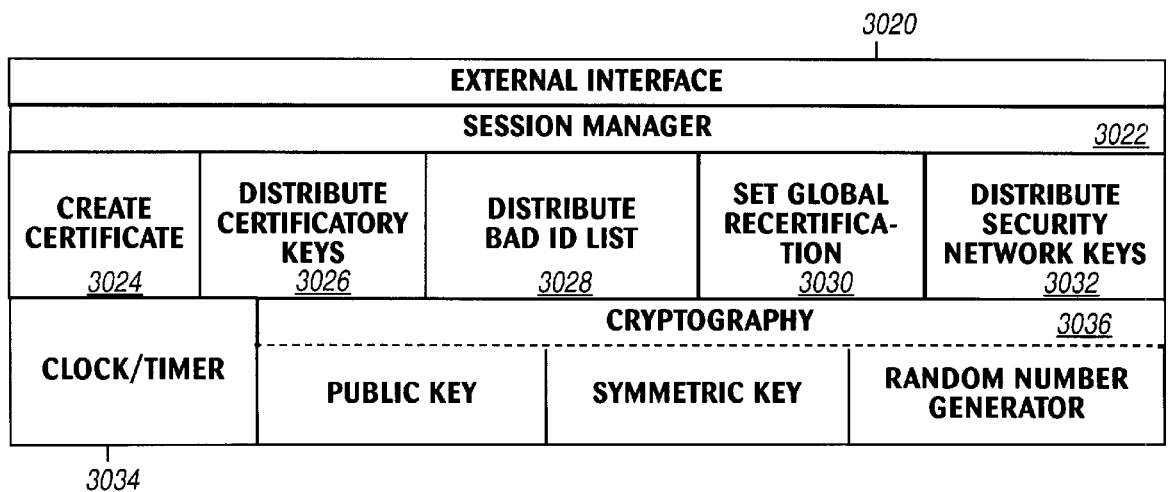
FIG. 4B illustrates the functional components of a primary security server.

FIG. 4B shows the functional components of a primary security server 1182. An External Interface function 3020 provides a communications layer for network interfacing. A Session Manager function 3002 controls the security aspects of a session with security servers, which are treated as if they may be compromised, and with other primary security servers. A Create Certificate function 3024 creates a certificate for any of the security servers. A Distribute Certificatory Keys function 3026 distributes the Certification Agency's list of valid primary security server public keys to the security servers. A Distribute Security Network Keys function 3032 manages and distributes security network keys among primary security servers, and to security servers. A Set Global Recertification function 3030 determines whether global recertification is required (e.g., because of a dangerous breach of security) and calls for global recertification when deemed necessary. A Distribute Bad ID List function 3028 controls and distributes the list of bad identifiers. Clock/Timer 3034 and Cryptography functions 3036 are identical to those functions in the money modules.

Network Sign-On

Figure 5:
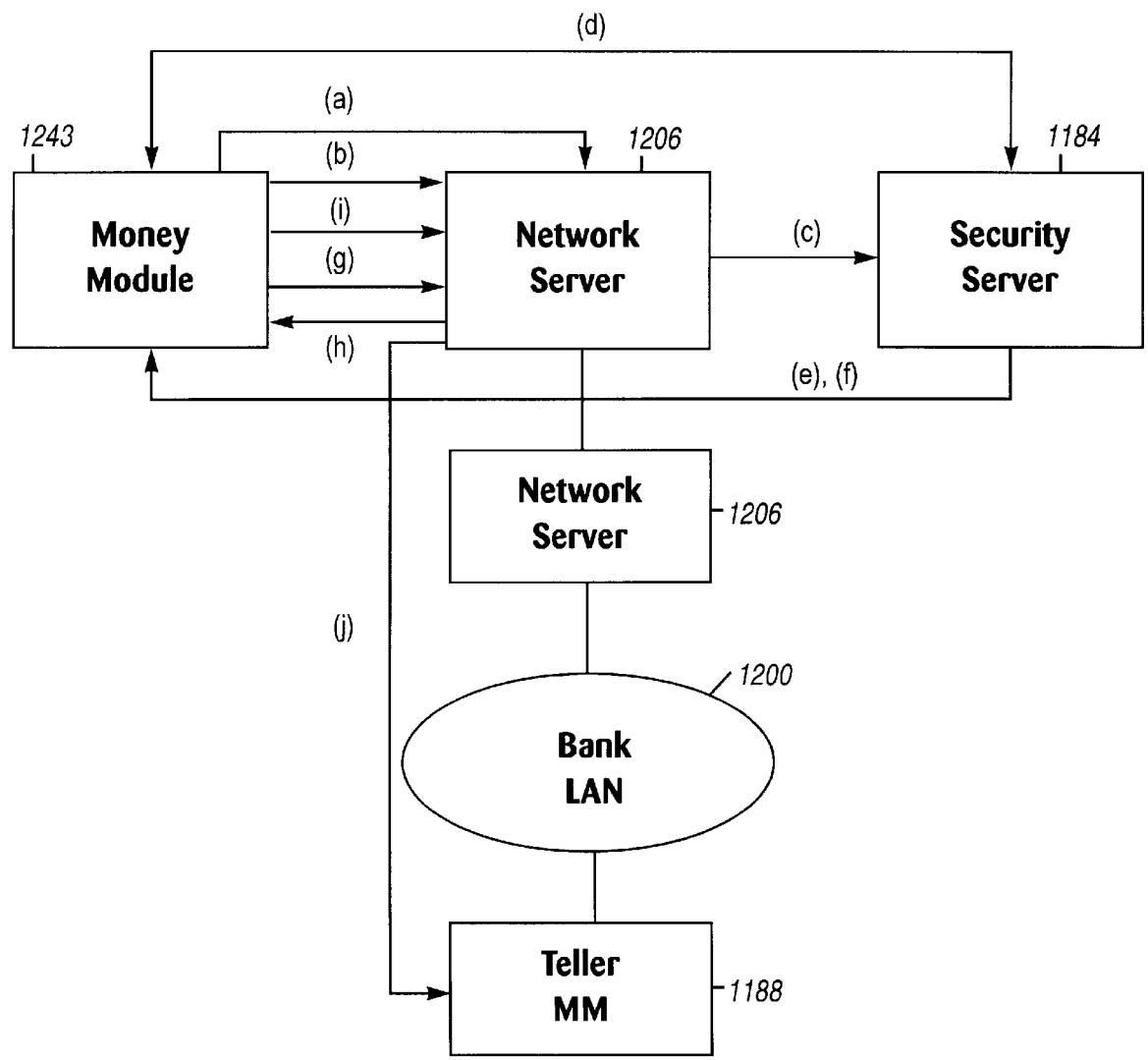
FIG. 5 shows an overview of the network sign-on procedure.
Figure 6A:
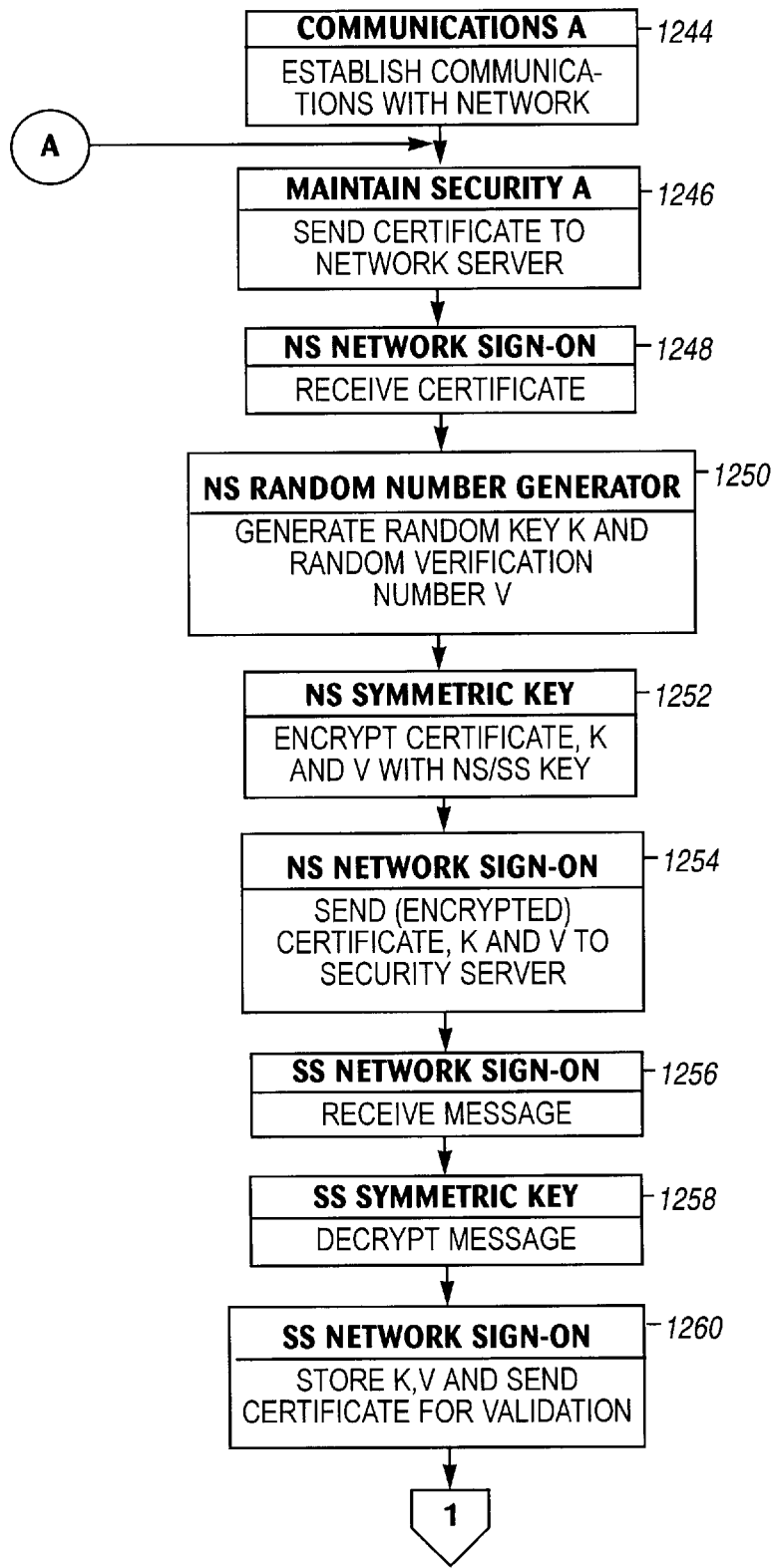
FIGS. 6A–6K illustrate a Network Sign-On protocol.
Figure 6B:
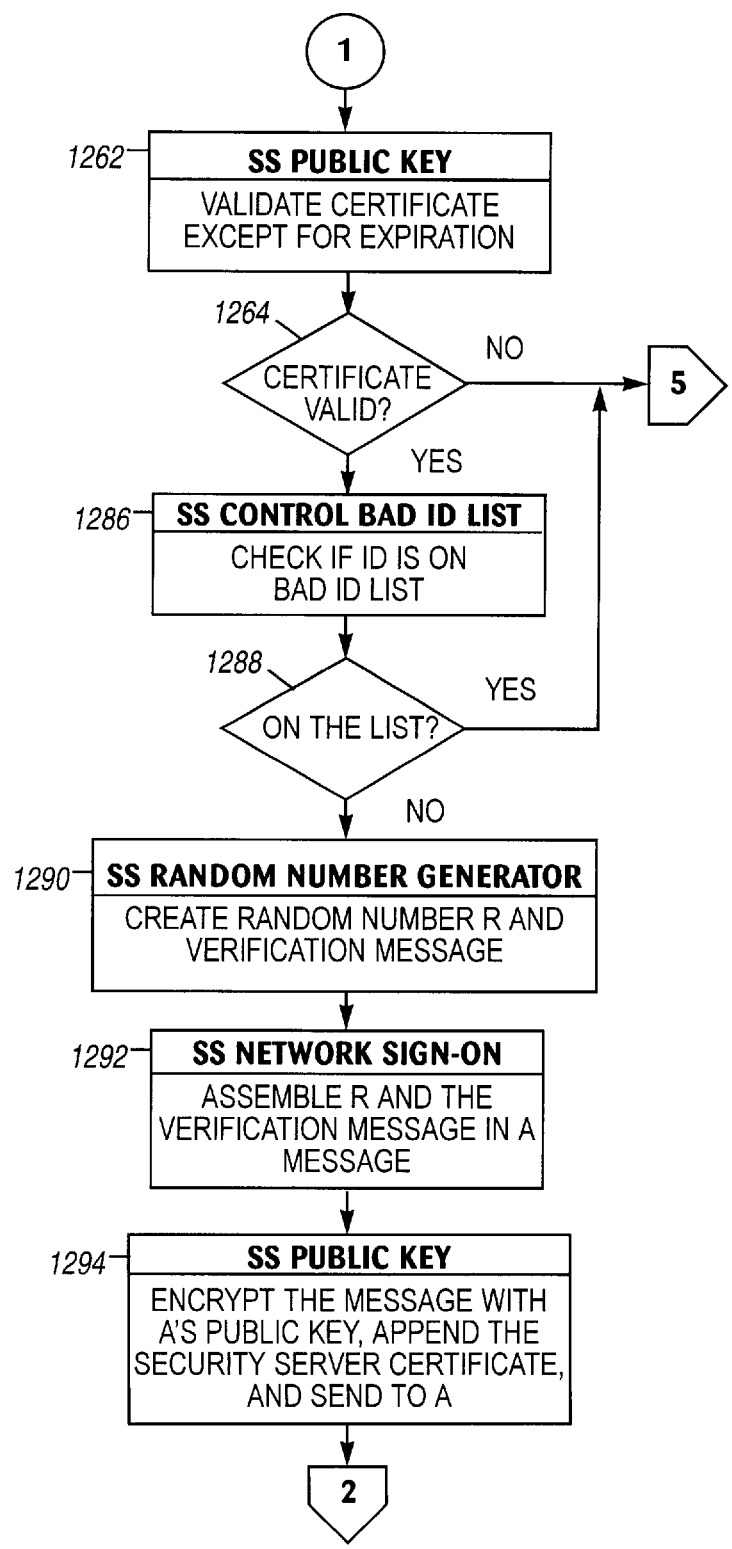
Figure 6C:
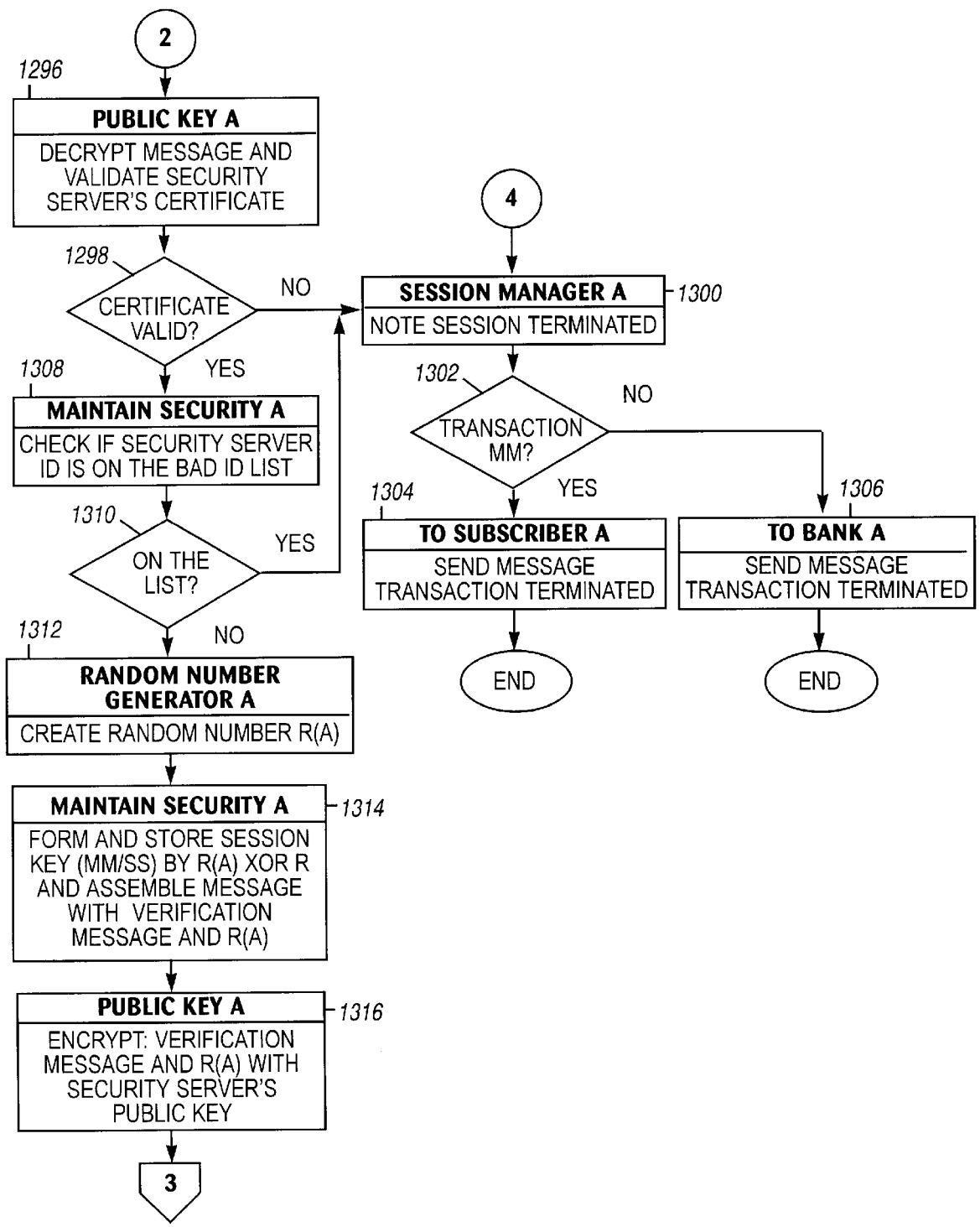
Figure 6D:
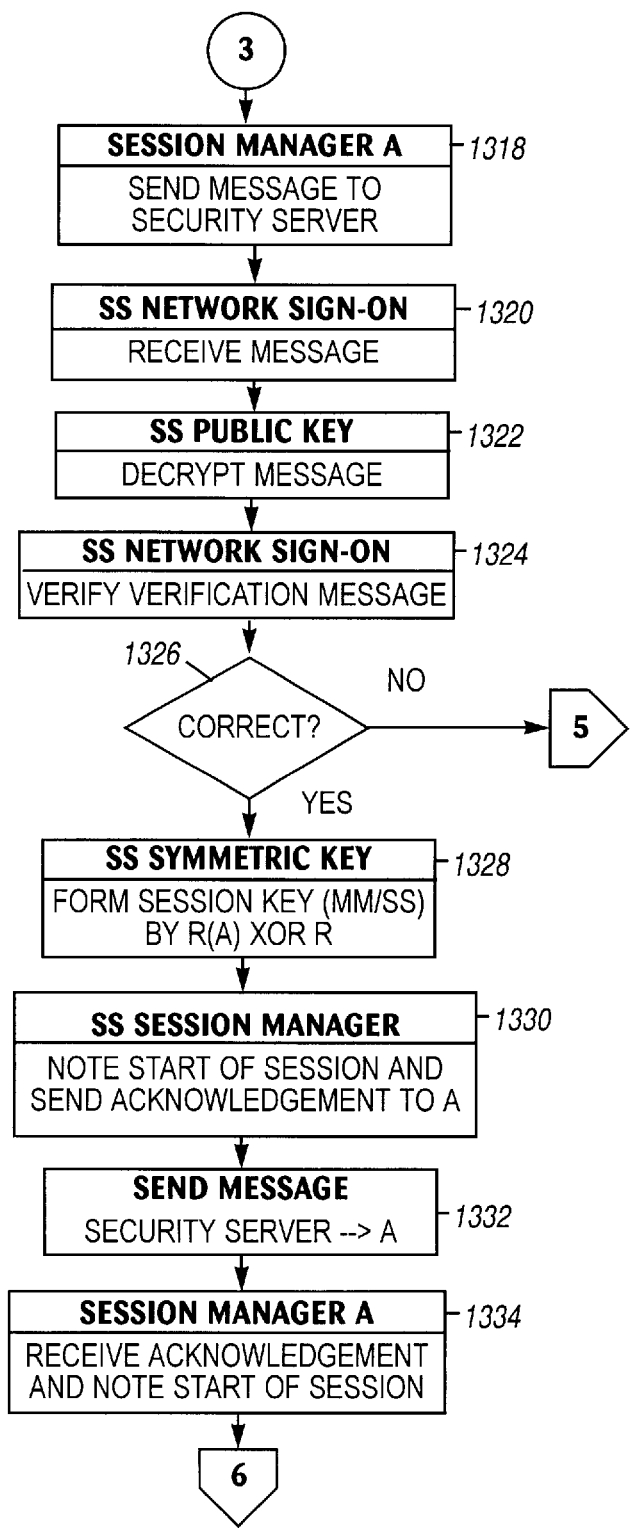
Figure 6E:
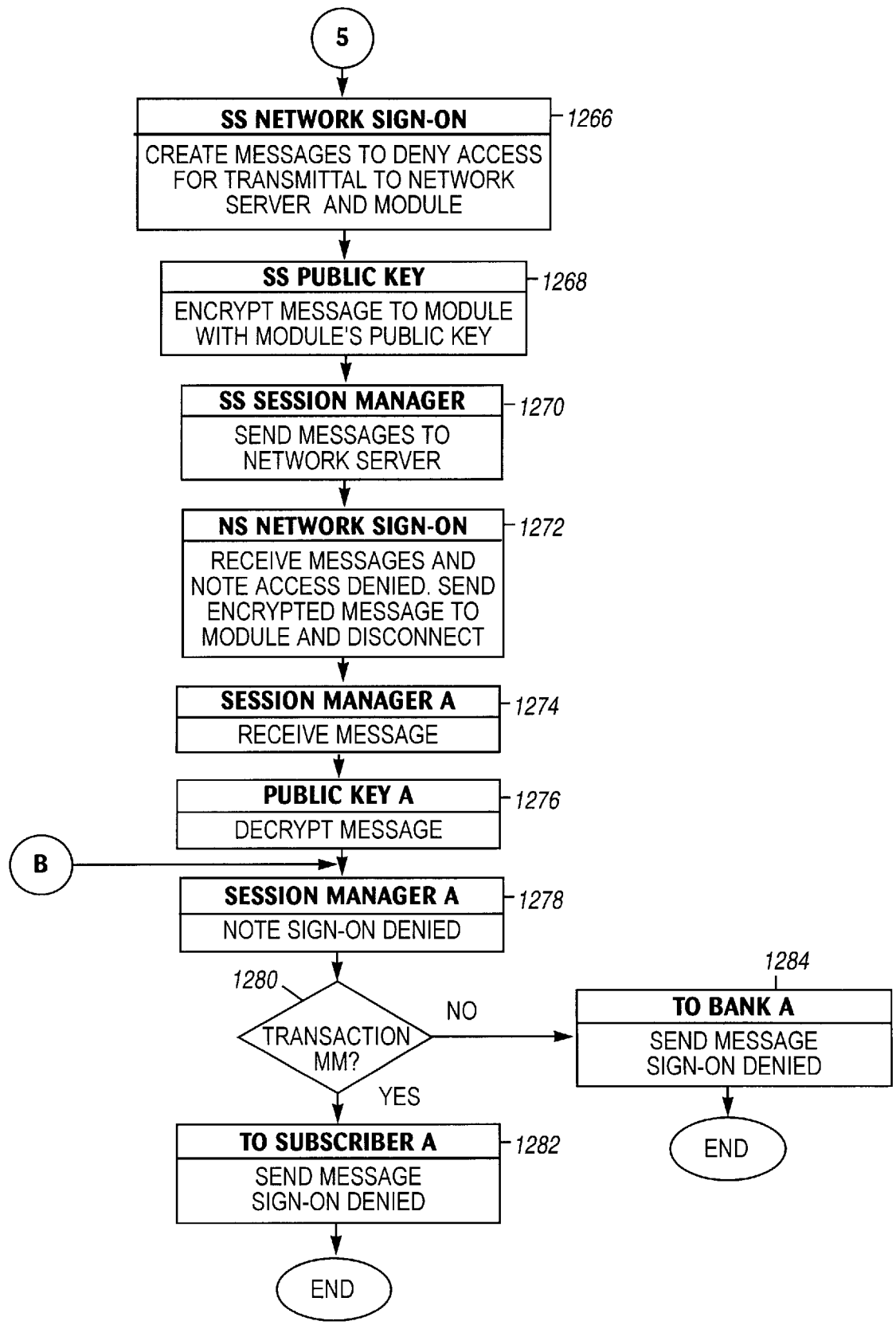
Figure 6F:
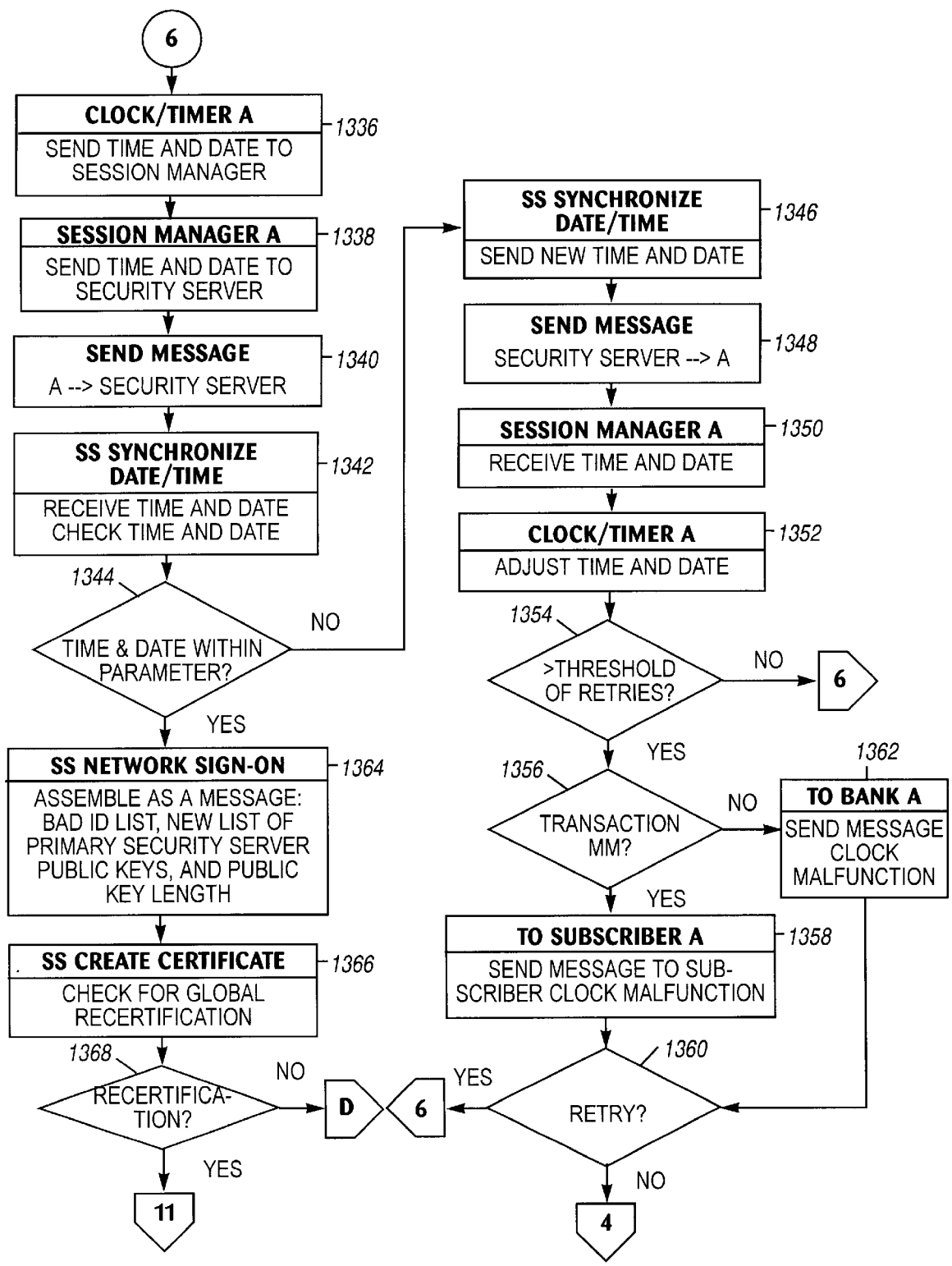
Figure 6G:
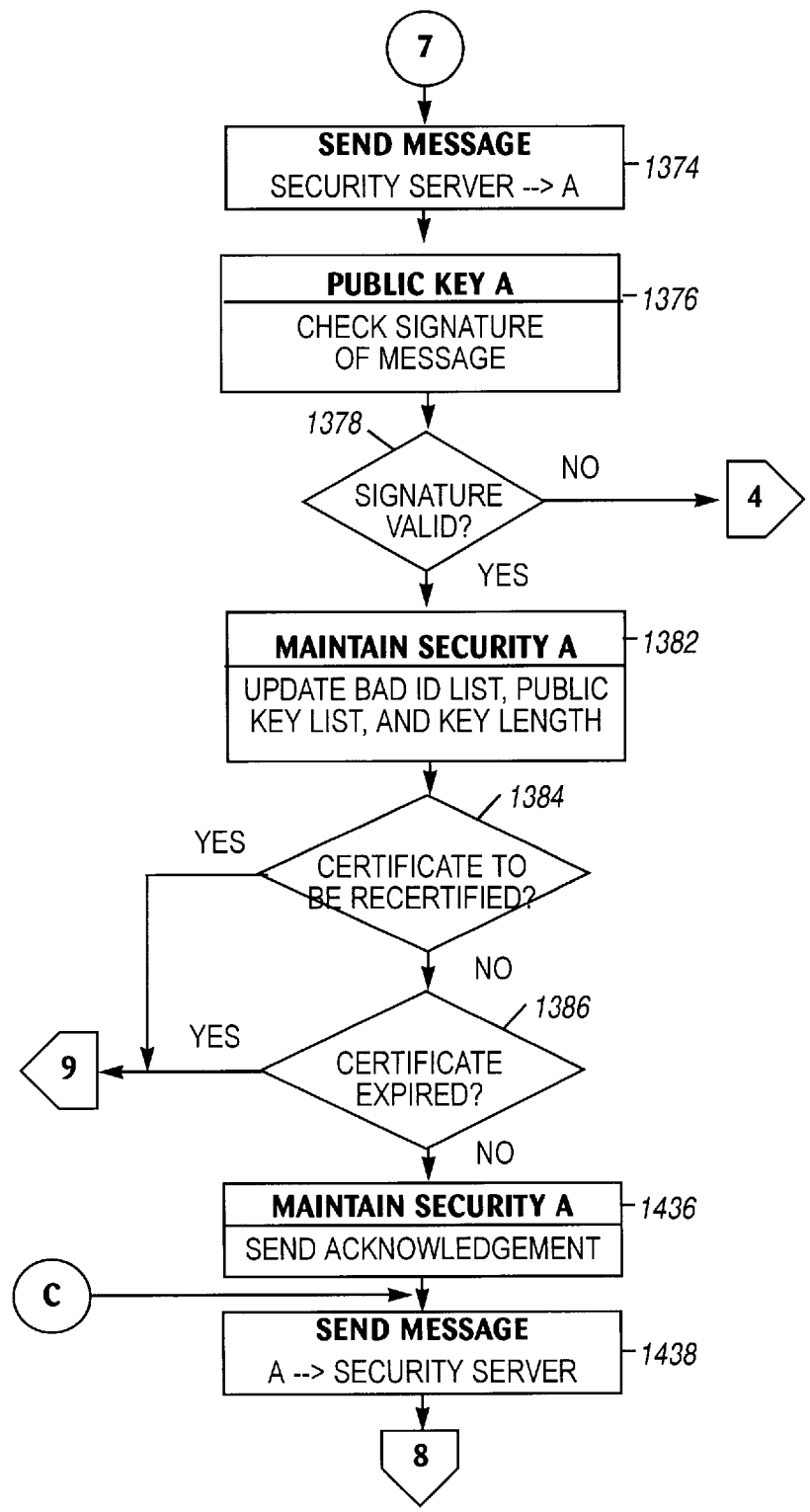
Figure 6H:
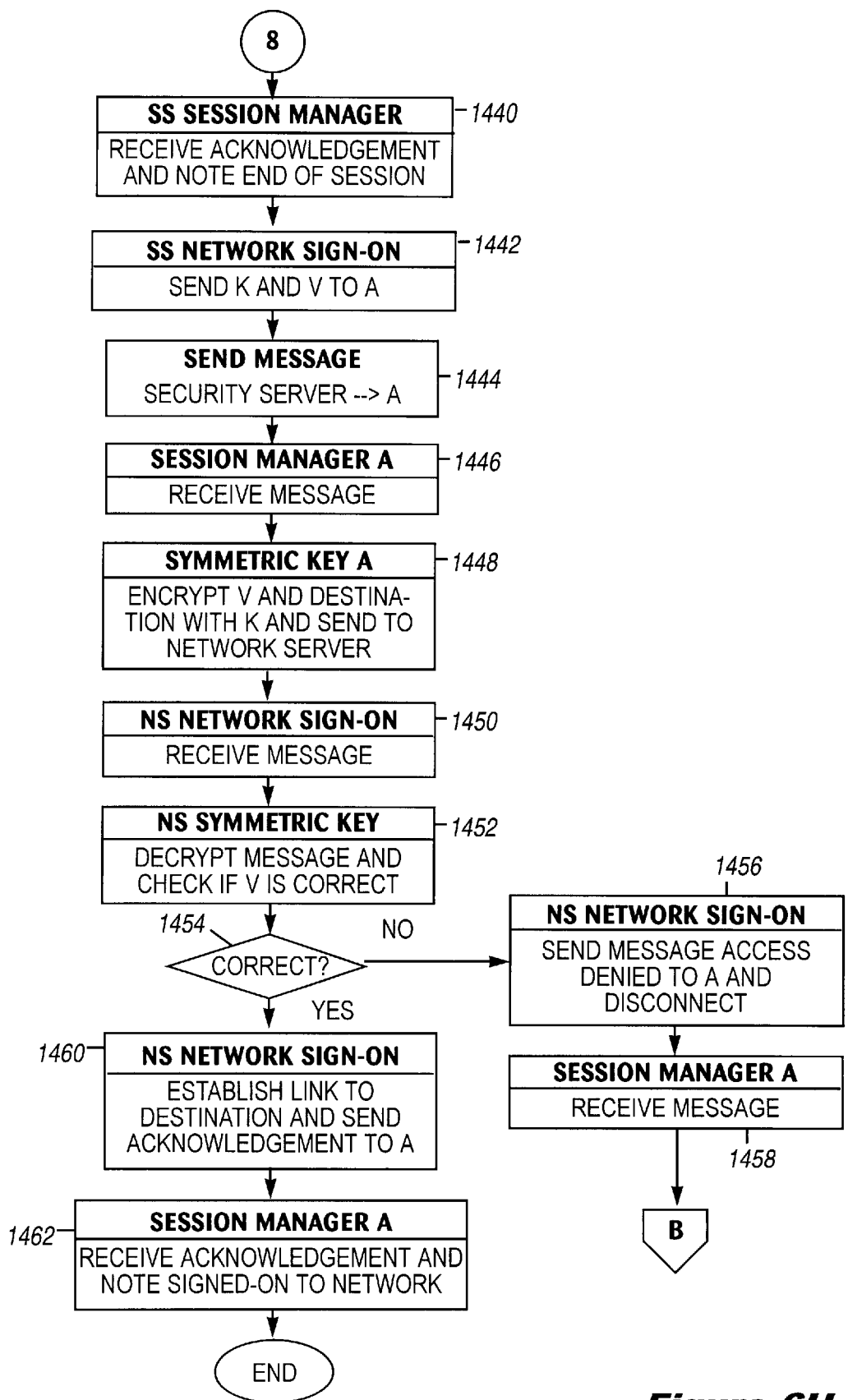
Figure 6I:
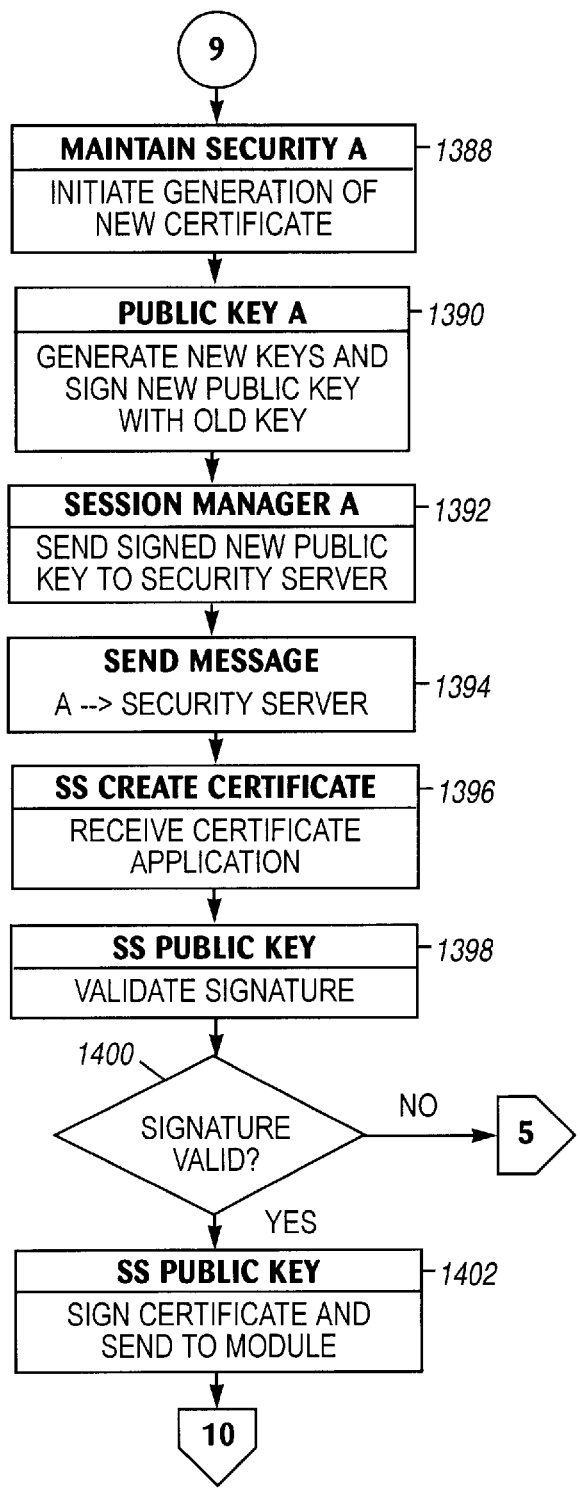
Figure 6J:
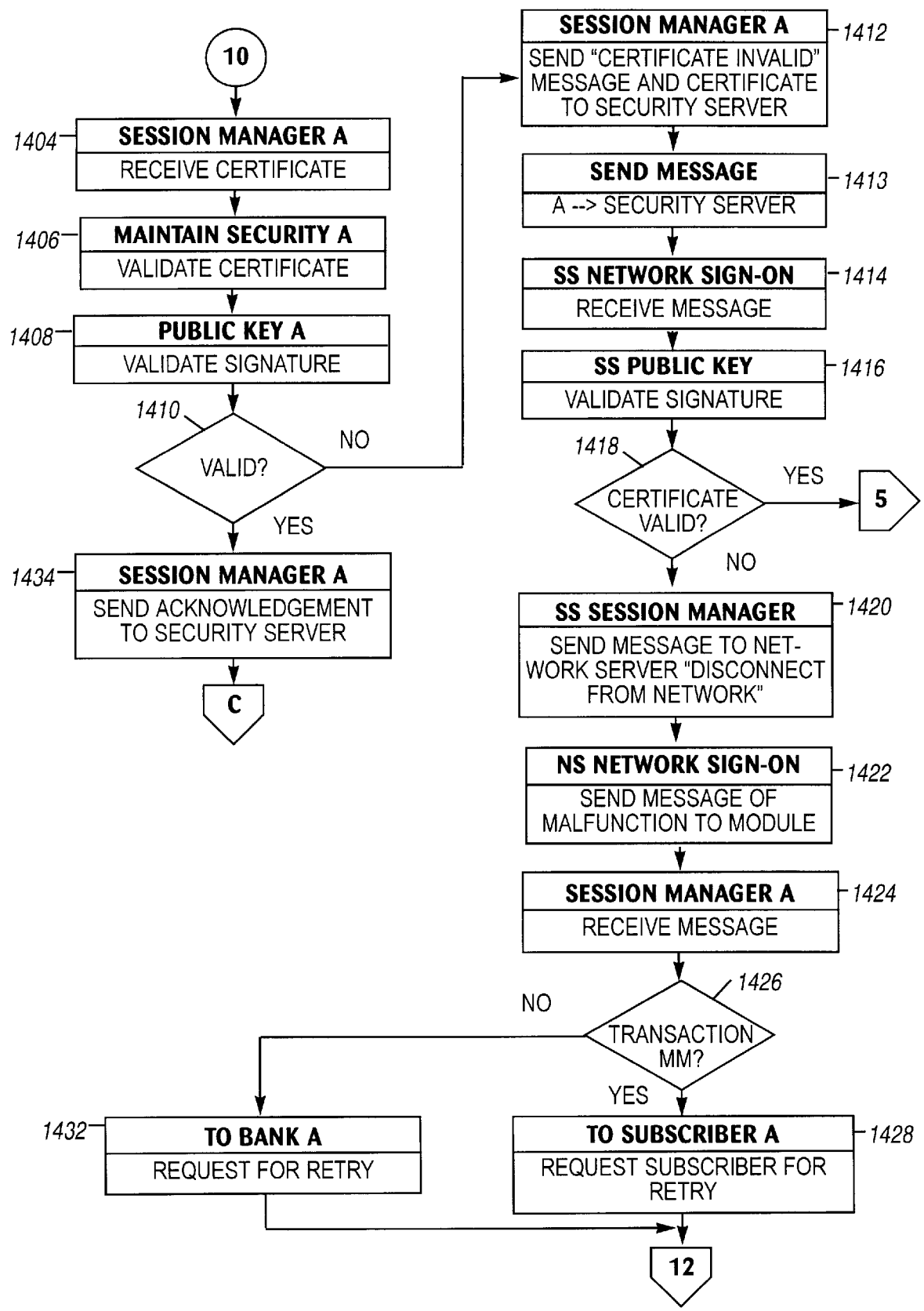
Figure 6K:
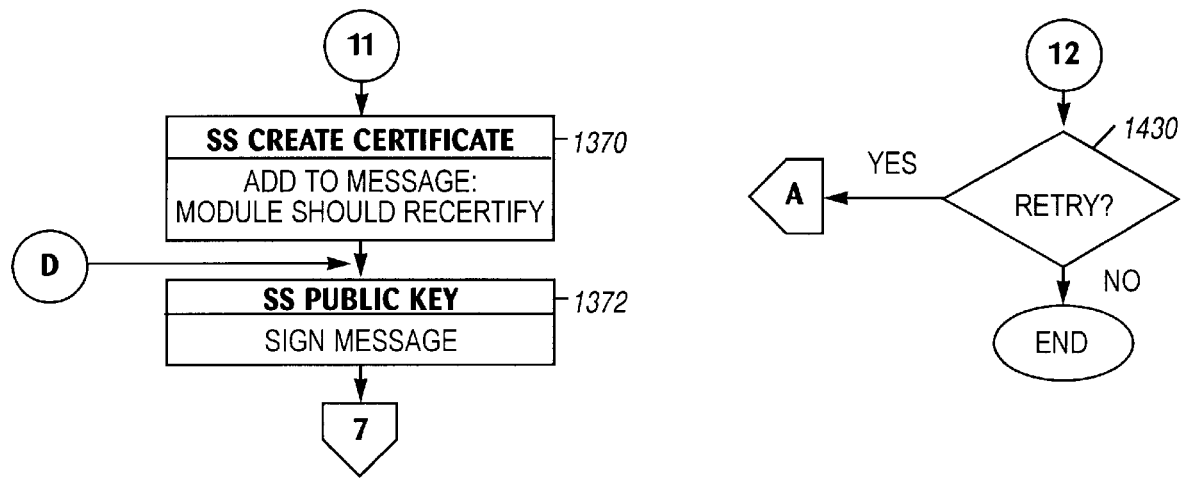
Figure 7A:
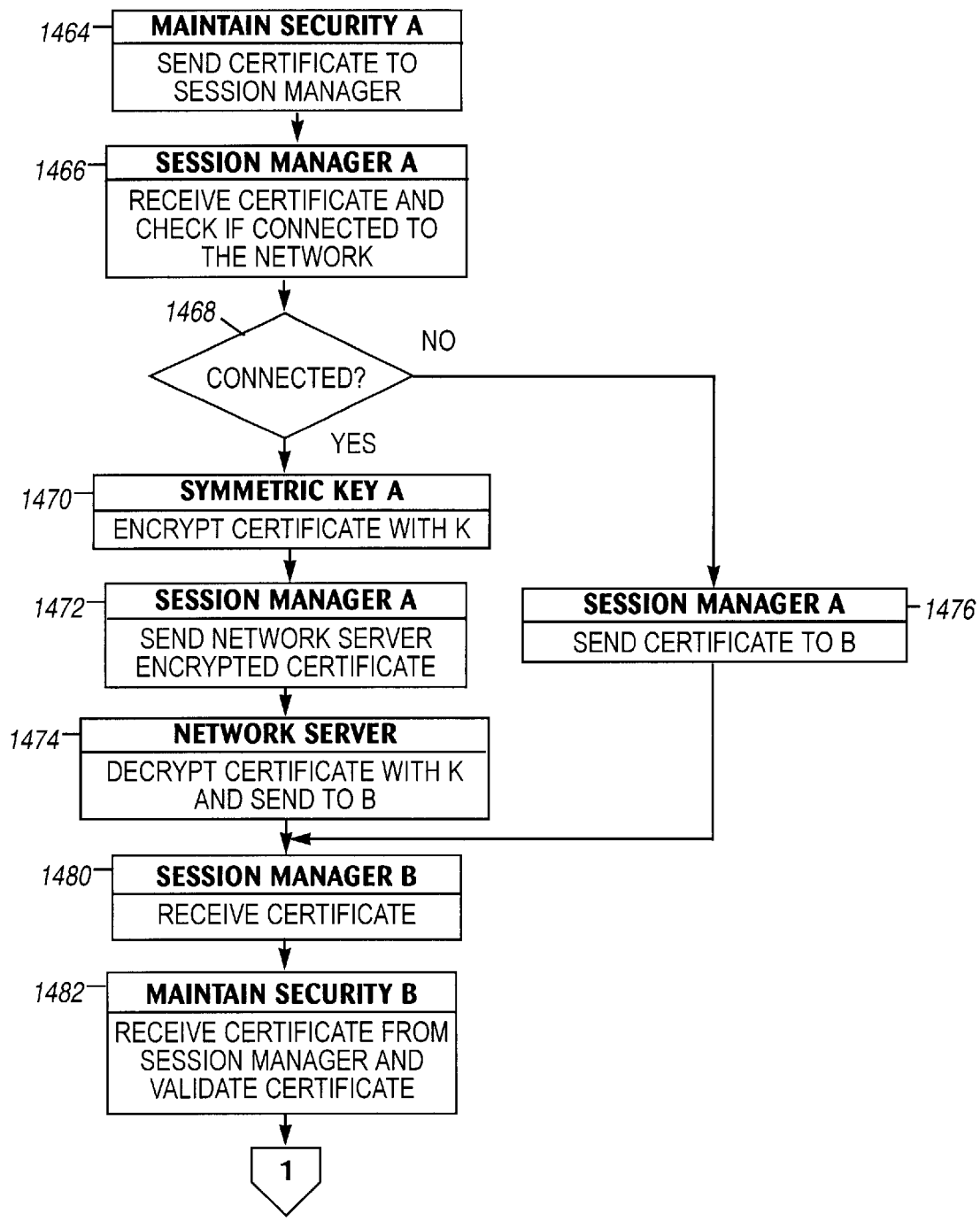
FIGS. 7A–7E illustrate an Establish Session protocol in the EMS.
Figure 7B:
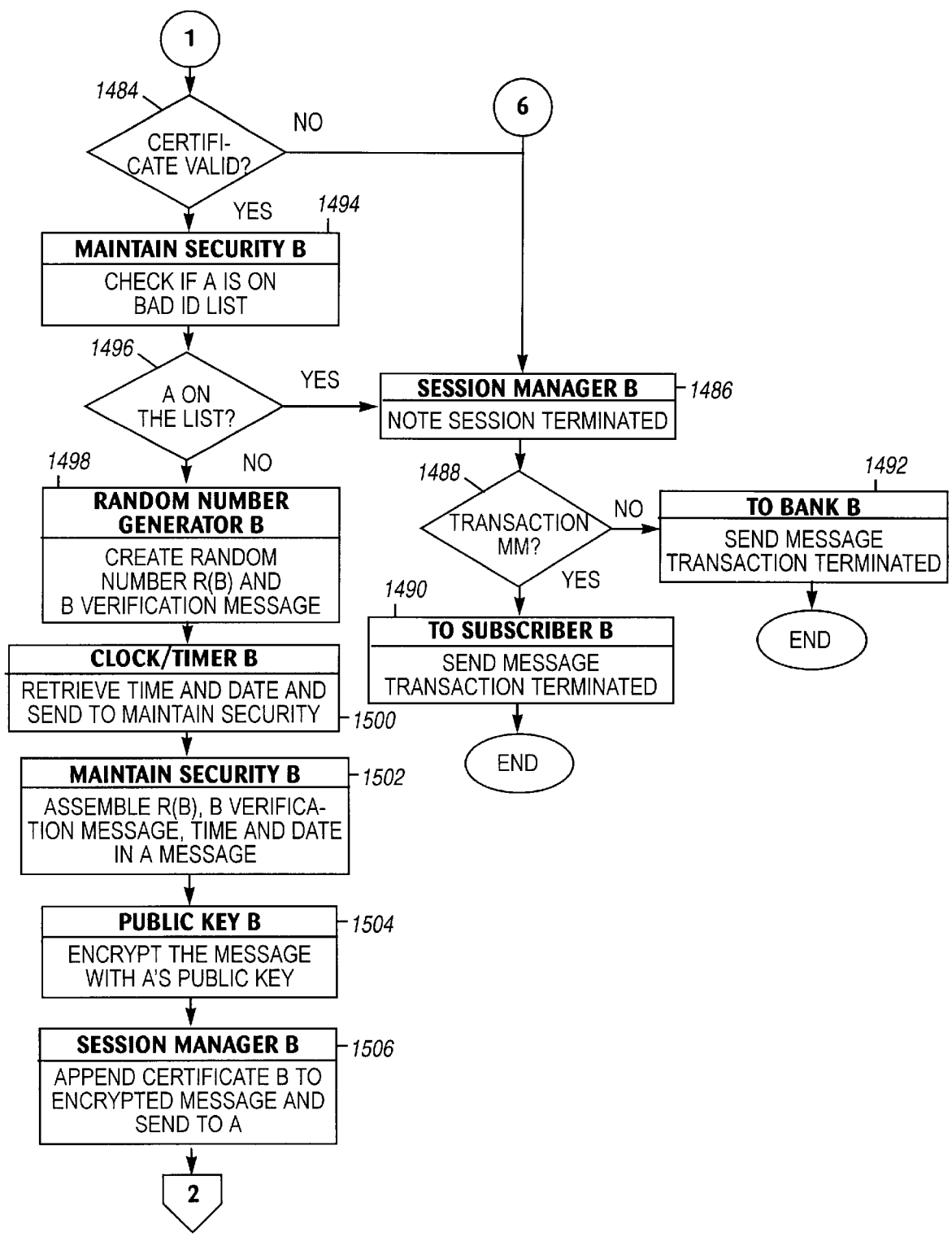
Figure 7C:
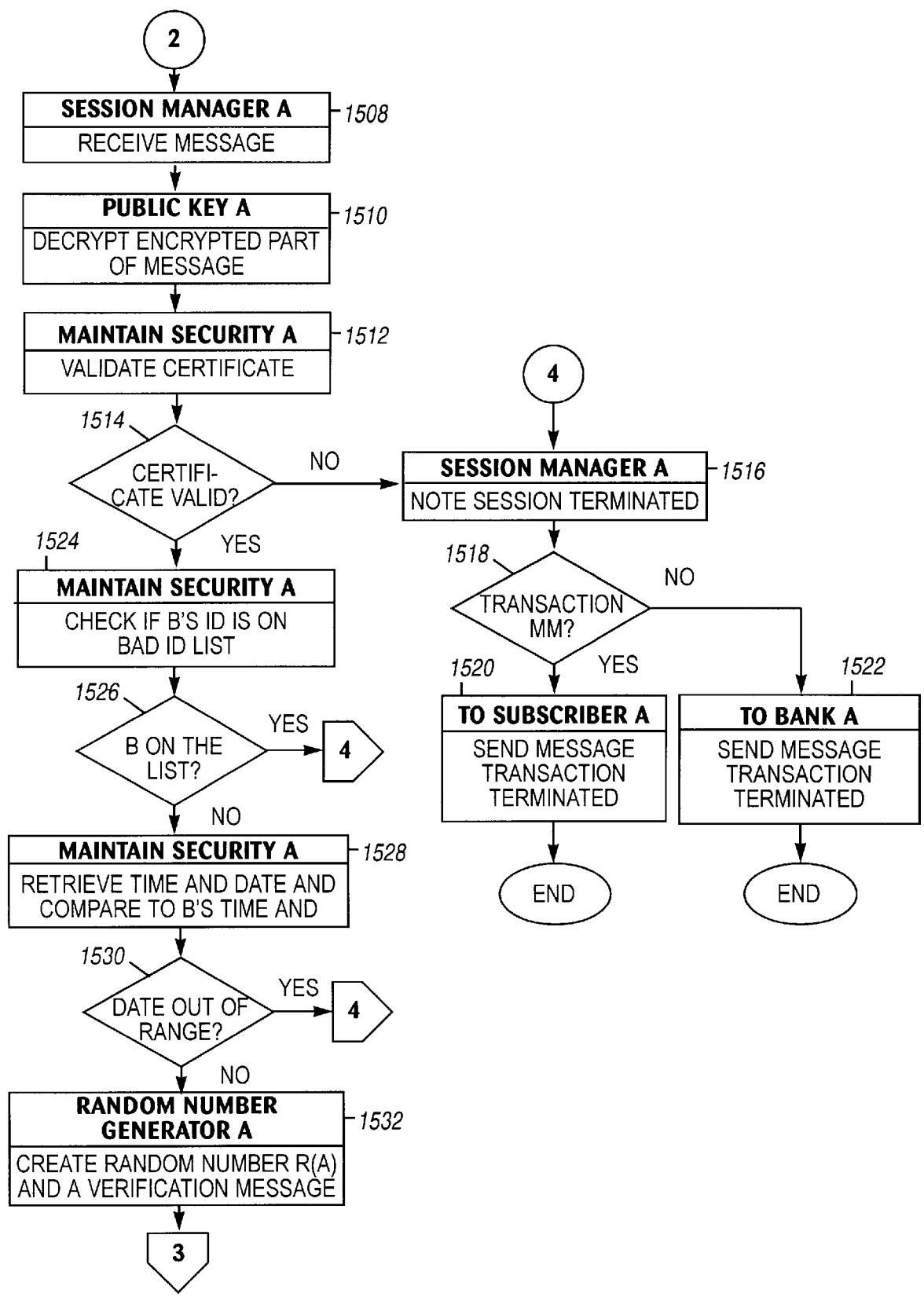
Figure 7D:
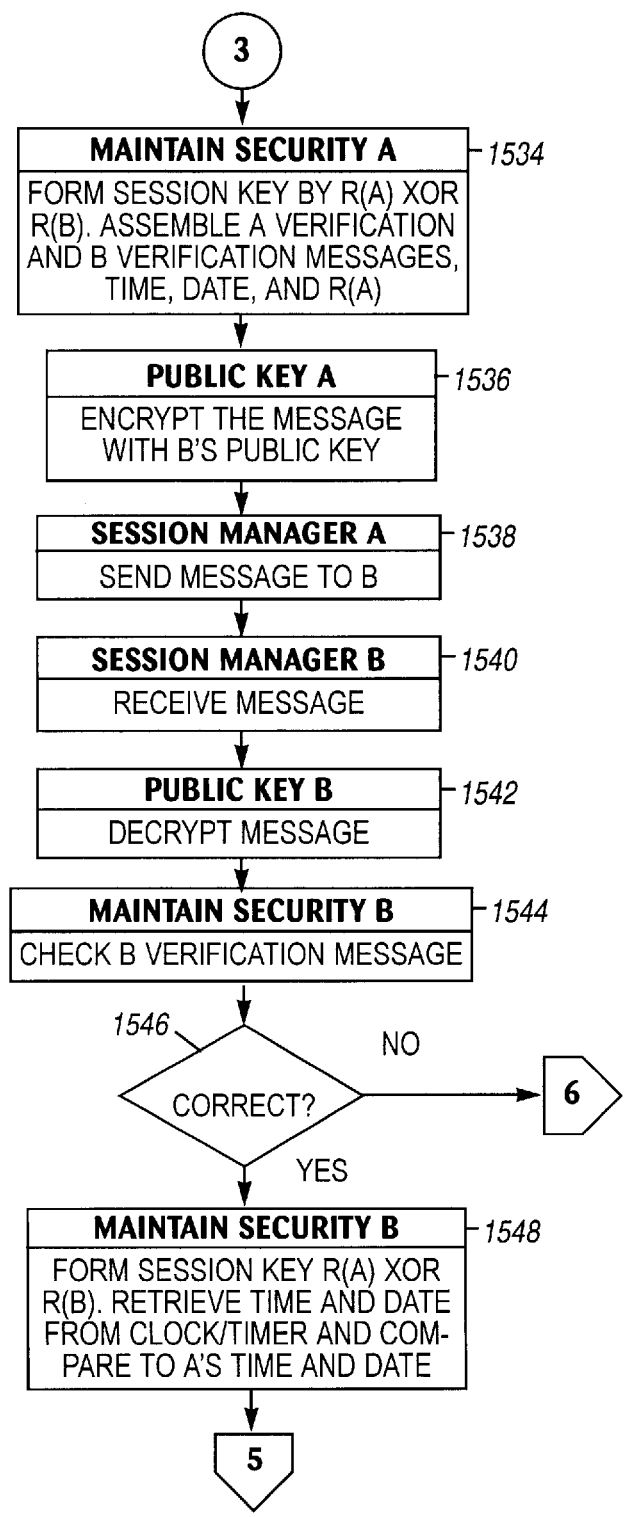
Figure 7E:
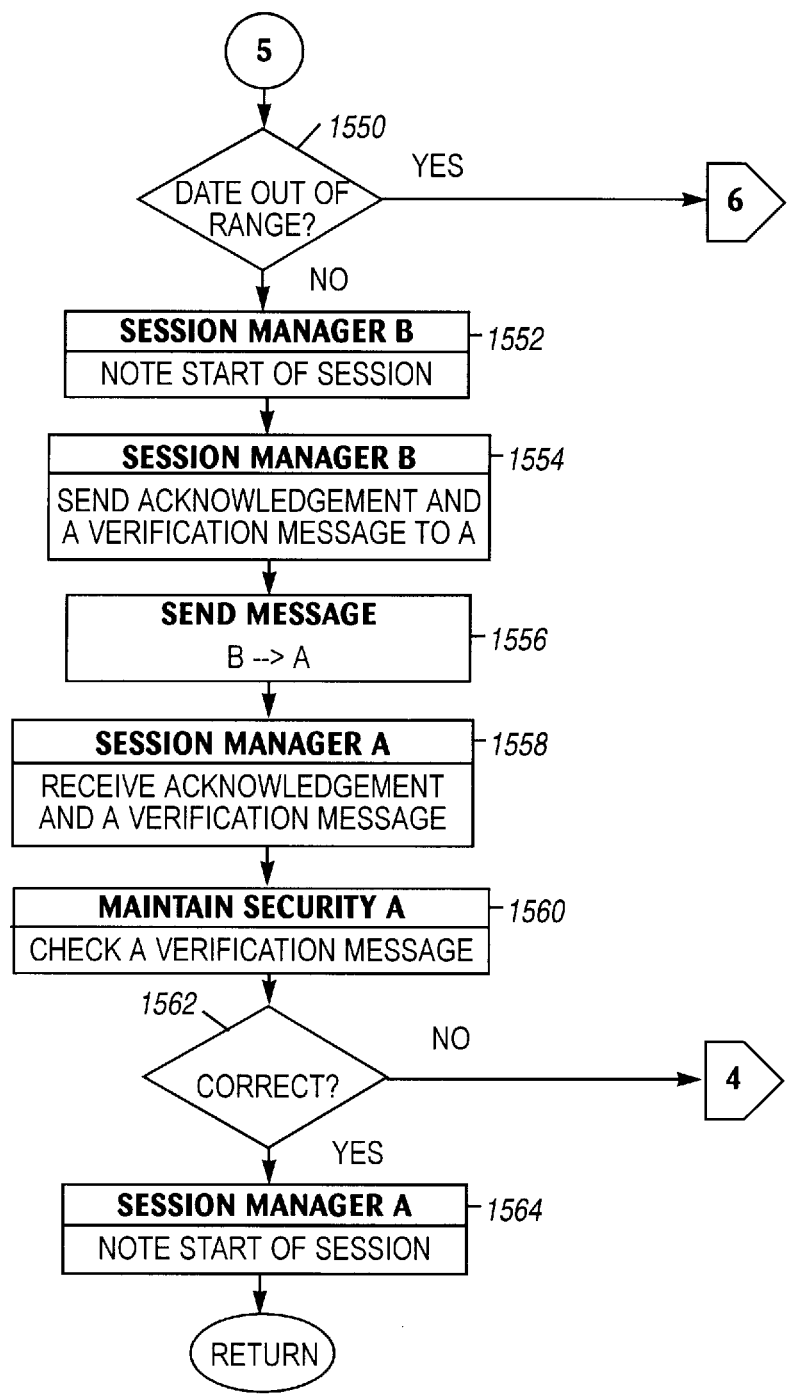

An overview of the network sign-on procedure is provided with reference to FIG. 5. The Sign-On protocol describes the situation where a module 1243 desires access to the EMS Network 1198 for recertification, deposit, withdrawal or other reason. The module may be a transaction money module 1186, teller money module 1138, money generator module 1188, or customer service module 1192.
(a) Establish a communication between module 1243 and network server 1206. (b) Pass the module's certificate to the network server 1206. (c) The network server 1206 generates a random verification number V and a random key K; the network server then passes the module's certificate, V, and K to a security server 1184 (encrypted by a NS/SS key). (d) The module 1243 and the security server 1184 establish a secure communication session (via session key (MM/SS)). (e) The security server 1184 passes the time/date, update bad ID list, update list of primary security server public keys, public key length, global recertification (if necessary), and recertified module certificate (if necessary). (f) End session with module 1243 and send V and K to the module 1243. (g) Encrypt V with K and send to the network server 1206. (h) The network server 1206 acknowledges network sign-on to the module 1243. (i) The module 1243 then informs the network server 1206 of the destination (if any) to which it wishes to be connected. (j) The network server 1206 establishes a connection to the destination.

The network sign-on is designed so that no one can spoof the module 1243 or intercept any of its information in the clear. FIG. 6 describes the detailed flow of the network sign-on procedure.

Communications A establishes communications with the EMS Network 1198 (step 1244). Maintain Security A sends its certificate to the network server 1206 (step 1246). NS Network Sign-On receives the certificate (step 1248). NS Random Number Generator generates random key K and random verification number V (step 1250). NS Symmetric Key encrypts the module's certificate, K and V with a NS/SS key (step 1252). NS/SS keys are local symmetric keys installed in network servers 1206 and security servers 1184 which communicate for network sign-on. NS Network Sign-On sends the certificate, K and V to the security server 1184, where SS Network Sign-On receives the message and SS Symmetric Key decrypts the message (steps 1254–1258). SS Network Sign-On stores K and V and then sends the module certificate to SS Public Key for validation (steps 1260–1264). In order to allow for the possibility of recertification, SS Public Key does not consider the expiration date in determining the validity of the module certificate.

If the module certificate is not valid, then SS Network Sign-On creates messages to deny access for transmittal to the network server 1206 and module 1243 (step 1266). SS Public Key encrypts the message to the module 1243 with the module's public key and SS Session Manager sends the messages to the network server (step 1268–1270). NS Network Sign-On receives the messages and notes access denied. The encrypted message is then sent to the module, and the network server disconnects. (Step 1272). Session Manager A receives the message, Public Key A decrypts the message, and Session Manager A notes that sign-on was denied (steps 1274–1278). If the device requesting sign-on was a transaction money module, then To Subscriber A informs the subscriber (steps 1280–1282). Otherwise, To Bank A informs the bank (step 1284).

If, on the other hand, the module's certificate is valid, then SS Control Bad ID List checks if the module's id is on the bad id list (steps 1286–1288). If the id is on the list, then network access is denied. Otherwise, SS Random Number Generator creates random number R and a verification message (step 1290). SS Network Sign-On assembles R and the verification message in a message which is encrypted by SS Public Key using A's public key. Public Key A also augments this encrypted message by appending the security server's certificate. (steps 1292–1294). The message is sent to A where Public Key A decrypts the message and validates the security server's certificate (step 1298).

If the certificate is invalid, then A notes session termination and informs either the subscriber or the bank (steps 1304–1306). If the certificate is valid, then Maintain Security A checks if the security server's id is on the bad id list (steps 1308–1310). If on the list, then the session is terminated (steps 1300–1306). If not on the list, then Random Number Generator A creates random number R(A) (step 1312). Maintain Security A forms session key (MM/SS) by the operation R(A) XOR R and then stores the session key (step 1314).

A message containing the verification message and R(A) is assembled and encrypted with the security server's public key (step 1316). Session Manager A sends the message To SS Network Sign-On and SS Public Key decrypts the message (steps 1318–1322).

SS Network Sign-On verifies that the verification message is the one which it created (steps 1324–1326). If it is not, then the security server denies network access. If the verification message is correct, then SS Symmetric Key forms session key (MM/SS) by R(A) XOR R (step 1328). SS Session Manager notes the start of session and sends an acknowledgement to A by the Send Message subroutine (steps 1330–1332). Session Manager A receives the acknowledgement and notes the start of the session (step 1334).

Clock/Timer A sends the time and date to the Session Manager which sends it to the security server (steps 1336–1340). SS Synchronize Date/Time receives the time and date and checks if it is within parameter (steps 1342–1344). If not within parameter, then SS Synchronize Date/Time sends a new time and date to Session Manager A (steps 1346–1350). Clock/Timer A then adjusts the time and date (step 1352). A then resends its date and time to the security server for rechecking. If clock synchronization is attempted more than a set number of times, then a clock malfunction is reported to the subscriber or bank, which may then retry if desired (steps 1354–1362).

If, however, the time and date are within parameter, then SS Network Sign-On assembles a message containing the bad id list, the new list of primary security server public keys (which comes from the Distribute Certificatory Key function), and the public key length (the size of the public keys are varied periodically) (step 1364). SS Create Certificate checks if a global recertification has been called for, and ensures that the time period for the global recertification has not expired (steps 1366–1368). Such time period should be long enough so that everyone's certificate has been recertified or expired. The function should also check when the module last recertified because if it was certified during the period of the global recertification, then there would be no need to recertify.

If recertification is required, then SS Create Certificate adds to the previous message: module should recertify (step 1370). Then, whether or not a recertification is called for, SS Public Key signs the message (step 1372). The message is sent to A where Public Key A checks the digital signature on the message (steps 1374–1378). If the signature is invalid, then the session is terminated. Maintain Security A then updates its bad id list, public key list, and key length (step 1382).

Module A then checks if its certificate needs to be recertified (either because of a global recertification order or because of an expired certificate) (steps 1384–1386). If a new certificate is required, then Maintain Security A initiates the generation of a new certificate (step 1388). Public Key A generates new keys and signs the new public key with its old private key (step 1390). Session Manager A sends the signed new public key to the security server's SS Create Certificate (steps 1392–1396). SS Public Key then validates the signature on the new public key (steps 1398–1400). If not a valid signature, then the security server denies network access. If the signature is valid, then SS Public Key signs the module's new certificate and sends it to the module (step 1402). Session Manager A receives the certificate, Maintain Security A undertakes to validate the certificate, and Public Key A validates the signature (steps 1404–1410).

If the certificate is not valid, then Session Manager A sends a "Certificate Invalid" message and the certificate to the security server by the Send Message function (steps 1412–1413). SS Network Sign-On receives the message and SS Public Key validates the signature (steps 1414–1418). If the security server determines that the certificate is actually valid, then it denies the module access to the network. If, however, the certificate is invalid, then SS Session Manager informs the network server that it will disconnect from the network (step 1420). NS Network Sign-On informs the module of the malfunction (step 1422). The module then queries the subscriber or the bank for a retry (steps 1424–1432).

If, on the other hand, the module determines that its new certificate is valid, then Session Manager A sends an acknowledgement to the security server (step 1434). Similarly, if no new certificate was required then Maintain Security A sends an acknowledgement message to the security server (steps 1436–1438). In either case, SS Session Manager receives the acknowledgement and notes the end of its session with the module (step 1440). SS Network Sign-On then sends K and V to A (steps 1442–1444). Session Manager A receives the message and Symmetric Key A encrypts V and the destination with K and sends the message to the network server (steps 1446–1448). NS Network Sign-On receives the message and NS Symmetric Key decrypts the message and checks if V is the same V it previously generated (steps 1450–1454).

If V is incorrect, then NS Network Sign-On sends an access denied message to A and then disconnects (steps 1456–1458). If V is correct, then NS Network Sign-On establishes a link to the destination and sends an acknowledgement to A (step 1460). Finally, Session Manager A receives the acknowledgment and notes that A has signed-on to the EMS Network 1198 (step 1462).

Establish Session

FIG. 7 shows the Establish Session protocol. Maintain Security A sends the module certificate to the session manager, and Session Manager A receives the certificate and checks if money module A is connected to the network (steps 1464–1466). If money module A is not connected to the network, then Session Manager A sends the certificate received from Maintain Security A to destination B (step 1476).

Alternatively, if money module A is connected to the network, then Symmetric Key A encrypts the certificate with K and Session Manager A sends the encrypted certificate to the network server (step 1468–1472). The Network Server decrypts the certificate with K and sends the certificate to destination B.

Regardless of whether the certificate was sent by the Network Server or by Session Manager A, Session Manager B receives the certificate and Maintain Security B (if B is a security server, then this function is performed by the Session Manager) validates the certificate (steps 1480–1482). If the certificate is not valid, then Session Manager B notes the session is terminated and informs either the subscriber or the bank (steps 1486–1492) (if B is a security server, then B merely notes the transaction is terminated).

If the certificate is valid, then Maintain Security B checks if A is on the bad id list (steps 1494–1496). If A is on the list, then the session is terminated. If A is not on the list, then Random Number Generator B creates random number R(B) and a B verification message (step 1498). Clock/Timer B retrieves the time and date (step 1500). Maintain Security B assembles R(B), B verification message and time and date in a message (step 1502). Public Key B encrypts the message with A's public key and Session Manager B appends B's certificate to the encrypted message and sends the message to A (steps 1504–1506).

Session Manager A receives the message, Public Key A decrypts the encrypted part of the message, and Maintain Security A validates B's certificate (steps 1508–1514). If the certificate is not valid, then Session Manager A notes the termination of the session and informs either the subscriber or the bank (steps 1516–1522). If the certificate is valid, then Maintain Security A checks if B is on the bad id list (steps 1524–1526). If B is on the list, then the session is terminated. If B is not on the list, then Maintain Security A retrieves the date and time and compares it to B's date and time (steps 1528–1530). If the date and time are out of range, then the session is terminated.

If the date and time are in range, then Random Number Generator A creates random number R(A) and an A verification message (step 1532). Maintain Security A then forms a session key by the operation R(A) XOR R(B) (step 1534). The A verification message, the B verification message, the time, date and R(A) are assembled into a message and encrypted with B's public key (step 1536). The message is sent to B by Session Manager A (step 1538). Session Manager B receives the message, Public Key B decrypts the message and Maintain Security B checks the B verification message (steps 1540–1546). If the B verification message is incorrect, the session is terminated. If the B verification message is correct, then Maintain Security B forms the session key by R(A) XOR R(B) (step 1548). The time and date are retrieved and compared to A's time and date to check if they are within a predefined range of each other (step 1550). If the time and date are out of range, then the session is terminated. If the time and date are in range, then Session manager B notes the start of the session (step 1552).

Session Manager B then sends an acknowledgement and the A verification message to A (steps 1554–1556). Session Manager A receives the message and Maintain Security A checks the A verification message (steps 1558–1562). If the verification message is not correct, the session is terminated. If the verification message is correct, then Session Manager A notes the start of the session (step 1564).

Transfer Notes

FIG. 8 shows the transfer notes protocol. Note Directory X chooses the note(s) and values for transfer, updates the note amount(s) and sequence number(s), and then sends the message to Notes (step 1566). Possible objectives in choosing the notes for transfer may, for example, be: (1) minimize the number of digital signatures (which requires processing time); (2) minimize the size of the packet; (3) maximize the usefulness of the electronic notes left to the transferring subscriber (i.e., pass the notes with the shortest time left until expiration). Such objectives may be achieved by the following note transfer algorithm: (1) determine all possible alternatives which contain the least number of notes; (2)

determine which of these alternatives have the least number of transfers; (3) if more than one choice is left from step 2, choose the one which has the least number of monetary unit days. Monetary-unit days=residual value of note to be transferred times the number of days left until the note expires, summed for all the notes in the packet.

Notes X, upon receiving the message from Note Directory X, creates a transfer to be appended to each note being transferred (step 1568). Public Key X creates signatures for the note(s) (step 1570). Packet Manager X then assembles the note(s) with their new transfer(s) and signature(s) in a packet and sends the packet to Y (steps 1572–1574). Packet Manager Y receives the packet and disassembles it (step 1576).

Verify Y validates all certificates in the note(s) (e.g., money generator certificate and all transfer certificates). Then Verify Y verifies that the identification numbers in the transfer group match up with the module identification numbers of the certificates in the signature and certificate group throughout the history of the electronic note. Also, the consistency of the transfer amounts for each note is validated by ensuring that throughout the electronic note history the amount transferred in each successive transfer is less than that of the immediately precedent transfer. In addition, the total amount transferred is checked to ensure it is the amount expected. (Steps 1578–1580). If not valid, then the transaction is aborted (step 1582).

If valid and Y is a transaction money module, then Verifier Y verifies the expiration dates of the note(s) (steps 1584–1588). If any of the note(s) have expired, then the transaction is aborted. If none have expired, then Verifier Y checks each id from the note transfers against the bad id list (steps 1590–1592). If any of the transfer id's are on the bad id list, then the transaction is aborted.

If the transfer id's are not on the bad id list (or Y is not a transaction money module), then Public Key Y verifies the validity of the note(s) signatures (steps 1594–1596). If any of the signatures are not valid, then the transaction is aborted. If the signatures are valid, then Verifier Y checks if the note(s) bodies match note bodies that are stored by the Notes application or located in the Tran Log (steps 1598–1600). For each note body that matches, a note transfer tree is created in order to determine whether there has been any note duplication (steps 1602–1604). If any of the notes have been duplicated, then the transaction is aborted. This check for duplication (i.e., steps 1598–1604) is particularly directed to, and well suited for, thwarting individuals who attempt to create money by transferring notes by "self-dealing" using a compromised transaction money module.

If there are no duplicates, or if no matches of note bodies were identified, then Notes Y places the note(s) in the money holder (step 1606). Finally, Note Directory Y updates the note(s) location(s) and amount(s), and also initializes sequence number(s) (step 1608).

It may be understood that the Transfer Notes process includes steps for updating and initializing a sequence number to facilitate note reconciliation (see "Money Issued Reconciliation"), checking if the transferee of any note is on the bad id list, and checking for note duplication. These additional features and steps make it difficult for adversaries to introduce and circulate duplicated notes, and enhance the ability to detect duplicated notes in circulation.

Foreign Exchange

FIG. 9 shows the protocol for a foreign exchange transaction using dollars and pounds as exemplary monetary units. Initially, A agrees to exchange with B dollars($) for pounds (£) at an exchange rate of $/£ (step 1602). A and B then sign on their money modules and the modules prompt their subscribers for the type of transaction (steps 1604–1610). A chooses to buy foreign exchange and B chooses to sell foreign exchange (steps 1612–1614). A and B establish a secure transaction session (steps 1616–1620).

To Subscriber A prompts the owner/holder of A for the amount by type of note of dollars he wishes to exchange (step 1622). Pay/Exchange A receives the amount and Note Directory A checks if A has sufficient funds (steps 1624–1628). If the funds are not sufficient, then To Subscriber A prompts for a new amount which again is checked against existing funds (steps 1630–1632). If no new amount is entered, then the transaction is aborted (step 1634).

If funds are sufficient, then Pay/Exchange A sends the dollar amount to B (steps 1636–1638). To Subscriber B then prompts the owner/holder of B to select either the amount of pounds he wishes to exchange for the dollars or, alternatively, simply the exchange rate for the dollars (step 1640). Note Directory B checks for sufficient funds (steps 1642–1644). If funds are insufficient, then To Subscriber B prompts for a new rate and again existing funds are checked for sufficiency (steps 1646–1648). If, however, no new rate is selected, then Pay/Exchange B informs A of its insufficient funds (steps 1650–1652). A may then select a new amount for exchange or abort the transaction (steps 1630–1634).

If B has sufficient funds for the transaction, then Pay/Exchange B sends A an acknowledgement and the amount of pounds to be exchanged (the equivalent rate is also sent) (steps 1654–1656). To Subscriber A prompts to verify the amount of pounds and the rate (steps 1658–1660). If the amount and rate are incorrect, then Pay/Exchange A informs B that the amount and rate are incorrect (steps 1662–1664). To Subscriber B then prompts for a new rate (steps 1666–1668). If no new rate is chosen, then the transaction is aborted (step 1670).

If, however, A verifies the correct amount and rate of the transaction, then Pay/Exchange A passes the dollar amount to the money holder (step 1672). The dollar notes are then transferred from A to B (step 1674). Pay/Exchange B passes the pound amount to its money holder (step 1676). The pound notes are then transferred from B to A (step 1678).

At this point in the transaction, both A and B provisionally hold foreign exchange notes in the correct amounts. A and B have each participated in two transfers: A transfers: (1) A transferred dollars to B; (2) A received pounds from B. B transfers: (1) B transferred pounds to A; (2) B received dollars from A. To complete the foreign exchange transaction, A must now commit (i.e., finalize and permanently record in its transaction log) both of its two transfers. Similarly, B must commit both of its two transfers. Note that A may commit to the foreign exchange transfer A→B (dollars from A to B) and B→A (pounds from B to A) separately. Likewise B may commit to the foreign exchange transfers A→B and B→A separately.

The next portion of the foreign exchange protocol is designed so that neither party knows the order in which the transacting money modules will commit. Such uncertainty will discourage parties from intentionally trying to tamper with a transaction. As background, a function S(X) is defined so that S(O)=A and S(1)=B, where A and B refer to money modules A and B. Thus, if X is randomly chosen as O or 1, then money module A or B is randomly indicated.

The following routine is used to allow A and B to commonly establish a random X. R(A) and R(B) are the random numbers generated by A and B, respectively, during the Establish Session subroutine. The parity of R(A) XOR R(B) is determined (by exclusive—ORing each bit of R(A) XOR R(B)). This parity is the random number X. $\overline{X}$ is the complement of X ($\overline{X}$=X XOR 1).

Referring again to FIG. 9, Tran Log A conditionally updates its transaction log to record the transfer S(X) to S($\overline{X}$) (step 1680). If X is calculated to be 0, then the transfer A to B (i.e., the dollar transfer) is conditionally recorded. If X is calculated to be 1, then the transfer B to A (i.e., the pound transfer) is conditionally recorded. Because the log is conditionally recorded, it may be rolled-back in the event money module A aborts the transaction. The update log becomes permanent once the log update has been set to unconditional (either as shown explicitly in the flow diagram or implicitly during a commit). Session Manager A then sends a "Log Updated" message to B (steps 1682–1684). In response, Tran Log B also conditionally updates its log to record the transfer S(X) to S($\overline{X}$) (step 1686).

If X=1, then Tran Log B sets the log update to unconditional (steps 1688–1690). Thus, at this point, B has committed to its transfer of pounds to A. Next, B follows the Commit protocol (step 1692) described subsequently with reference to FIG. 10. In this situation, A will commit to both its transfers (i.e., transferring dollars and receiving pounds) and B will commit to its one outstanding (uncommitted) transfer, namely receiving dollars.

If, however, X=O(step 1688), then Session Manager B sends a "Start Commit" message to A (steps 1694–1696). Tran Log A then sets its log update to unconditional (step 1698), thus committing to its transfer of dollars. The Commit protocol of FIG. 10 is then called (step 1700). During this protocol (described subsequently) B commits to both its transfers (i.e., transferring pounds and receiving dollars) and A commits to its one outstanding transfer, receiving pounds.

As can be seen, the F/X transaction commits each transfer of notes, thus keeping notes from being duplicated, which could occur if there were only one commit. The foreign exchange protocol ensures that neither party knows whose transfer (A's of dollars or B's of pounds) will be committed first. This reduces the incentive of a party to tamper with the transaction. Each transfer is committed separately, but the order of commit is chosen randomly by the two modules. A party who tries to interfere with the transaction has a 50-50 chance of losing money. Also, there is no incentive to interfere with the commit since the lost money can be reclaimed (see Claim Lost Money).

Commit

FIG. 10 shows the Commit protocol for modules. Session Manager X sends a "Ready-to-Commit" message to Y (steps 1702–1704). This passes the obligation to commit to the module receiving the message. In a conventional money transfer scenario, this technique of passing the burden of committing first is used to ensure that the party transferring money commits first, so as to eliminate the possibility of duplicating money.

Session Manager Y then sends an acknowledgment to X (steps 1706–1708) and commits to any outstanding transactions by updating its transaction log (step 1710). Also, if Y is a transaction money module, then To subscriber Y notifies the subscriber of the successful transaction (steps 1712–1714). Session Manager Y notes the end of the session (step 1716).

Tran Log X receives the acknowledgement from Y and updates its transaction log, thus committing to any outstanding transfers. X completes its commit in the same manner as Y (steps 1718–1724).

Abort Transaction

FIG. 11 shows the Abort transaction protocol for modules. Session Manager X rolls-back changes and notes that the transaction is aborted (step 1726). Session Manager X then checks if the "Ready-to-Commit" message has been sent (steps 1728–1730). If so, then X updates its transaction log (step 1732) by recording that X aborted after sending a Ready-to-Commit message and recording the note identifiers and amounts of each note received during the Transfer Notes protocol. Thus, the abort protocol logs information when the Abort subroutine is called during a failed Commit subroutine.

If X is a transaction money module 1186, and the Ready-to-Commit message was sent, then To Subscriber X informs its subscriber that the transaction was aborted and that there may have been a money transfer error (steps 1734–1738).

If X is a teller money module 1188, then To Bank X informs the bank that it should reverse its accounting transactions (by appropriate debits and credits) (steps 1740–1742). If X is a transaction money module 1186 and no Ready-to-Commit message has been sent, then To Subscriber X informs the subscriber that the transaction was aborted (step 1744).

In any event, Session Manager X then sends Y a message that the transaction cannot be completed (steps 1746–1748). Session Manager Y rolls-back its changes and notes the transaction as aborted (step 1750). Y then informs its subscriber that the transaction is aborted (steps 1752–1754) or informs the bank to reverse its accounting transaction (steps 1756–1758).

As described, if a transaction is interrupted during a commit protocol, it is possible that notes will be lost. If this occurs, the transferee will have aborted and the transferor will have committed to the transfer of notes. In this case, the transferee money module records information about the notes it should have received and notifies the subscriber that there is a potential problem (i.e, it did not receive the notes sent by A). It may be noted that in this circumstance, as far as the transferor money module is concerned, it properly transferred the notes.

The transferee money module subscriber can then make a claim for the money to the Certification Agency. The claim information would include the log record of the failed transaction. The Certification Agency could then check with issuing banks to see if the notes have been reconciled. After some period of time, if the notes have not been reconciled, the subscriber could reclaim his money.

POS Payment

Figure 12A:
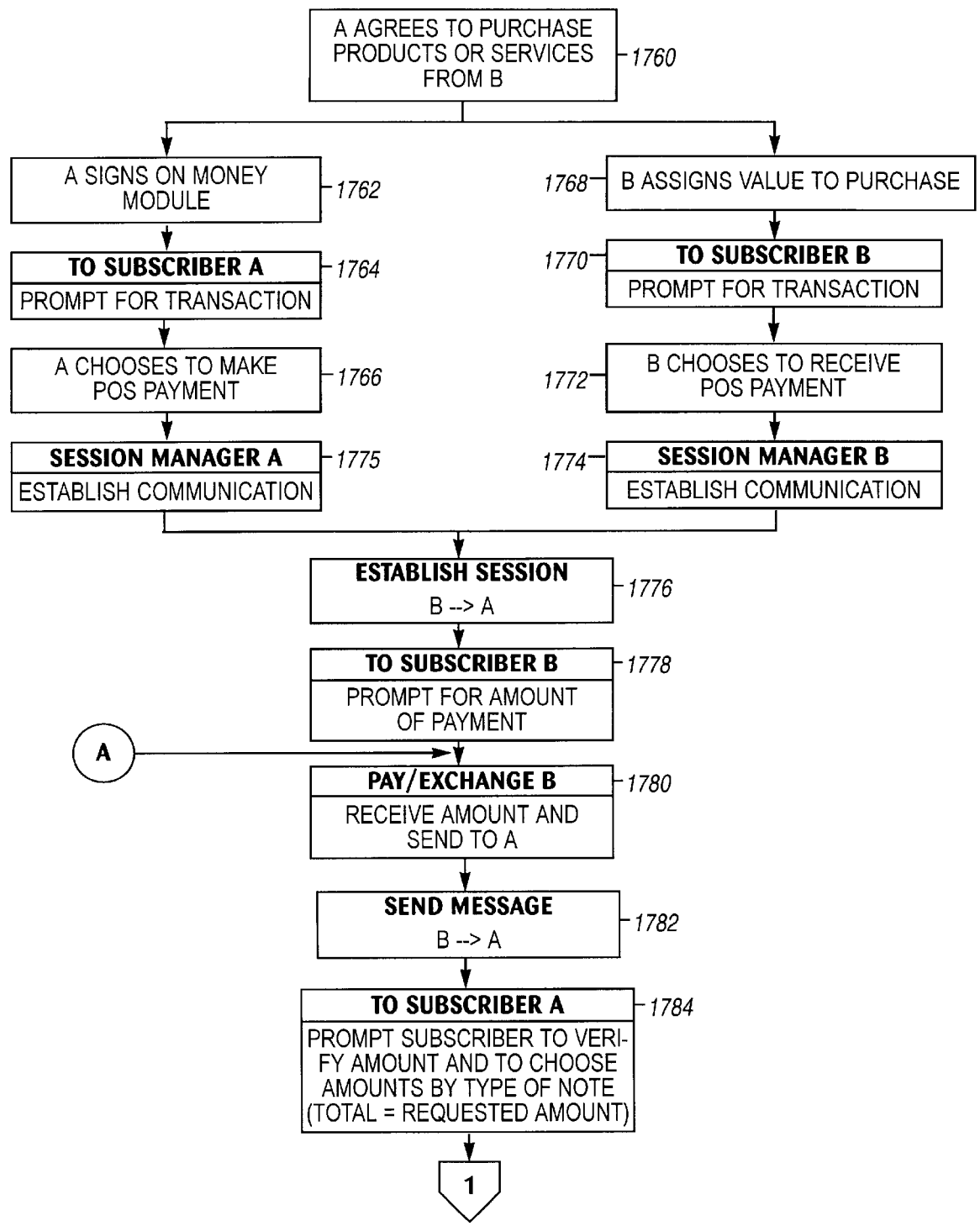
FIGS. 12A–12C illustrate a Point of Sale (POS) Payment protocol.
Figure 12B:
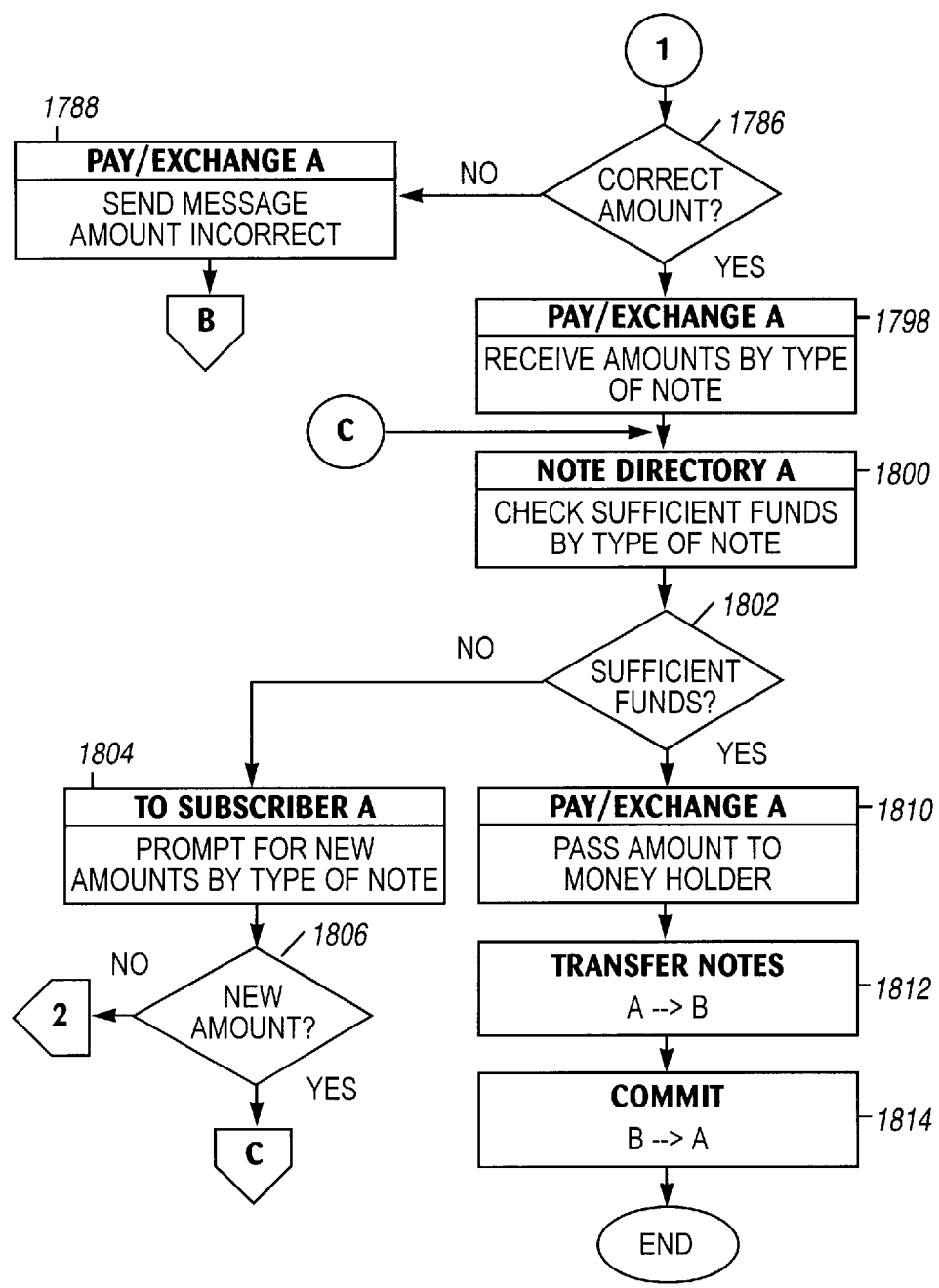
Figure 12C:
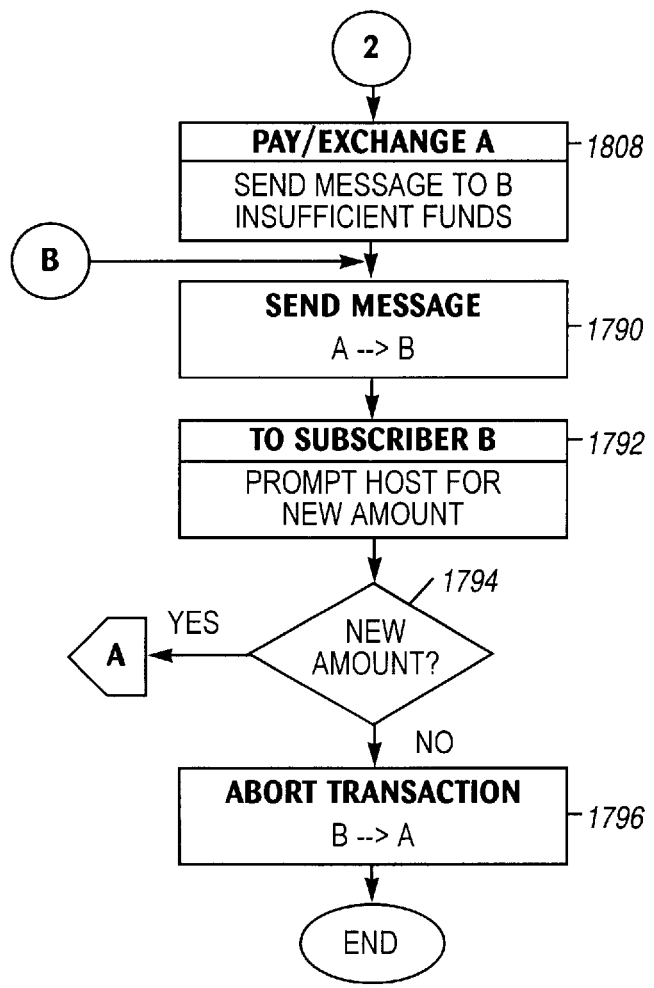

FIG. 12 shows a Point of Sale (POS) payment protocol. The POS Payment protocol is intended to simplify payments made between a buyer's transaction money module 1186 and a merchant's transaction money module 1186. The merchant's transaction money module 1186 may, for example, be located in a cash register at a supermarket.

Initially, A agrees to purchase products or services from B (step 1760). The owner/holder of transaction money module A signs onto his money module (step 1762). To Subscriber A prompts the owner/holder for a transaction and A chooses to make a POS payment (steps 1764–1766). Meanwhile, the merchant determines the total purchase price (step 1768). To Subscriber B prompts for a transaction and B chooses to receive a POS payment (steps 1770–1772). A and B then establish a secure session (steps 1774–1776).

To Subscriber B prompts for amount of payment and Pay/Exchange B receives the amount and sends it to A (steps 1778–1782). To Subscriber A then prompts its subscriber to verify the requested amount (steps 1784–1786). Moreover, the subscriber is requested to choose the notes in which it will pay (e.g., currency or credit) and the amounts so that the total equals the requested amount. If the requested amount is not correct, then Pay/Exchange A sends B a message indicating that the requested amount is incorrect (steps 1788–1790). To Subscriber B then prompts its host for a new amount (steps 1792–1794). If a new amount is not chosen then the transaction is aborted (step 1796).

If the requested amount is correct, then Pay/Exchange A receives amounts by type of note (step 1798). Note Directory A then checks for sufficient funds (steps 1800–1802). If funds are insufficient, then To Subscriber A prompts for new amounts by type of note (steps 1804–1806). If no new amount is entered, then Pay/Exchange A sends B a message that it has insufficient funds (steps 1808, 1790). To Subscriber B prompts host for new amount (steps 1792–1794). If no new amount is selected, then the transaction is aborted (step 1796). If a new amount is selected, then the payment transaction begins again.

If funds are sufficient, then Pay/Exchange A passes the amount to the money holder (step 1810). The notes are then transferred from A to B (step 1812). Finally, the transaction money modules commit (step 1814).

As can be seen, the POS payment is simplified for the buyer because it is a payee initiated payment. Generally, the POS payment would be used for payment to merchants for goods while the subscriber-to-subscriber (STS) payment would be used to pay individuals or to pay bills.

Update Credit from Issuing Bank

Figure 13A:
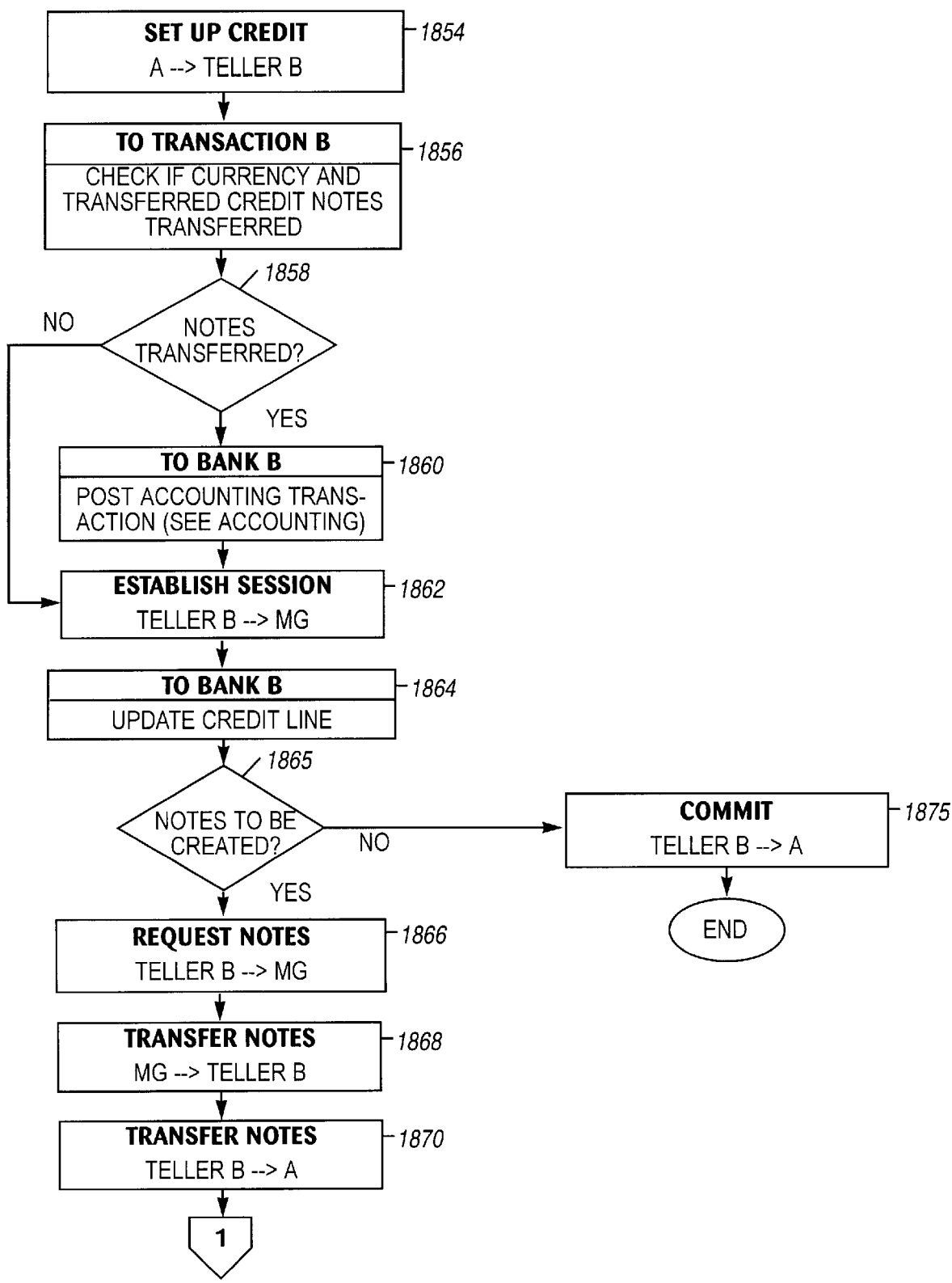
FIGS. 13A–13B illustrate an Update Credit form Issuing Bank protocol
Figure 13B:
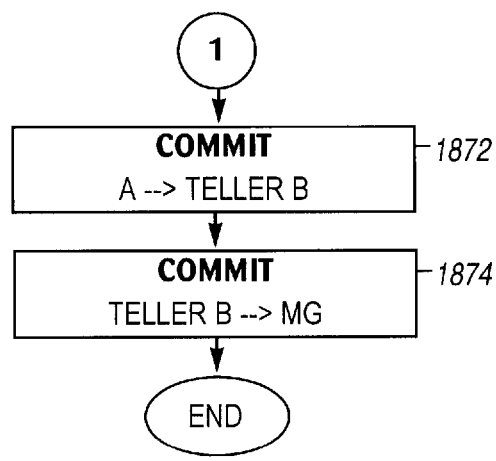

FIG. 13 shows an Update Credit from Issuing Bank transaction protocol, and particularly describes how subscribers acquire a credit note which is a preauthorized credit payment vehicle. A subscriber can carry up to one credit note for each credit account the subscriber owns. Note that every bank which allows a subscriber to receive updated credit notes is an issuing bank for those credit notes.

Figure 14:
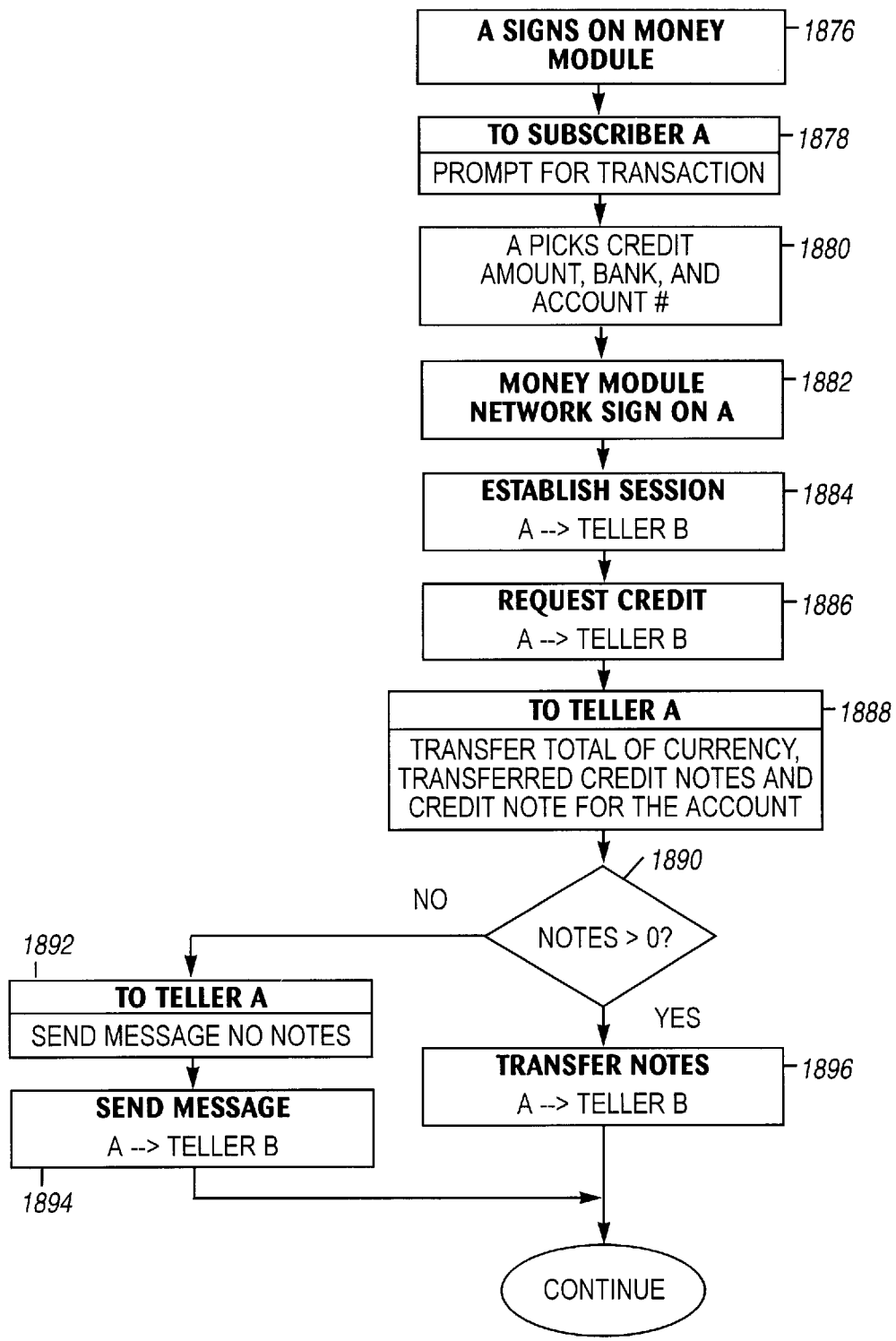
FIG. 14 illustrate a setup Credit protocol.

The process flow to set up an update credit transaction begins with a Setup Credit process between a money module A and a bank's Teller money module B, (step 1854), which is now described further with reference to FIG. 14.

Setup Credit

The Setup Credit Withdrawal process begins when owner/holder of transaction money module A decides to make a credit update and thus signs onto his money module (step 1876). For instance, subscriber A may possess a credit note but wish to change (e.g., increase or decrease) the credit amount including decreasing the amount to zero, or may not currently possess a credit note but wish to acquire one. To Subscriber A prompts the owner/holder for a transaction, and A chooses to make a credit update of a particular amount from a particular bank and account (steps 1878–1880). In this implementation, the credit update amount specified by subscriber A is the total credit amount that subscriber A wishes to carry. Then, the Transaction money module A initiates a procedure for communicating with the bank that was selected by engaging the network via the Network Sign On procedure described hereinabove (step 1882).

Figure 15A:
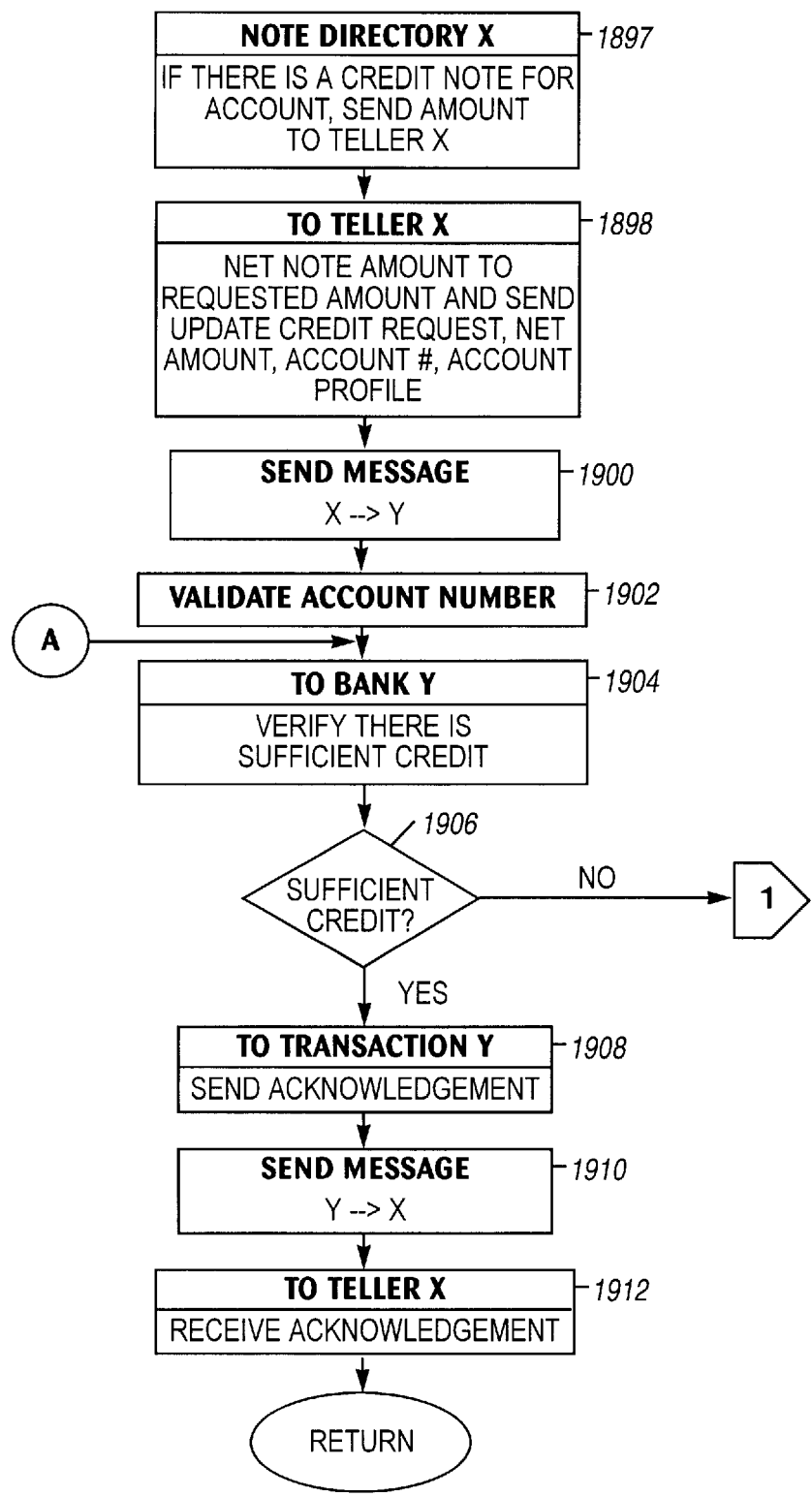
FIGS. 15A–15B illustrates a Request Credit protocol.

After the steps of money module sign-on, transaction selection, and network sign-on are completed, A and B then establish a secure session (step 1884). Then, Transaction money module A makes a credit request from the Teller money module B (step 1886), according to a Request Credit procedure more fully described with reference to FIG. 15.

Request Credit

Referring now to FIG. 15, a process for requesting credit will now be described. It should be noted that although the figure denotes the parties as "X" and "Y," in the process steps described below, they are applicable to any money module transacting with a Teller money module.

To begin, if there is a credit note for the selected account Note Directory X sends the amount of this credit note to To Teller X (step 1897). To Teller X determines the net difference between the total credit amount requested by subscriber A and the credit note amount and sends a credit update request to the Teller money module, requesting a certain net amount of credit to be authorized from a specific account. In its transmission of the update credit request, the account number and the account profile will be transmitted from the requesting money module to the Teller money module along with the net credit amount (step 1898). This message is sent according to the Send Message protocol (step 1900), in which the message is encrypted using the described cryptographic techniques.

Once the credit withdrawal request and the account number and profile are transmitted to the Teller money module, a procedure to validate the account number is initiated (Step 1902). A flow diagram depicting how an account number is validated is shown in FIG. 20, which is described separately below for clarity of exposition.

With the account information validated, To Bank Y verifies that there is sufficient credit to support the credit update request amount (Step 1904). Sufficient credit will prompt To Transaction Y to send an acknowledgement to X, which receives the acknowledgement via its To Teller application function (steps 1906–1912).

Figure 15B:
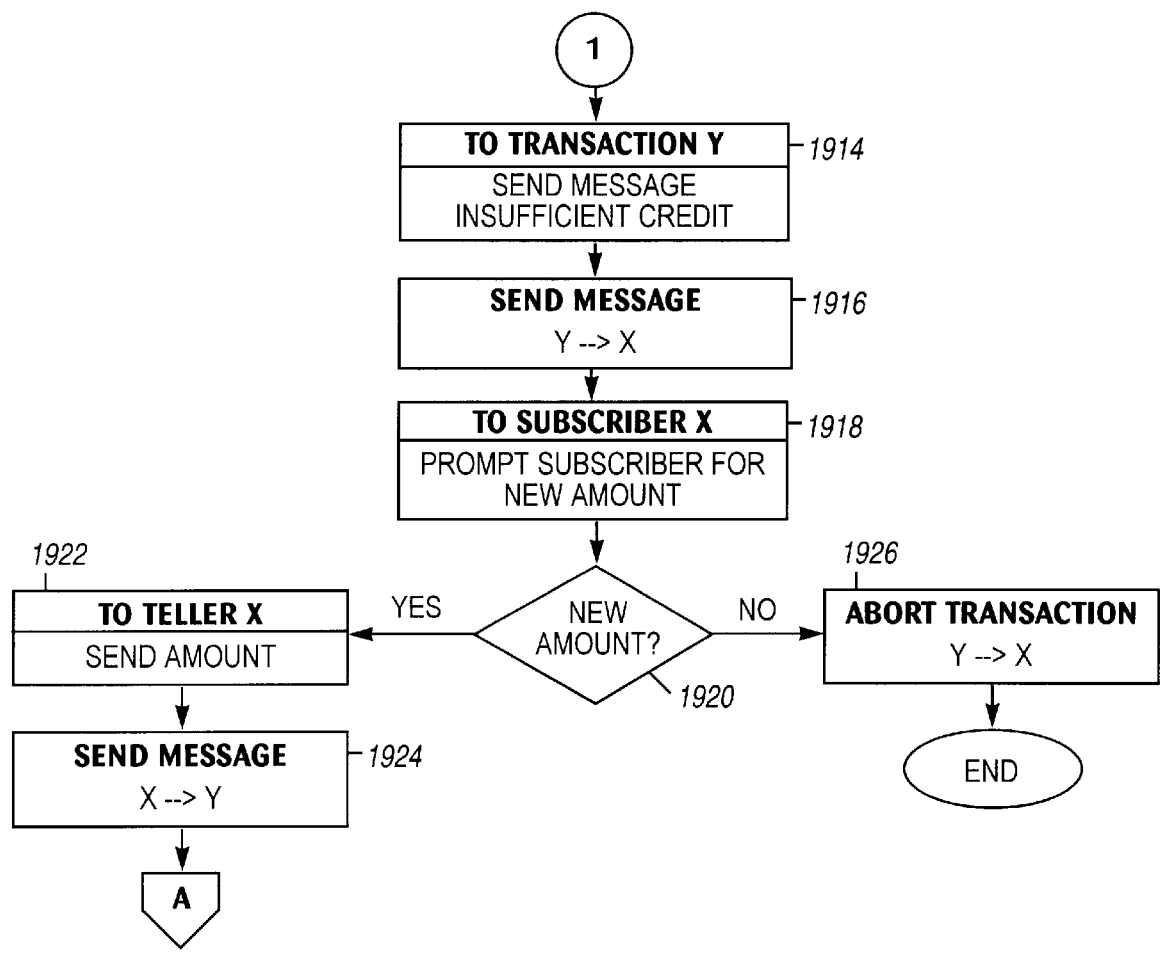

An insufficient amount of credit, however, will cause the subscriber to be prompted to enter a new amount for the credit update (steps 1914–1918, FIG. 15B). Entry of a new amount for credit update by the subscriber results in the To Teller application sending the new credit amount to the To Bank application of the Teller money module to verify if there are sufficient funds to cover the latest requested amount (steps 1922–1924), returning to Step 1904 of FIG. 15A. If no new amount is requested by the subscriber, then the transaction is aborted (step 1926).

Referring back to FIG. 14, upon return from the Request Credit Withdrawal process, To Teller A invokes a transfer of the total currency notes, transferred credit notes (i.e., credit notes received in previous transactions) and credit note for the account to the Teller money module (Step 1888). If there are no notes being held in the Transaction money module at the time the credit withdrawal request is made, the To Teller A application sends a message to the Teller money module that there are no notes present (steps 1892–1894). If there are notes being held in the Transaction money module, however, then the electronic notes are transferred from A to Teller B according to the Transfer Notes procedure described hereinabove with reference to FIG. 8 (step 1896).

Returning to FIG. 13, To Transaction B checks if any currency notes and transferred credit notes have been transferred (steps 1856–1858), and if any of these type of notes have indeed been transferred from Transaction money module A, accounting transactions are posted to reflect this situation by the To Bank application B (step 1860). Both in the case when no notes have been transferred from the money module and after the accounting transactions are posted in step 1860, a session is established between the Teller money module and the Money Generator module (step 1862). To Bank B updates the credit line by adding the amount of the credit note (if any) to the available line of credit to get the total available credit and deducting the requested credit amount from the total available credit. If no notes (including currency notes and credit notes) are to be created because the requested credit amount was zero and no currency notes were transferred, then the money modules will finalize the transaction according to the Commit procedure described hereinabove with reference to FIG. 10 (steps 1865–1875).

If, however, any notes (credit or currency) are to be created, due to a nonzero credit amount request and/or transferred currency notes, then notes are requested by Teller B from Money Generator module according to the Request Notes procedure (steps 1865–1866). The requested notes in the Money Generator module are transferred to the Teller money module B using the Transfer Notes process outlined above (see FIG. 8) for transferring electronic notes (step 1868). The notes are then transferred from the Teller money module B to the Transaction money module using the same Transfer Notes process (step 1870). Finally, to successfully complete the update credit procedure, the money modules will finalize the transaction according to the Commit procedure described hereinabove with reference to FIG. 10. The Commit process is initiated first by the Transaction money module committing its transaction with the Teller money module B (step 1872). Then, the Commit process is executed between Teller money module B and the Money Generator module (step 1874). That completes the processing for one complete credit update from an Issuing Bank.

Money Issued Reconciliation

The process of note reconciliation checks for note counterfeiting and duplication, and is described with reference to FIG. 16 and FIG. 17. The Money Issued Reconciliation system, based on the information stored in the Money Issued Master file, constructs a note transfer tree which models the transfer history of the note.

Figure 16:
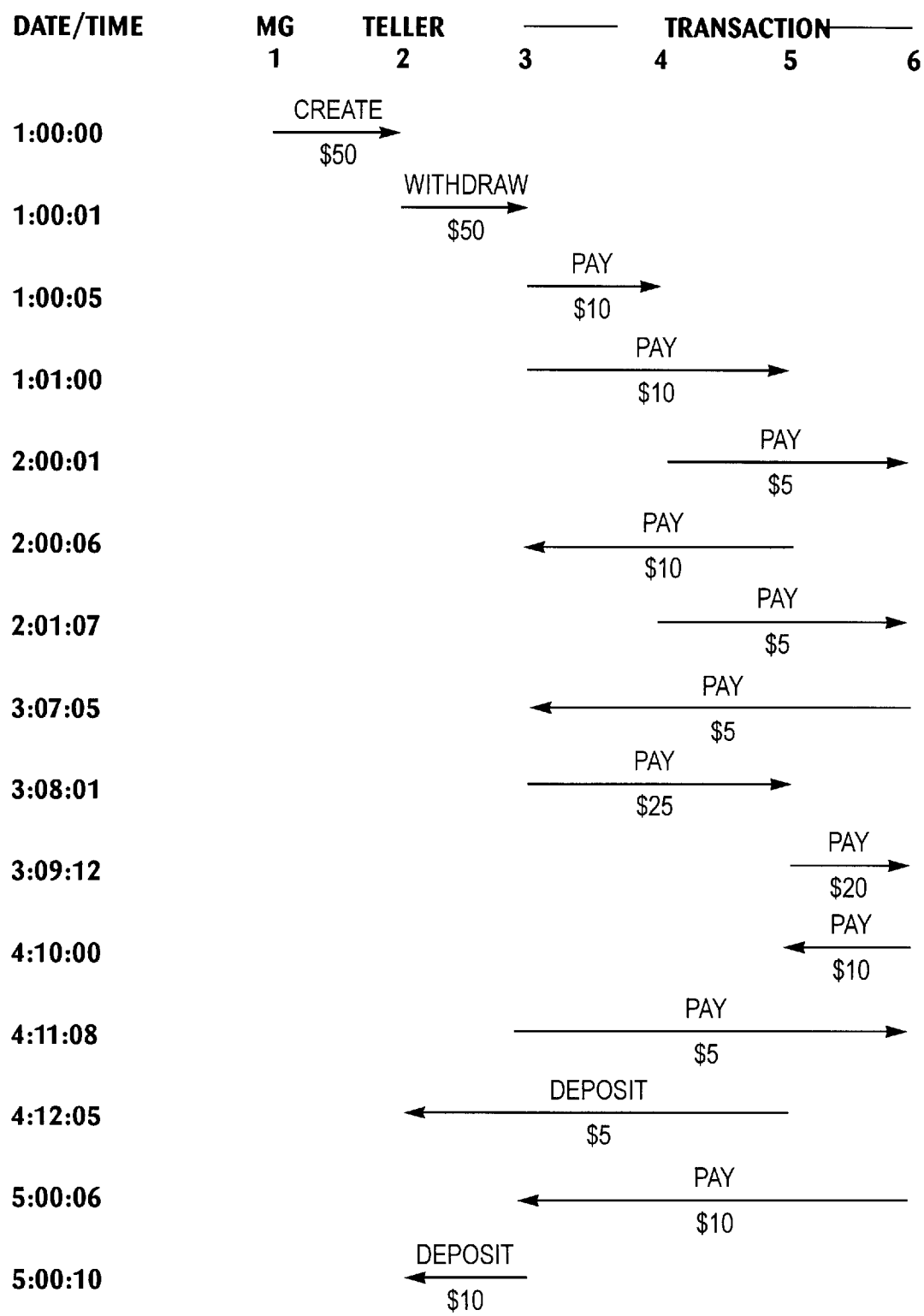
FIG. 16 shows an example of a Note Transfer History.

FIG. 16 schematically illustrates a hypothetical series of transactions among a Money Generator Module having an identifier number "1" (referred to as Money Generator 1), a teller money module having identifier "2" (referred to as teller module 2), and four transaction money modules having integer identifiers 3 through 6 (referred to as transaction modules 3–6), associated with a single note generated by Money Generator 1 at the date/time indicated by 1:00:00.

Figure 17:
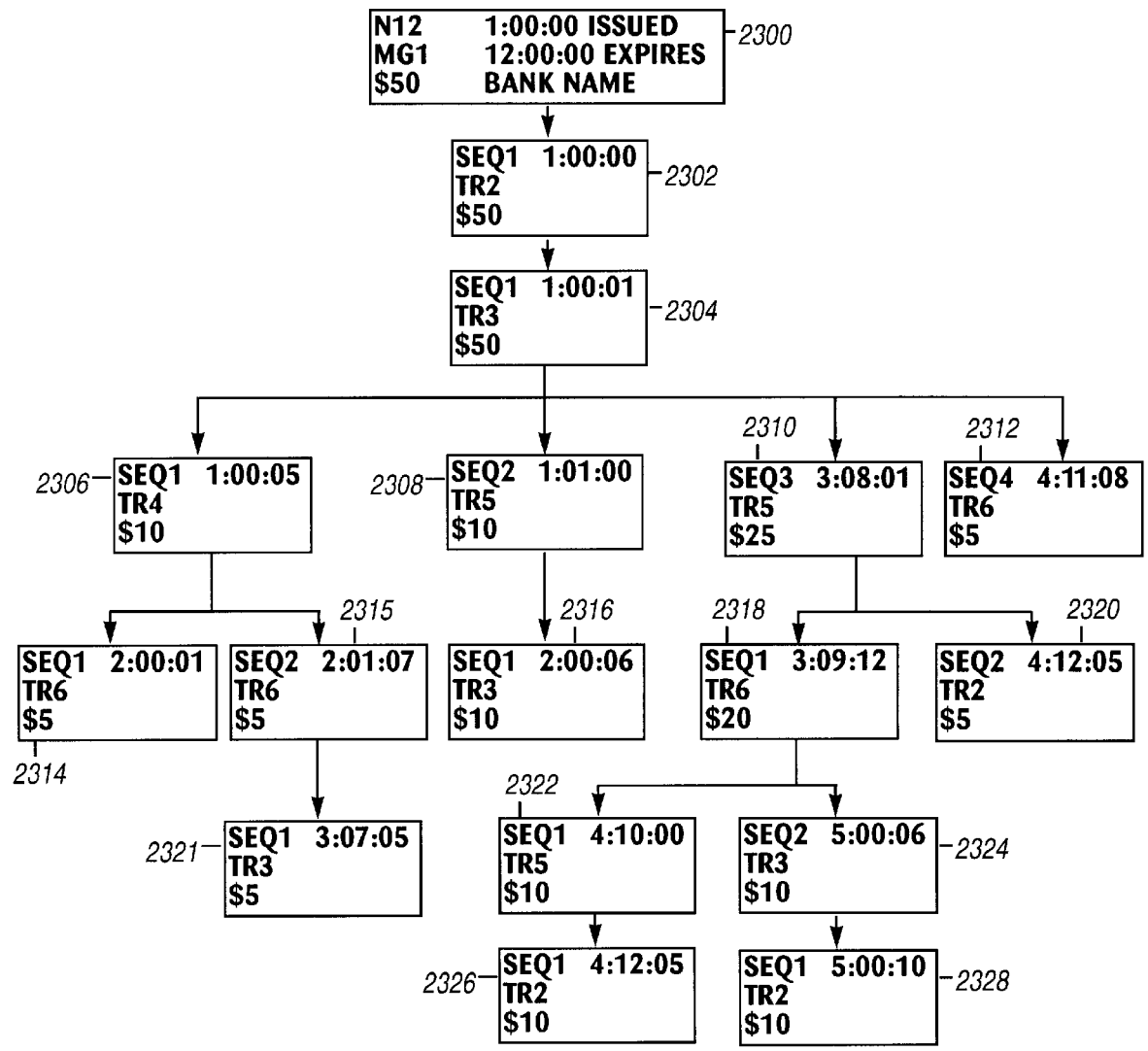
FIG. 17 illustrates a Note Transfer Tree.

In accordance with the example of a transfer history shown in FIG. 16, FIG. 17 illustrates how the transfer of an electronic representation of currency produces a tree-like structure of electronic representations of currency derived from the initial note produced by a money generator module. As individual transfers (part of a tree branch) of the note are deposited or return to the banking system according to note updating, the note transfer tree in FIG. 17 is built by the Money Issued Reconciliation system. In this example, money generator 1 (module identifiers are contained in digitally signed certificates) produces an electronic representation of currency 2300 having a body group of data fields and a transfer group of data fields, which are shown schematically in part for purposes of clarity of exposition. In addition, the signatures and certificates group of data fields is not shown for convenience.

The body group of data fields includes a note identifier (e.g., "N12"), a money generator module identifier (e.g., "MG1"), an issuing bank identifier (e.g.,"Bank Name"), a date-of-issue (e.g., 1:00:00), a date-of-expiration (e.g., 12:00:00), a note amount and a monetary unit identifier (e.g., $50). Other body group data fields such as type of note are not shown for convenience. The various date fields in the electronic notes are shown for illustrative purposes as being in the form day:hr:min. Other time monitoring forms (e.g., including seconds) are, of course, possible.

The transfer group of data fields includes a transfer record having a transferee identification number, a date-of-transfer, and a transfer amount. The transfer group also preferably includes a sequence number which is incremented by the note directory of the transferor after each transfer. Normally, the date/time and transfer id of the transfer should be sufficient to uniquely identify a transfer. However, it might be possible that a transfer, transferee id, date/time, and amount could duplicate if there is a time adjustment between transfers and the same amount is transferred to the same module. Thus, to avert this potential problem, a sequence number (seq) is preferably added to the transfer record and the note directory to uniquely identify the transfer. The sequence number will be incremented by the note directory after every transfer. If a sequence number is reset, then this would be detected as a duplicate.

Thus, when electronic representation of currency 2300 is transferred to teller module 2, transfer record 2302 is appended to the transfer group, and includes the transferee identification number (e.g., "2"), the date-of-transfer (e.g., 1:00:00), the transfer amount (e.g., $50), and the sequence number (e.g., "1"). For illustrative convenience, the note transfers represented in FIG. 17 only show the newly appended transfer record portion of the transferred note. Also for convenience, the transfer group data field indicating total number of transfers is not shown.

The electronic representation of currency 2300 from money generator 1 is stored in a teller module 2. As part of the withdrawal of $50 by transaction module 3, teller module 2 forms an electronic representation of currency by appending transfer record 2304 to a copy of the data fields in the electronic representation of currency 2302 augmented by transfer record 2302. This note is then stored in transaction module 3 upon completion of the withdrawal. It may be understood that each node of the note transfer tree shows the newly appended transfer record portion of the transferred note.

As represented by the note transfer tree, at 1:00:05, transaction module TR3 pays $10 by transfer record 2306 to transaction module 4. At 1:01:00, transaction module 3 pays $10 by transfer record 2308 to transaction module 5. At 3:08:01, transaction module 3 pays $25 by transfer record 2310 to transaction module 5. At 4:11:08, transaction module 3 transfers $5 by transfer record 2312 to transaction module 6.

At 2:00:01, transaction module 4 transfers $5 by transfer record 2314 to transaction module 6. At 2:01:07, transaction module 4 transfers an additional $5 by transfer record 2315 to transaction module 6, which in turn, at 3:07:05 transfers $5 by transfer record 2321 to transaction module 3.

At 2:00:06, transaction module 5 transfers the entire $10 note to transaction module 3 by transfer record 2316. From the $25 note received at 3:08:01 by transaction module 5 from transaction module 3, at 3:09:12 transaction module 5 pays transaction module 6 $20 by transfer record 2318, and deposits the remaining $5 to teller module 2 at 4:12:05 by transaction record 2320.

At 4:10:00, transaction module 6 transfers $10 to transaction module 5 according to transfer record 2322, and at 5:00:06 transfers the remaining $10 to transaction module 3 by transfer record 2324. In accordance with an embodiment of the present EMS, it is understood that upon deposit of money from a transaction module to a bank, all notes (including credit notes) in the transaction module are sent to the banking system and are updated. Therefore, substantially simultaneous with the above described deposit from transaction module 5 to teller module 2 represented by transfer record 2320, an additional and concurrent transfer represented by transfer record 2326 occurs automatically. Then, a new note having a value of $5 (assuming transaction module 3 had no credit notes) will be generated by money module 1 and transferred to transaction module 3 via teller module 2, with the appropriate transfer records appended (not shown). Accordingly, it may be appreciated that updating all notes in a transaction money module upon a transaction (e.g., deposit or withdrawal) between the transaction module and a teller module facilitates the note reconciliation process by providing an additional means for returning notes to the banking system.

At 5:00:10 transaction module 3 deposits $10 to teller module 2 by transaction record 2328. As described above for the deposit by transaction module 5, concurrent with the deposit by transaction module 3 represented by transaction record 2328, additional and concurrent transfers (not shown) to the banking system of all notes possessed by transaction module 3, including those represented by transfer record 2316 and transfer record 2321, occurs. Then, the banking system returns to transaction module 3 a note having a value equal to the total notes sent to the banking system for updating (e.g., $15).

Thus, at this point in time, only transaction module 6 possesses transferable vestiges of original note 2300, as represented by transfer notes 2312 and 2314. If transaction module 6 transacts (e.g., deposit or withdrawal) with a teller module before transferring these notes to other transaction money modules, then there will be no transferable notes in circulation that relate to original note 2300; all notes derived from transfers of original note 2300 will have been returned to the banking system, permitting complete construction of the note transfer tree shown in FIG. 17. The date-of-expiration effectively facilitates note reconciliation by limiting the time that a note may be transferred.

From the note transfer tree, it may be understood that if the note were counterfeit then there would be no note body to match the first piece deposited. If a transfer were duplicated then the transfers below would sum to a value greater than the superordinate transfer amount. For example, if transaction module 6 transferred $20 to transaction module 3 at 5:00:06, instead of $10 (i.e., transfer record 2324), then the transfers below transfer record 2318 (i.e., SEQ1, 3:09:12, TR6, $20) would sum to $30 denoting that transaction module 6 had duplicated the transfer.

Link Money Module to Bank Account(s) for Bank Access

Figure 18A:
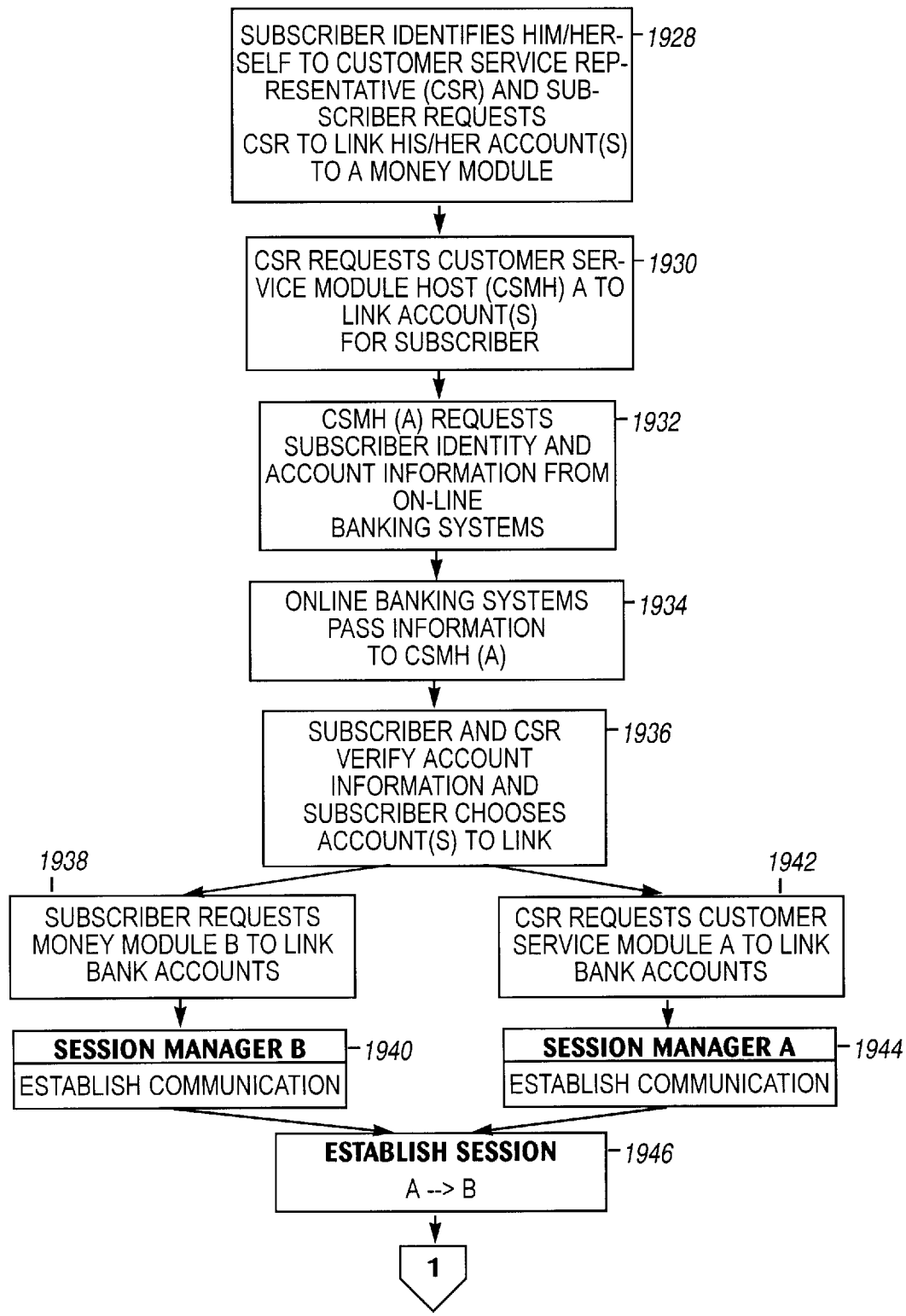
FIGS. 18A–18C illustrates a Link Money Module to Bank Account(s) for Bank Access protocol.
Figure 18B:
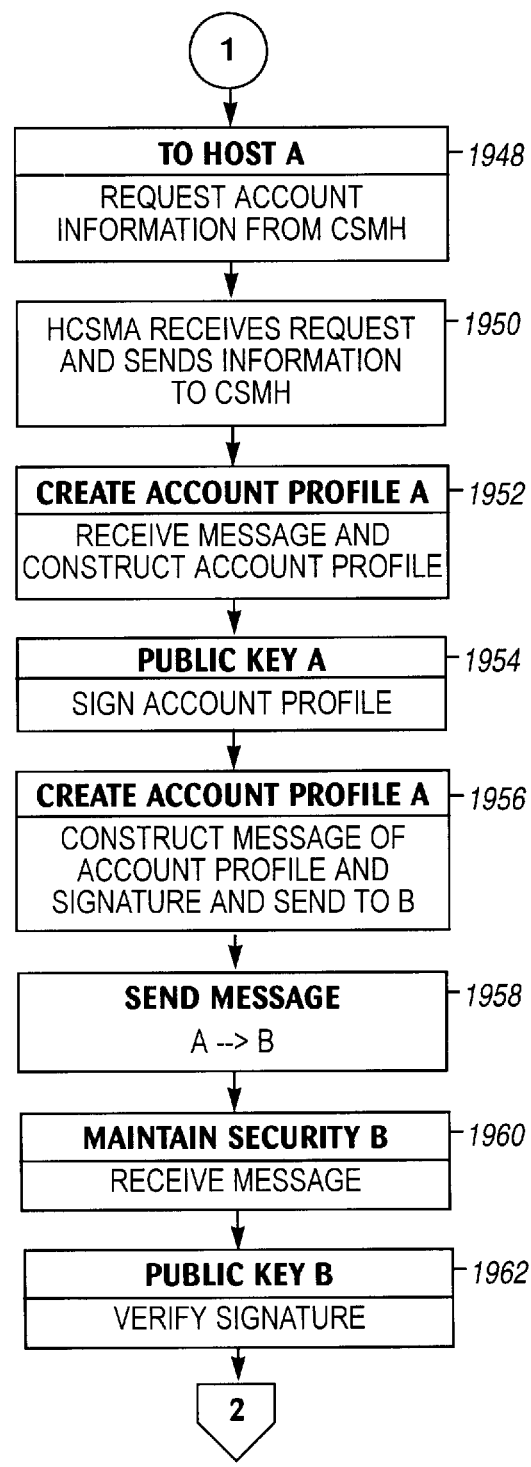
Figure 18C:
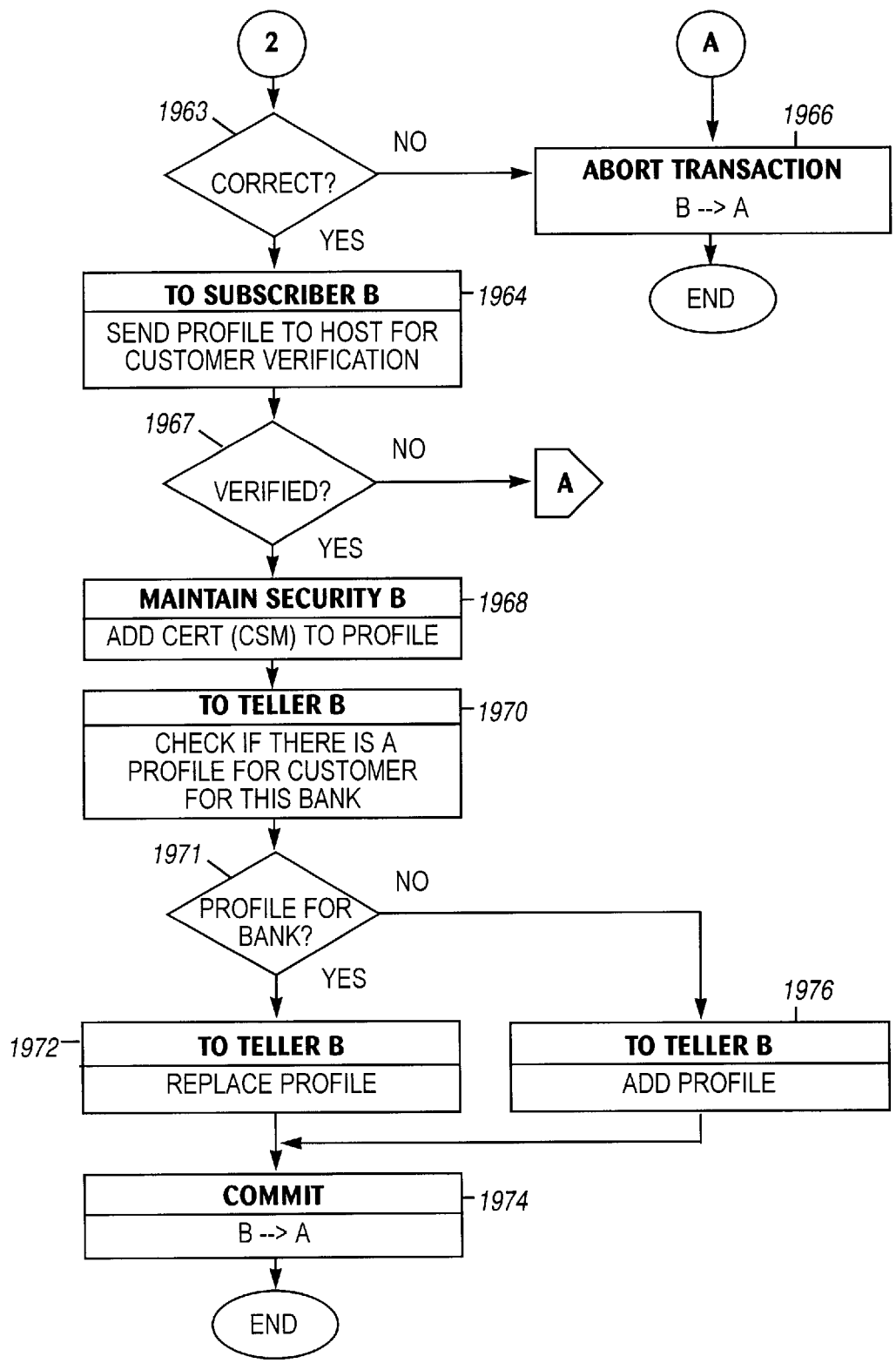

FIG. 18 shows the protocol for linking a money module to bank accounts for bank access. The process begins when a subscriber identifies him/herself to a customer service representative (CSR) and requests that the CSR link the subscriber's accounts to a money module (step 1928). The CSR enters a request into CSM host A (CSMHA) to link accounts for the identified subscriber, and CSMHA accesses the identified subscriber's account information from the bank systems (steps 1930–1934). Then, the subscriber and the CSR verify the account information, and the subscriber selects which accounts to link to the money module (step 1936).

After the subscriber requests that his/her money module B link bank accounts and the CSR requests, via CSMHA, that CSMA link bank accounts, a secure session is established between the subscriber's money module B and the CSMA (steps 1938–1946). Then, in response to a request from To Host A of CSMA, HCSMA sends the account information to CSMA, which receives the account information and constructs an account profile therefrom (steps 1948–1952). Public Key A then signs the account profile, and Create Account Profile constructs a message from the account profile and signature and sends this message to money module B (steps 1954–1958). Maintain Security B receives the message, and Public Key B checks the digital signature on the message (steps 1958–1962). If the signature is invalid, then the session is aborted (step 1966).

If the signature is valid, then To Subscriber B sends the profile to the host in order for the customer to verify the account profile. If the customer does not affirm the account profile, then the transaction is aborted. If the customer affirms the account profile, Maintain Security B adds the CSM certificate to the account profile (step 1968).

To Teller B then checks to determine whether an account profile is already stored for the bank associated with the recently created ("new") account profile. If an account profile for the bank already exists in the To Teller B application, then it is replaced by To Teller B with the new account profile; otherwise, To Teller B adds the new account profile. (Steps 1970–1974).

Revalidate Money Module Link to Bank Accounts

Figure 19A:
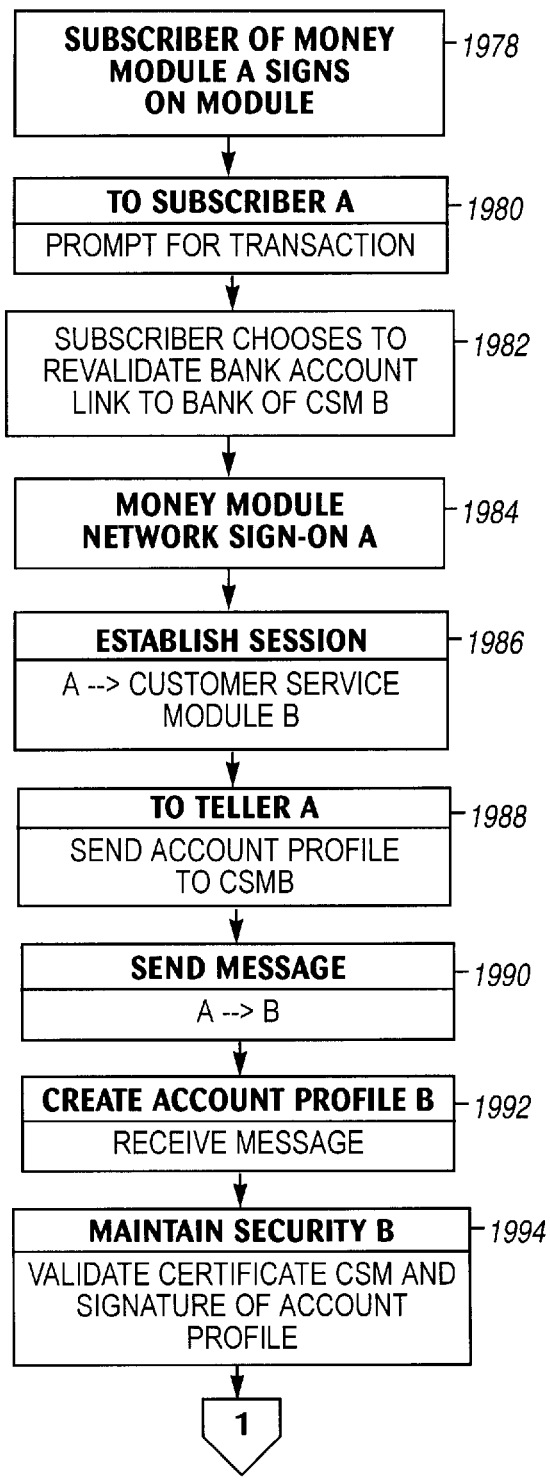
FIGS. 19A–19C illustrate a Revalidate Money Module Link to Bank Account(s) protocol.
Figure 19B:
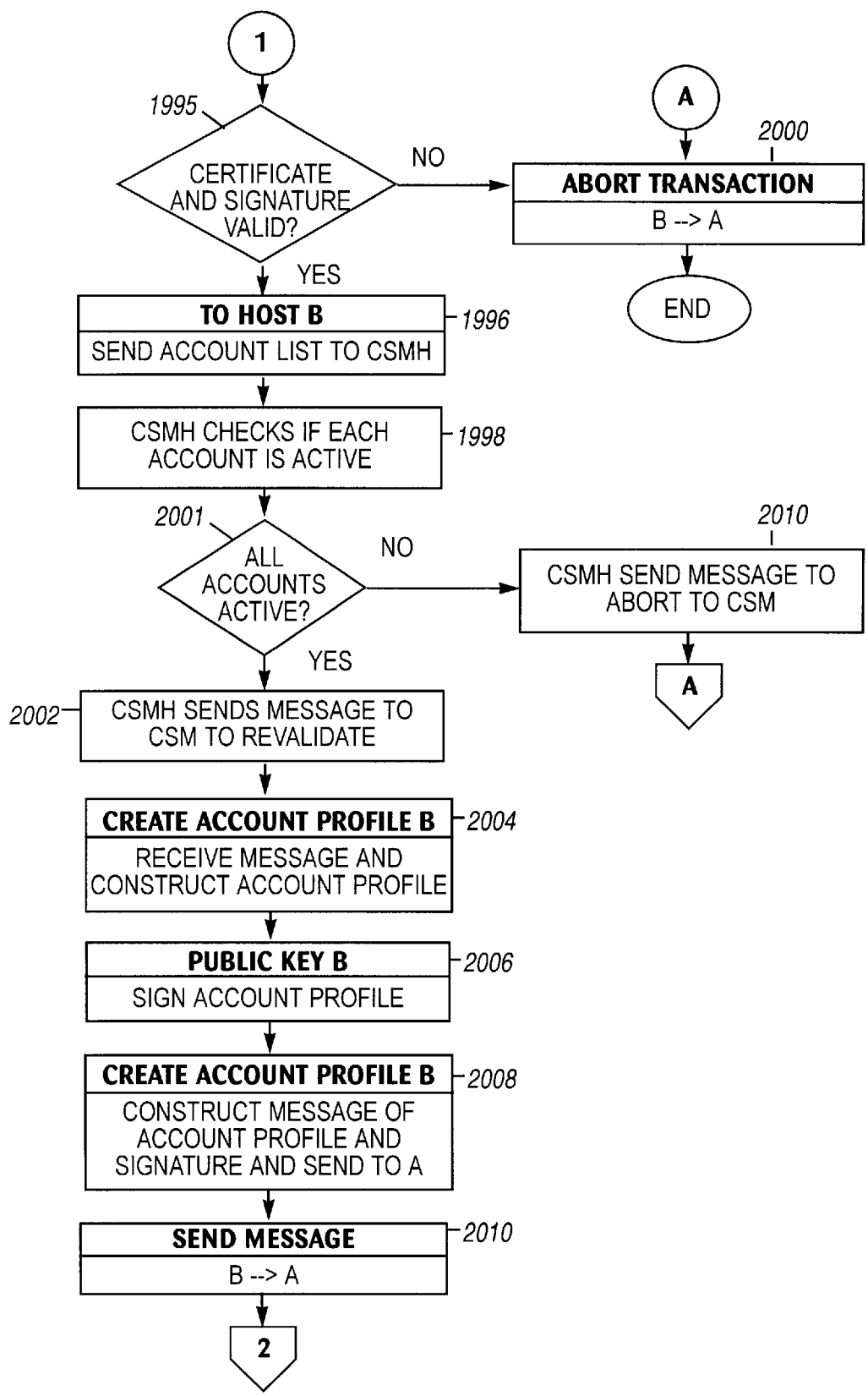
Figure 19C:
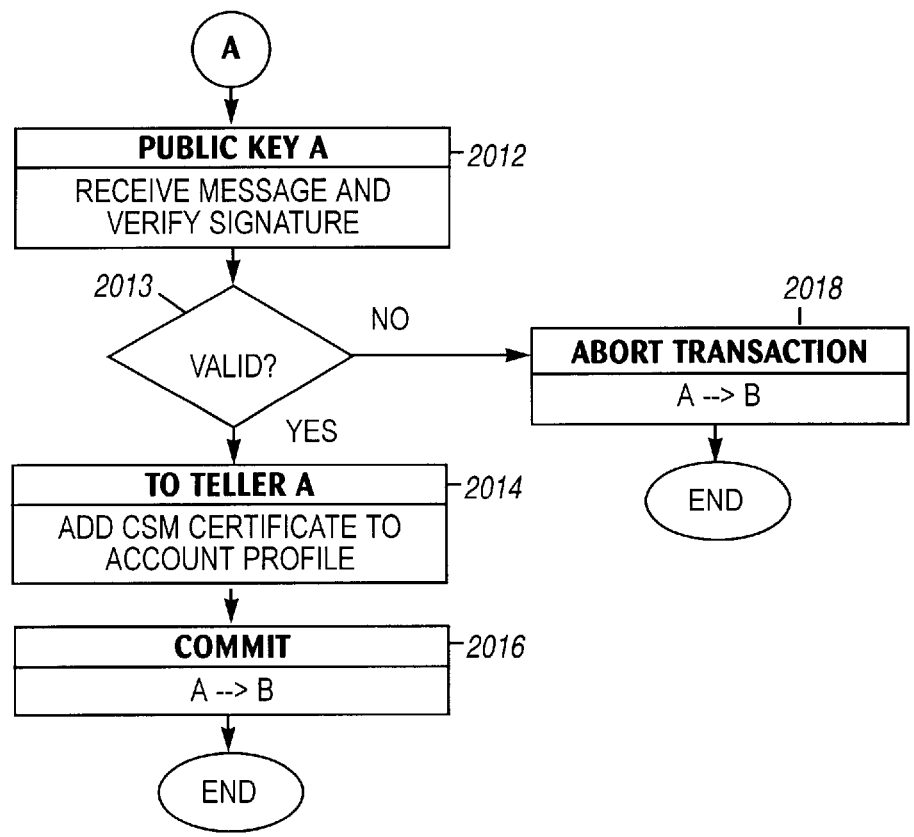

FIG. 19 shows the protocol for a subscriber to revalidate the subscriber's money module link to bank accounts. The process begins when the subscriber signs on to his/her money module, and in response to a prompt for a transaction generated by To Subscriber A, the subscriber chooses to revalidate a bank account link for a bank associated with a customer service module (CSM) B (steps 1978–1982). The money module invokes and executes the network sign-on protocol described with reference to FIG. 6, hereinabove, and a secure session is established between money module A and CSMB (step 1986). To Teller A then sends the account profile for the bank accounts to CSMB (steps 1988–1990). Create Account Profile B receives the message, and Maintain Security B validates the CSM certificate and the signature of the account profile (steps 1992–1995). If the certificate or signature is invalid, then the CSM aborts the transaction (step 2000). If the certificate is valid, To Host B sends the list of accounts from the account profile to the CSM host (CSMH), which checks with the on-line banking system to determine whether each account is currently active (steps 1996–2001). If any of the accounts has expired, CSMH signals an abort message to CSM (step 2010), which then aborts the transaction according to the Abort process (step 2000).

If all the accounts are active, then CSMH signals a revalidate instruction to CSM, and Create Account Profile B receives the message and constructs an account profile from the account information (steps 2002–2004). Public Key B then signs the account profile, and Create Account Profile B constructs a message from the account profile and signature and sends this message to money module A (steps 2006–2010). Public Key A receives the message and verifies the digital signature (step 2012). If the signature is invalid, money module A aborts the transaction (step 2018); if it is valid, the profile signature and the CSM certificate is added to the account profile (step 2014), and money module A commits the transaction (step 2016).

Validate Account Number

Figure 20:
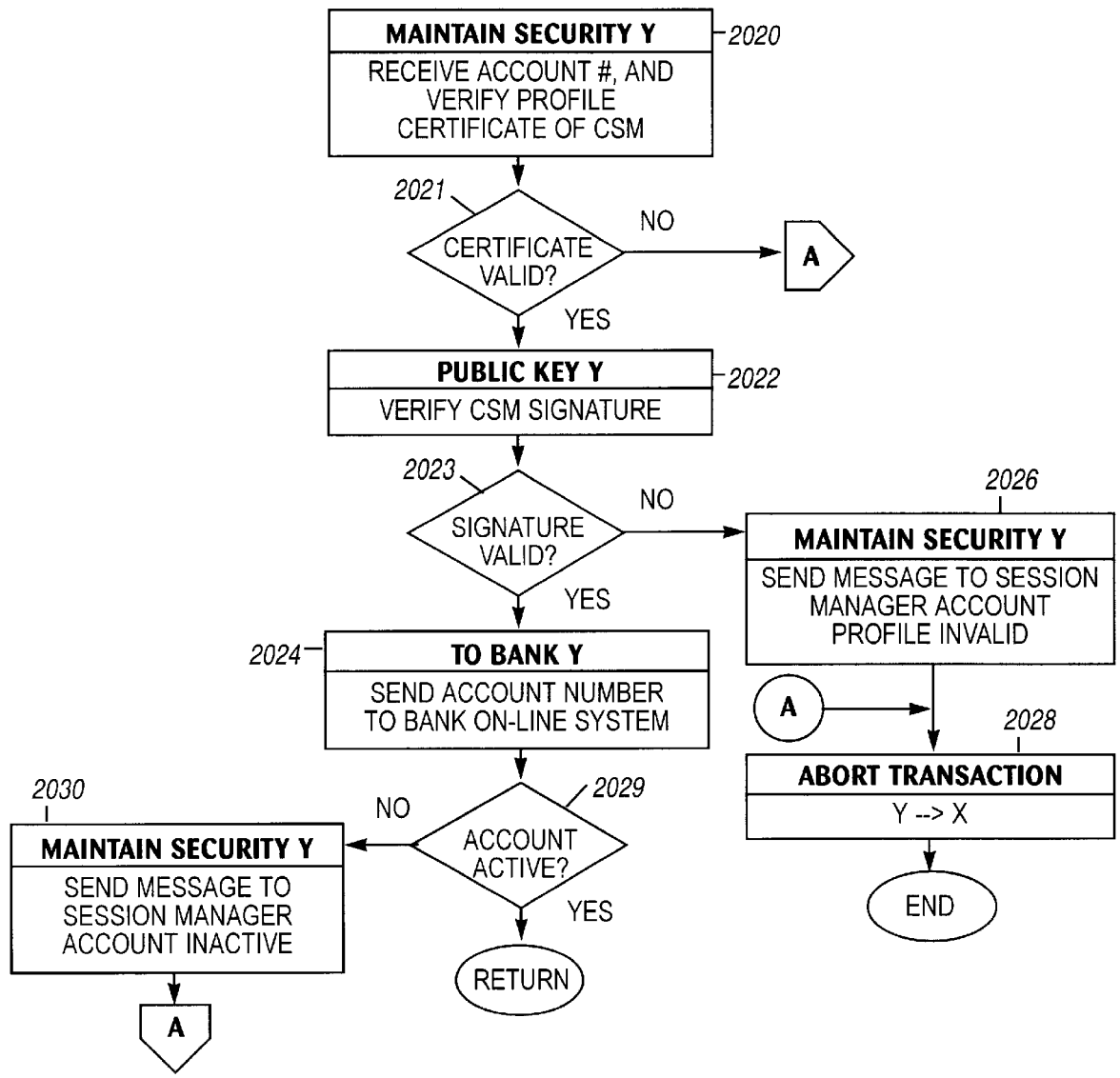
FIG. 20 illustrates a Valid Account Number protocol.

In accordance with an embodiment employing a customer services module (CSM), which is described hereinabove, a flow diagram depicting how an account number is validated is shown in FIG. 20.

In this process, Maintain Security Y receives the account number and account profile, including the CSM certificate, and verifies the CSM certificate (step 2020). An invalid certificate causes the transaction between the two money modules to be aborted (step 2028).

If the certificate is valid, Maintain Security Y conveys the account profile to Public Key Y to verify the CSM signature (steps 2022). An invalid signature causes Maintain Security Y to inform the Session Manager that the account profile is invalid (Step 2026), and the transaction between the two modules is aborted (step 2028).

If the signature test confirms a valid signature, the procedure advances to To Bank Y which sends the account number it has received to the bank's on-line computer system (step 2024). An inactive account will cause Maintain Security Y to inform the Session Manager of the inactive account (step 2030) and have the transaction aborted (step 2028); an active account will cause the Validate Account Number process to return to the next step in the operational flow that invoked the Validate Account Number process.

As can be seen, the Validate Account Number process is simplified for the Teller money module as compared to an embodiment that does not include a CSM.

Claim Lost Money

As has been discussed, electronic money could be lost for any of several reasons, including: (1) the money module is damaged and no longer functions; (2) the money module is lost or stolen; or (3) the commit fails. It is important to the utility of a monetary system that the subscriber to the system feel confident that their money is safe. Thus it is important that the transferee be able to reclaim money lost through system failure. Being able to replace money when the money module is damaged would improve confidence since electronic failure is more likely than the loss of a paper by physical damage. Replacing money because of mishaps due to a lost or stolen money module is more problematic. Allowing such claims could invite widespread claims on the system, since subscribers would not take precautions against loss.

In any case, the presently disclosed EMS has methods that allow money lost in either of these cases to be replaced. In the first two cases (i.e., cases (1) and (2) above), the subscriber would have to periodically create a lost note(s) claim (see FIG. 21) which could be stored outside the money module. Upon failure, the claim could be submitted with the subscriber's identity to an issuing bank (see FIG. 22). The claim would contain the last known state of the subscriber's money module. A description of the claimed notes could be validated and distributed to the issuing banks. The issuing banks could replace the money after a period of time if the claimed notes have not been deposited.

In the case wherein the commit fails (i.e., case (3)), the claim is created interactively between the money module and a customer service module, if the money module is still functioning (see FIG. 22). This claim, as in cases (1) and (2), is passed to the Money Issued Investigation System, which monitors the claim against money deposited. The issuing banks can feel confident in replacing lost money because they can monitor the incoming money against fraudulent applications and they have the applicant's identity.

These methods are more fully described with reference to FIG. 21 and FIG. 22.

Create Lost Note(s) Claim

Figure 21A:
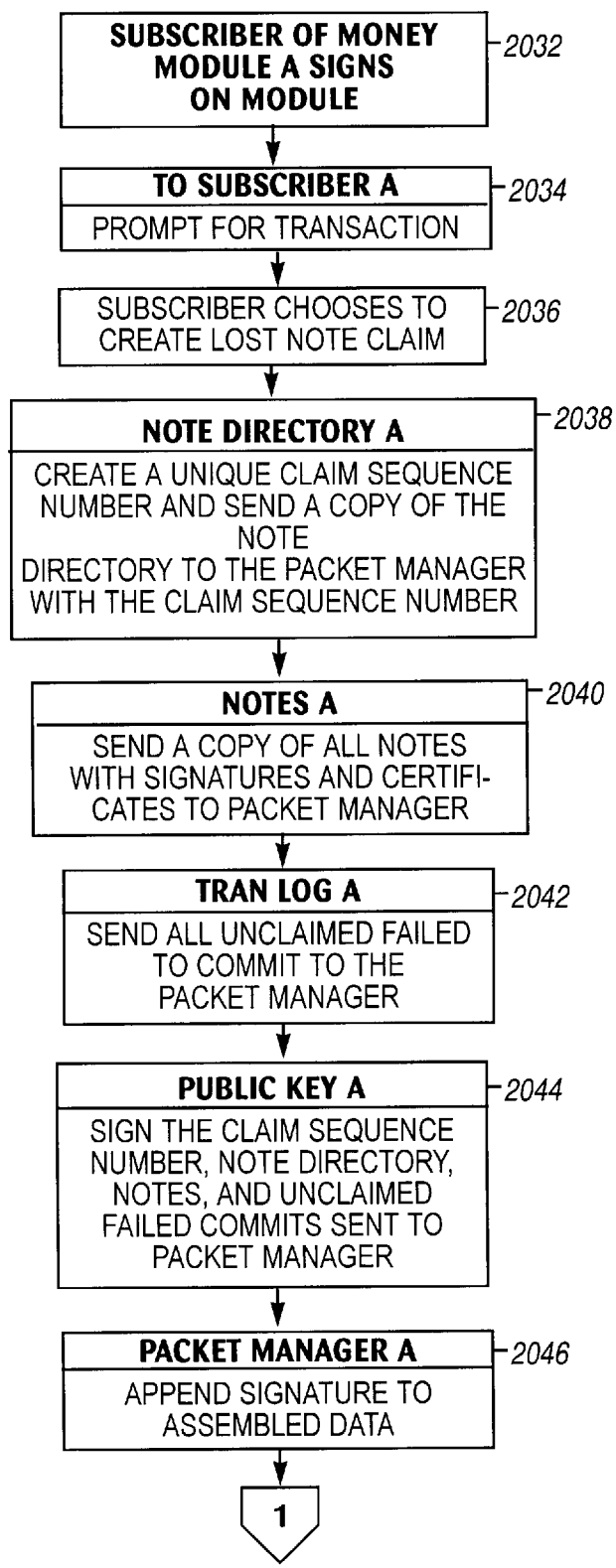
FIGS. 21A–21B illustrate a Create Lost Notes claim protocol.
Figure 21B:
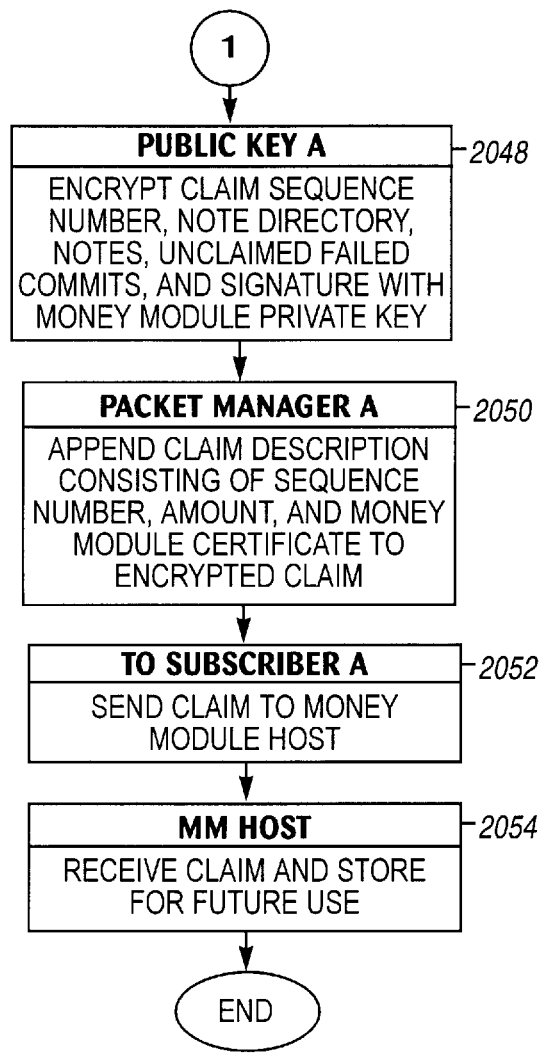
Figure 22A:
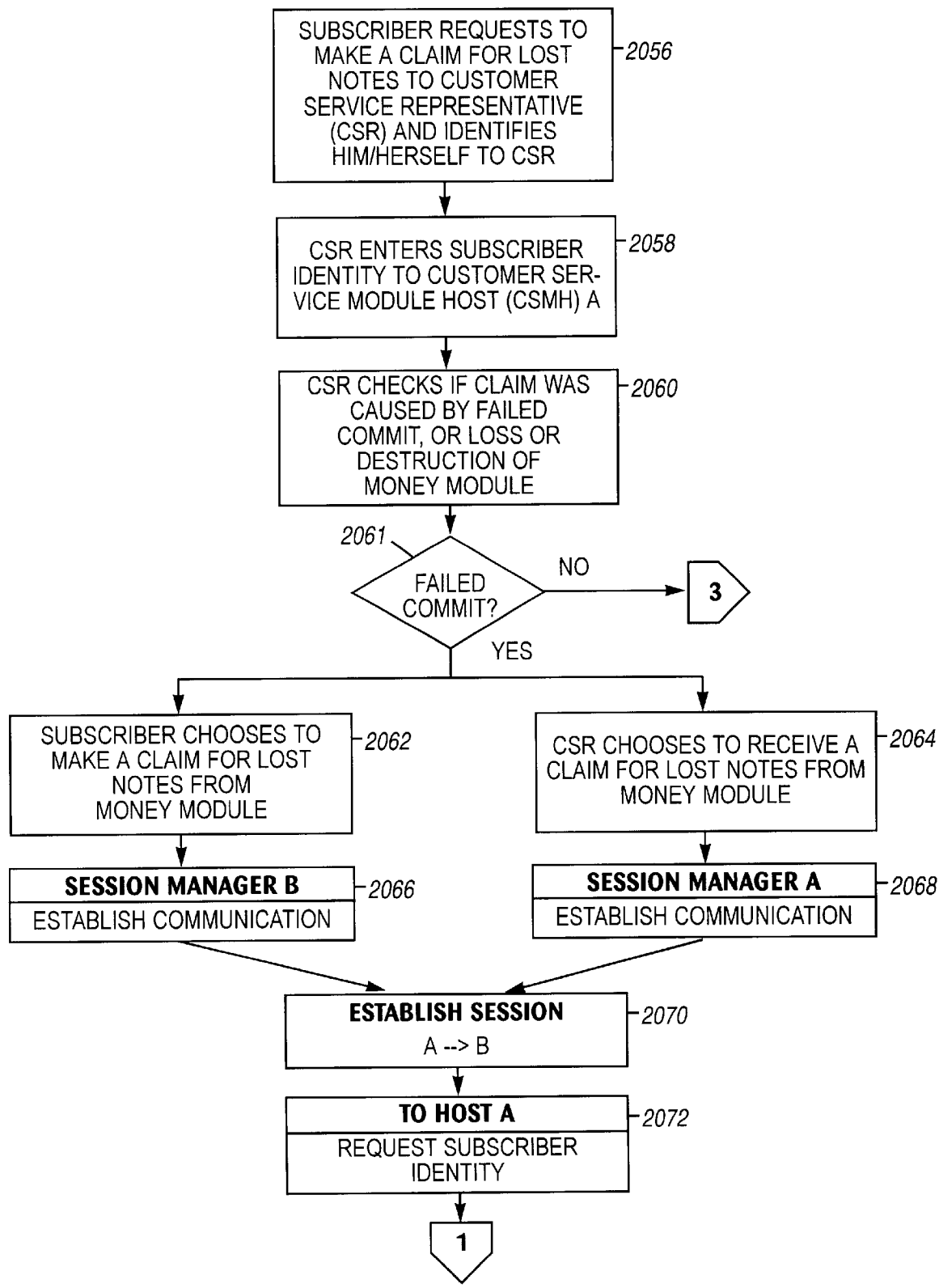
FIGS. 22A–22E illustrate a Claim Lost Notes protocol.
Figure 22B:
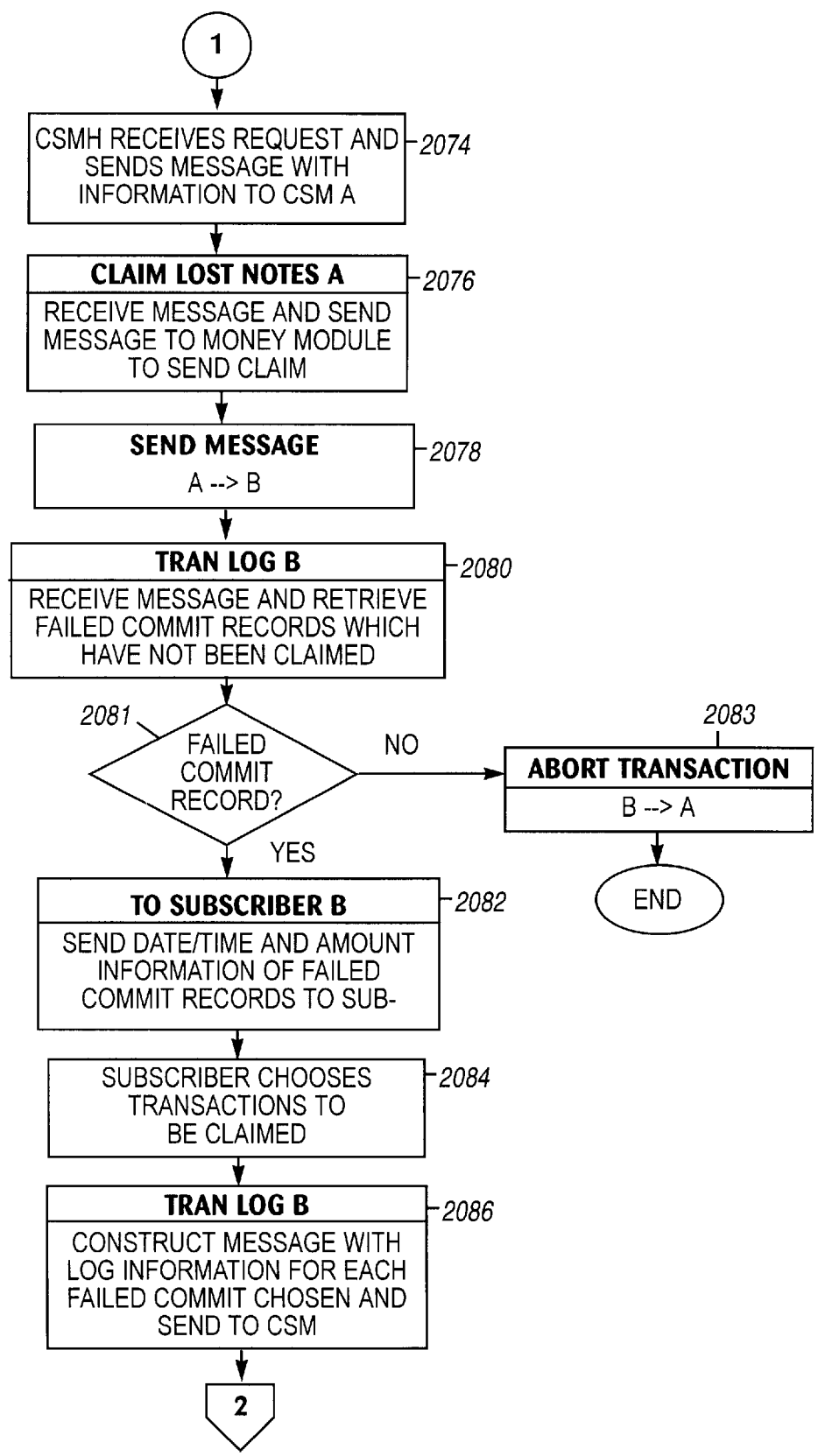
Figure 22C:
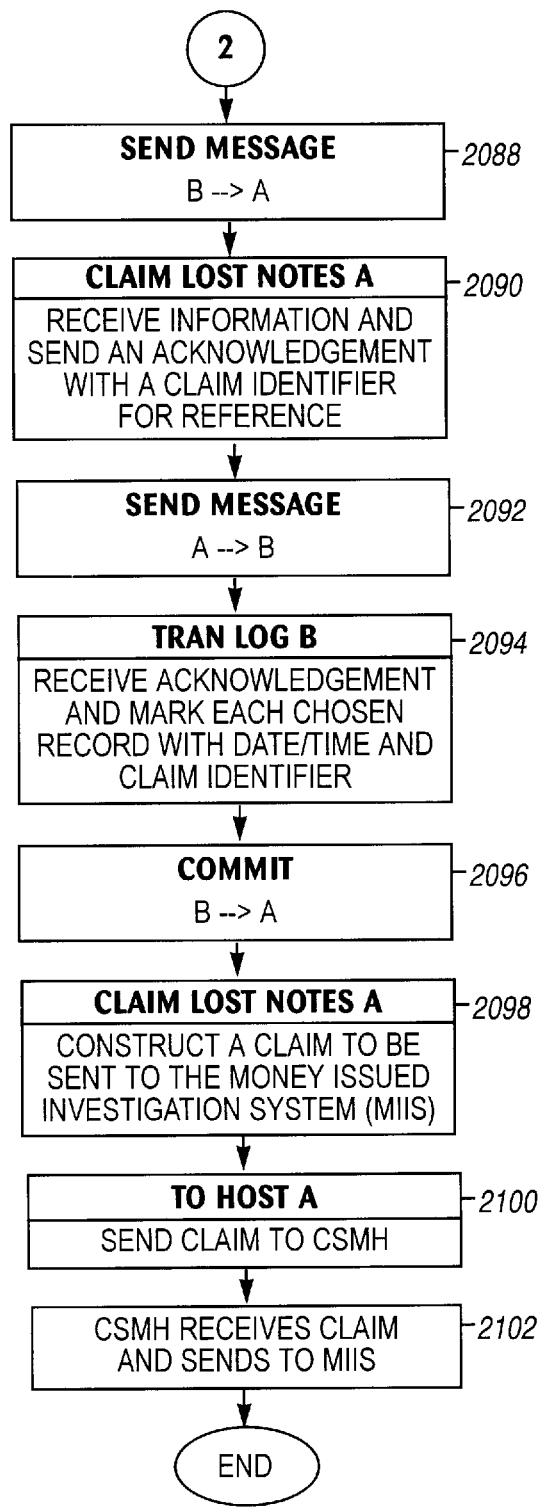
Figure 22D:
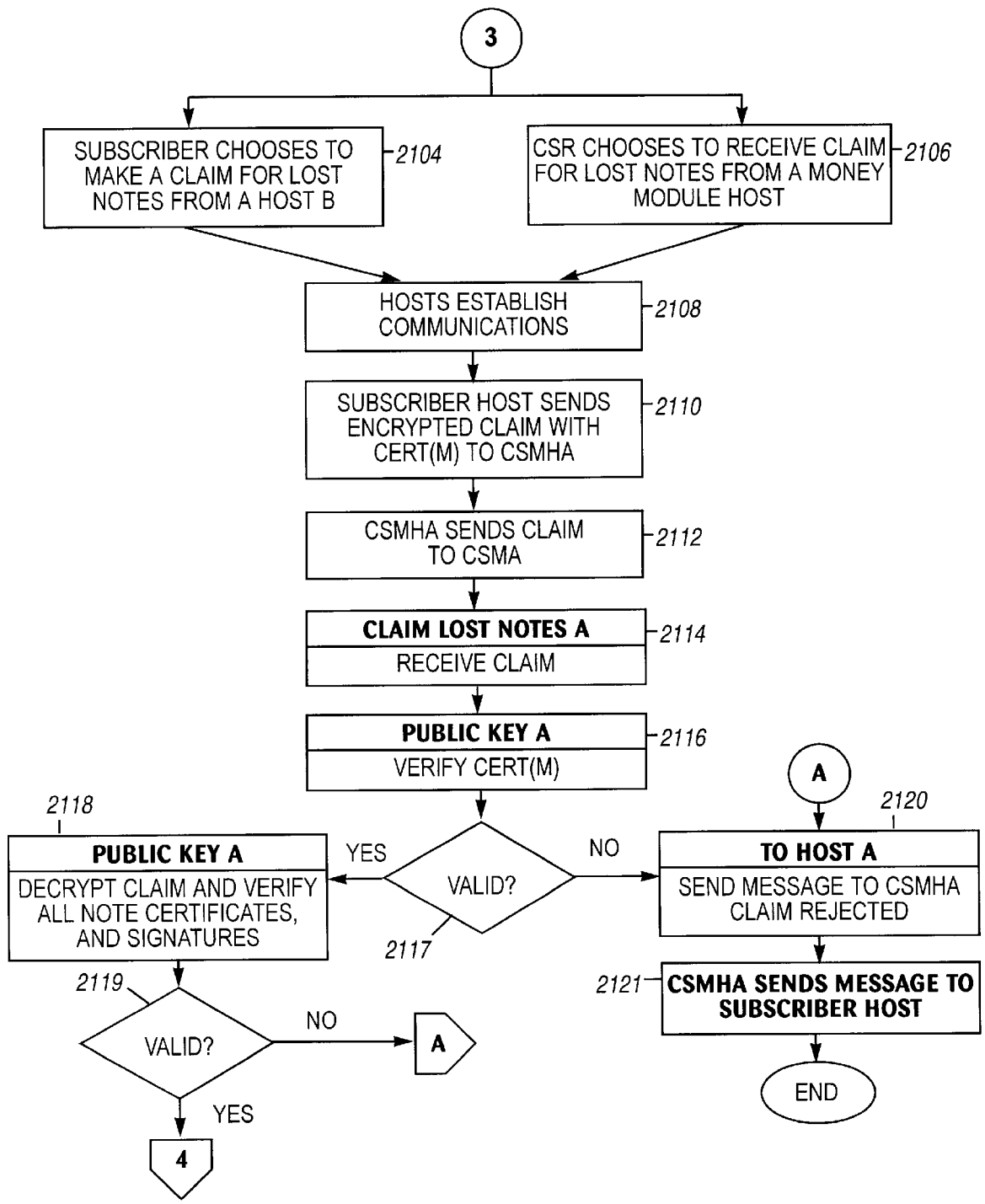
Figure 22E:
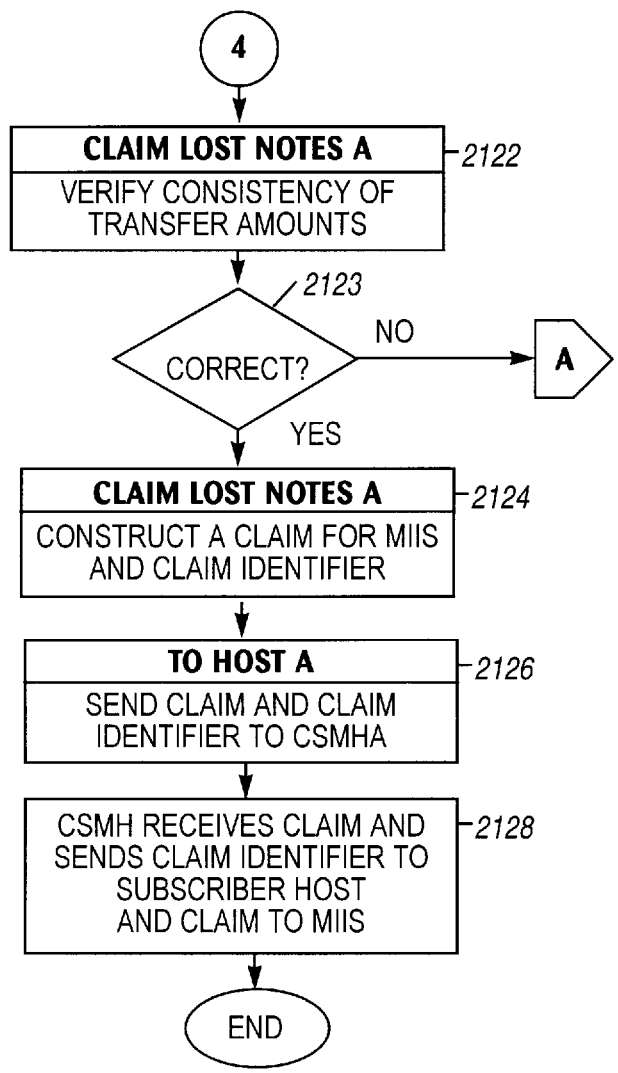

Referring now to FIG. 21A, there is shown a Create Lost Note(s) Claim process which may be practiced in accordance with an embodiment of the disclosed EMS. The process begins when a subscriber signs on to a money module, To Subscriber A prompts the subscriber for a transaction, and the subscriber selects a Create Lost Note(s) Claim option (steps 2032–2036).

Then, several steps occur which consolidate all notes and unclaimed failed commits (steps 2038–2042). Specifically, Note Directory A creates a unique claim sequence number (which is used for identifying a claim) and conveys a copy of the Note Directory with the sequence number to the Packet Manager. Notes A conveys a copy of all notes with signatures and certificates to Packet Manager. Then, Tran Log A sends all unclaimed failed to Commit transactions that were logged during the Abort process to the Packet Manager.

Next, Public Key A uses a money module private key to sign the claim sequence number, note directory, notes, and failed Commits that were sent to the Packet Manager, and Packet Manager A appends the signature to the assembled data, resulting in an assembled data packet (steps 2044–2046), which is then encrypted by Public Key A (step 2048). To the encrypted claim, Public Key A then appends a claim description consisting of the claim sequence number, the total value amount of the claim, and the certificate of money module A (step 2050). To Subscriber A sends this claim to the money module host, which receives and stores the claim—on a medium physically independent of the money—for future use (steps 2052–2054).

It is understood, therefore, that the Claim Lost Notes process provides a method for generating and protecting potential money claims which are not destroyed by damage to, or failure of, a money module.

Claim Lost Notes

FIG. 22 shows the protocol for claiming lost notes, which begins when a subscriber requests to make a claim for lost notes to a customer service representative (CSR), the subscriber's identity being revealed to the CSR (step 2056). CSR then conveys the subscriber's identity to customer service module host (CSMH) A, and checks whether the claim is due to a failed commit or due to a loss or destruction of the money module (steps 2058–2060). If a failed commit is the basis for the claim (and the subscriber's money module has not been lost or damaged), then upon the subscriber's selection to make a claim for lost notes from the money module and the CSR's selection to receive a claim for lost notes from a money module, Session Manager B of the subscriber's money module and Session Manager A of a customer service module (CSM) associated with the customer service representative (via a customer service module host (HCSM)) are respectively invoked to establish a secure session between CSM A and money module B (steps 2062–2070).

Once a secure session is established, To Host A of the CSM requests the identity of the subscriber, and HCSM A responds to this request by sending a message containing the subscriber identity to CSM (2072–2074). Claim Lost Notes A receives this message and sends to money module B a message indicating that the claim should be sent (steps 2076–2078).

Tran Log B receives this message and retrieves failed commit records that have not been claimed (step 2080). If no failed commit records are located, then the transaction is aborted (step 2083). Otherwise, To Subscriber B sends information (e.g., date, time, and amount) from the retrieved failed commit records to the subscriber for review (step 2082). From this information, the subscriber selects the transactions to be claimed (step 2084). For instance, the subscriber would not select failed commit transactions that have been resolved separately. Then, for each failed commit transaction selected by the subscriber, Tran Log B constructs a message containing log information for these transactions, and sends this message to CSM (steps 2086–2088).

Claim Lost Notes A receives this message and sends to B an acknowledgement including a claim identifier (e.g., a confirmation number) for future reference to the claim (step 2092). Tran Log B receives the acknowledgement and marks each selected failed commit transaction record with the date/time of the claim and with the claim identifier provided by the CSM (step 2094). Then, B commits to the transaction (step 2096).

After the commit procedure is completed, from the received message containing failed commit transaction information Claim Lost Notes A constructs a claim to be sent to the Money Issued Investigation System (MIIS) which preferably forms part of the Transaction Investigation System. To Host A sends this claim to HCSMA, which receives the claim and further sends the claim to the MIIS. (Steps 2098–2102).

Returning now to step 2060 of FIG. 22, if the claim were not due to a failed commit (e.g., due to a lost or damaged money module), then the subscriber may choose to make a claim for lost notes from a host B that has access to any of the subscriber's claims that were generated and off-loaded from the money module computing environment (e.g., onto a FLASH memory) in accordance with the Create Lost Note(s) Claim process described hereinabove with reference to FIG. 21. CSR separately chooses to initiate a process to receive a claim for lost notes from a money module host and the hosts establish a communication link according to any known technique (steps 2104–2108).

Then, the subscriber host B sends the claim, including the money module certificate, to CSMHA which sends the claim to CSMA (steps 2108–2112). Claim Lost Notes A receives the claim and sends the claim to Public Key A which validates the money module certificate (2114–2116). If the money module certificate is invalid, then To Host A sends CSMHA a message indicating that the claim has been rejected, and CSMHA routes this message to the subscriber host B, and the Claim Lost Notes process is terminated (steps 2120–2121).

If the money module certificate is valid, Public Key A decrypts the claim and verifies all note certificates and signatures within the claim (step 2118). If any of the note certificates and signatures are not valid then the transaction is terminated (steps 2119–2121). If the note certificates and signatures are valid, then Claim Lost Notes A, verifies the consistency of transfer amounts to ensure that the value of the money conveyed to a transferee is not greater than that received by the transferor for the transfer history of each note (step 2122–2123). If there is an inconsistency then the transaction will be terminated (steps 2120–2121).

If, however, the transfer amounts are consistent for all notes, then Claim Lost Notes A constructs a claim to be sent to the MIIS, and also generates a claim identifier to be associated with the claim. To Host A then sends the constructed claim and claim identifier to CSMHA, which receives the claim and claim identifier and appropriately routes the claim identifier to subscriber host B and sends the claim to the MIIS. (Steps 2124–2128), thus completing the Claim Lost Notes process.

Foreign Exchange Settlement

In the present invention, the Electronic Monetary System (EMS) is used to eliminate foreign exchange settlement risk.

Foreign exchange trading can be settled in one of three ways:

1) gross settlement—payments are accumulated on a trade-by-trade basis;

2) bilateral net settlement—payments are based on netting the trades for two counterparties; and 3) multilateral net settlement—payments are based on netting the trades for more than two counterparties as a group.

Figure 23:
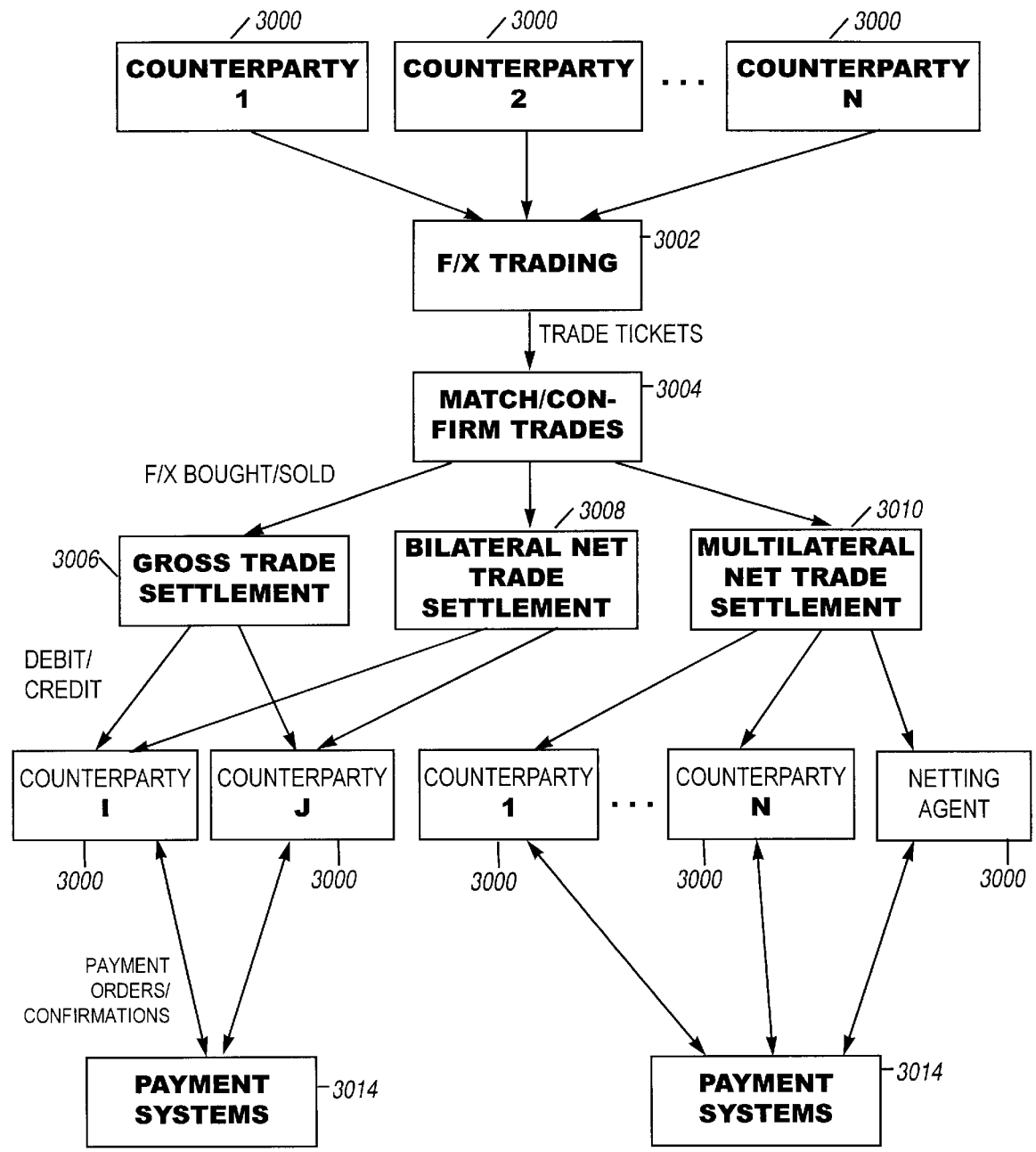
FIG. 23 illustrates a foreign exchange process.

In order to illustrate the effect of these three types of settlement we quickly review the foreign exchange process illustrated in FIG. 23. Major foreign exchange trading is performed around the world in places like New York, London, and Tokyo, lesser trading is done in Toronto, Sydney, and Singapore. Dealers 3000 among each other during the business day in each of these locations, keeping tally of the trades (step 3002). At the end of the trading day the dealer's back office matches and confirms its trades with their counterpart's back office (step 3004). Trading could be over the phone or via on-line trading or brokering systems offered by Reuters and EBS.

The confirmed trades then enter a settlement process which depends on counterparty arrangements. Gross settlement (step 3006) can be done on an ad hoc basis, but the netting arrangements (steps 3008, 3010) require contracts to affirm the counterparty obligations. Netting is only useful in the dealer market, where parties both buy and sell the same currency. Multilateral netting requires a third party, the netting agent 3012, to net the bought and sold currencies. The agent 3012 plays the counterparty for payments by accepting payment from the traders in a net debit position and disbursing the funds to the counterparties in a net credit position.

To illustrate these options assume we have three counterparties A, B, and C trading two currencies, U.S. dollars (USD) and Japanese Yen (JYN). Suppose we have the following trades:

1) A buys 1000 JYN from C for 10 USD

2) A buys 5 USD from B for 500 JYN

3) B buys 6 USD from C for 600 JYN

4) A buys 900 JYN from B for 9 USD

On a gross basis A pays C 10 USD and receives 1000 JYN, A pays B 500 JYN and 9 USD and receives 5 USD and 900 JYN, and B pays C 600 JYN and receives 6 USD. On a bilateral basis the only difference is that A pays B 4 USD and receives 400 JYN. For a multilateral scheme the netting agent 3012 receives 14 USD from A, 1000 JYN from B and 400 JYN form C and pays 1400 JYN to A, 10 USD to B and 4 USD to C.

After agreement on the amounts to be settled, payment orders are given to the national payment systems 3014 in order to meet the scheduled value date for the trading session.

Figure 24:
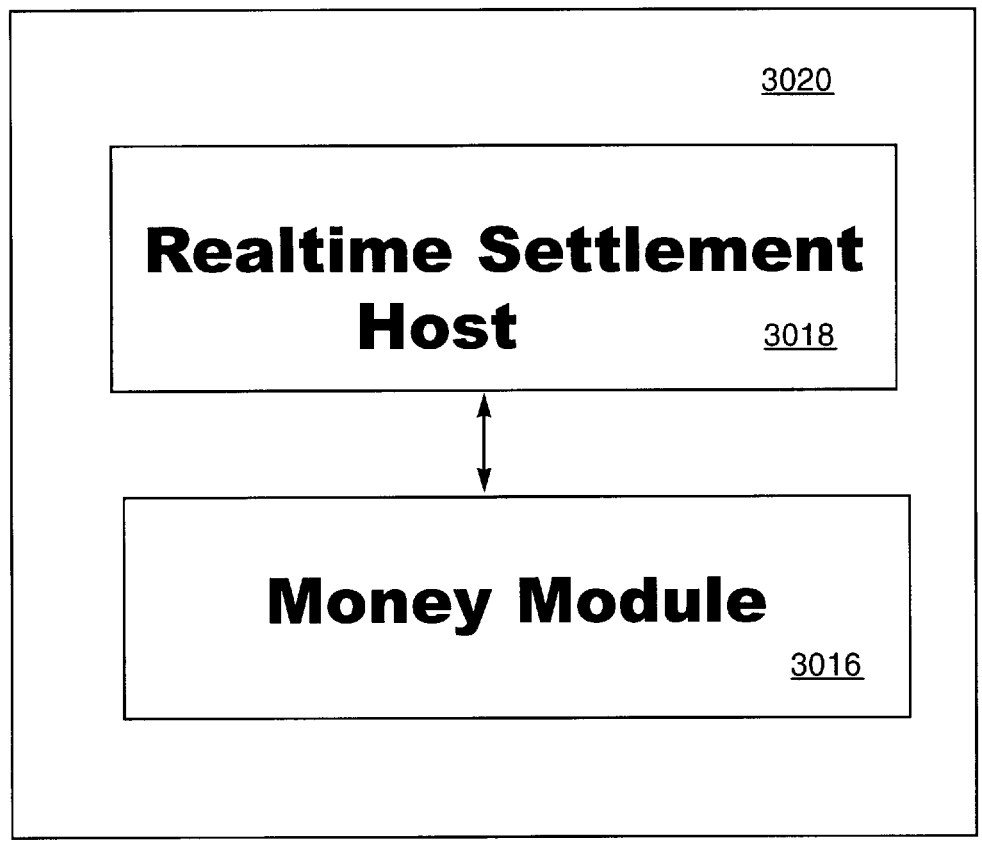
FIG. 24 shows a settlement agent.

In order to eliminate Herstatt risk, the present invention synchronizes payments versus payment so that neither party is left holding the bag if the banking day ends. A money module transaction—Settle Foreign Exchange—is used which allows the secure exchange of multiple currencies. Referring to FIG. 24, the money module 3016 is used in conjunction with a host application 3018—Realtime Settlement—to form a settlement agent 3020. These agents 3020 may be used for either gross or bilateral settlement. The specific functionality of the host application software 3018 is described later in the context of the settlement protocols.

Figure 25:
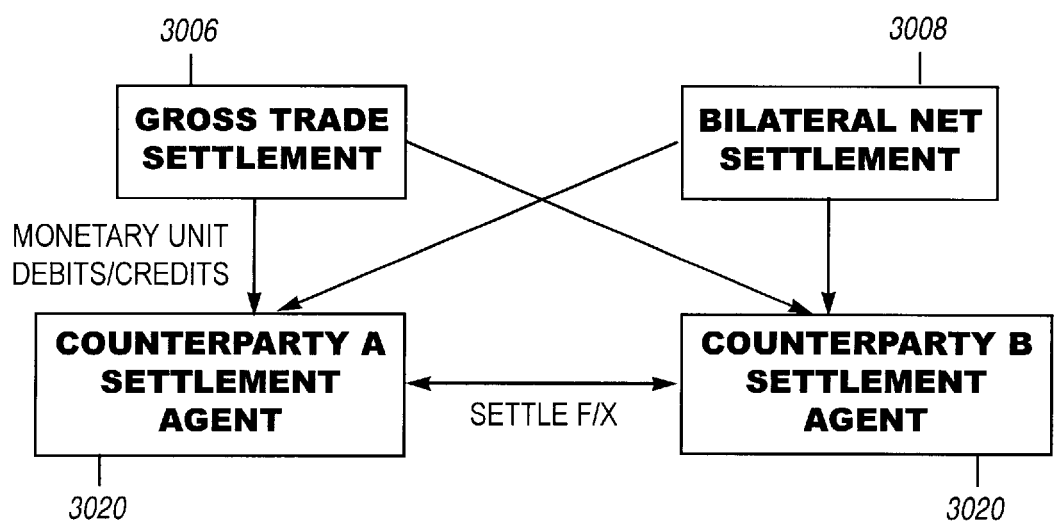
FIG. 25 shows a gross/bilateral foreign exchange settlement configuration.

FIG. 25 illustrates the basic system configuration for a gross or bilateral foreign exchange settlement. A Gross Trade Settlement process 3006 or Bilateral Net Settlement process 3008 passes the amounts of foreign exchange to be sent and received, and the time and date of settlement (e.g., the value date) to the settlement agents 3020. The processes 3006, 3008 may, for example, be computer-implemented or involve manual entry of trade tickets. At the designated settlement time, the settlement agents 3020 perform foreign exchange settlement in realtime.

Figure 26:
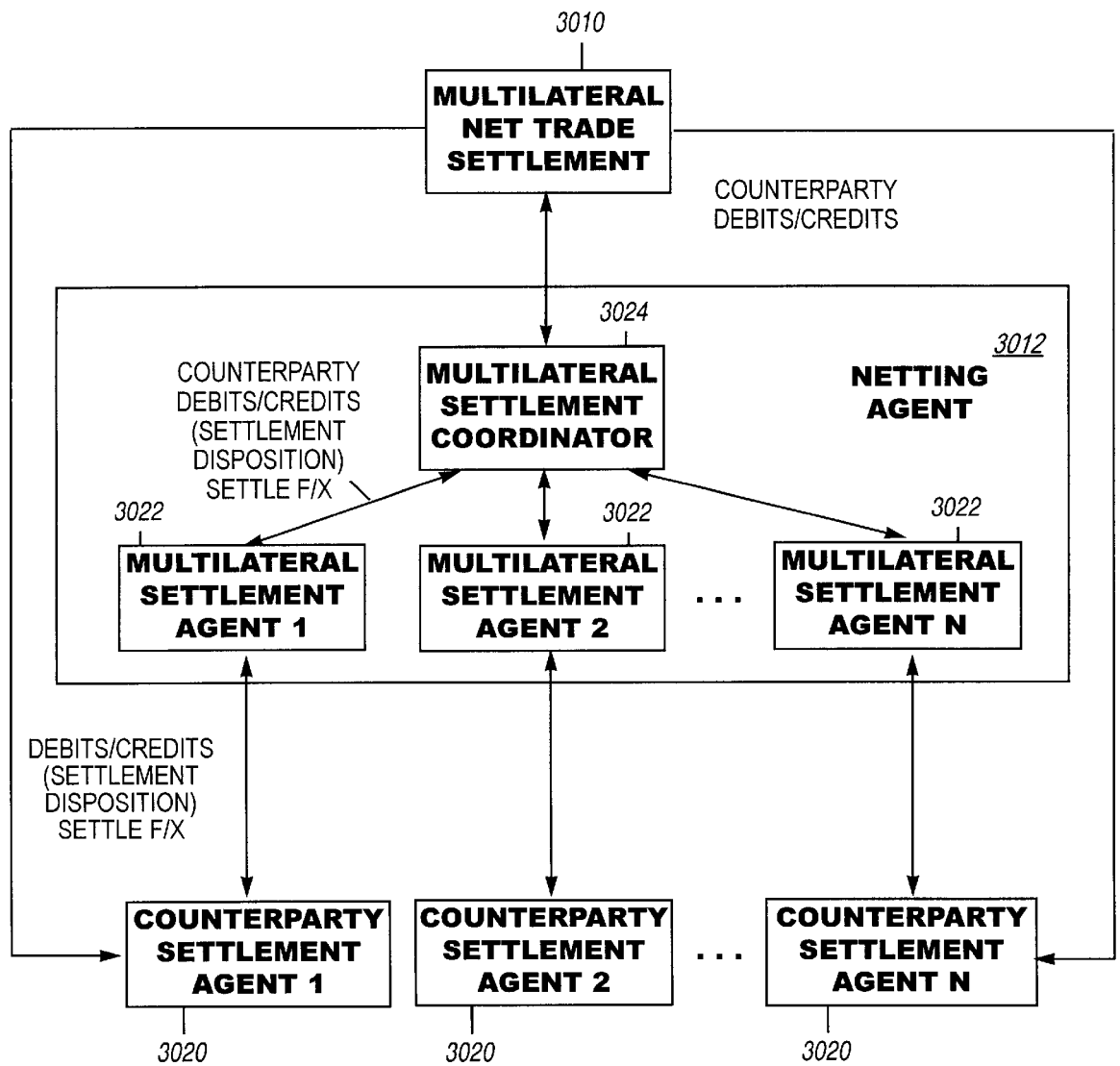
FIG. 26 shows a multilateral foreign exchange settlement configuration.
Figure 27A:
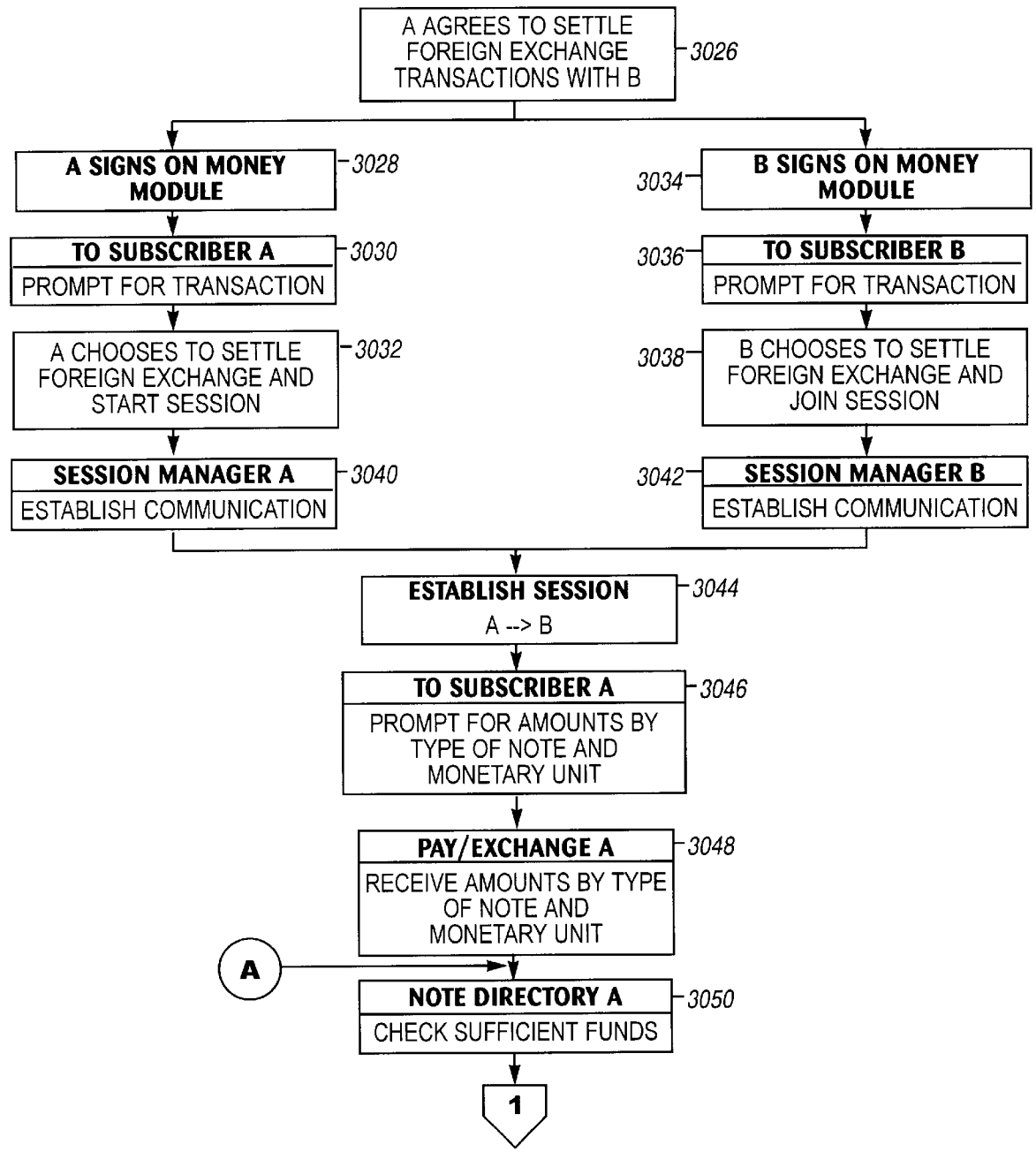
FIGS. 27A–27E illustrate a Settle Foreign Exchange protocol.
Figure 27B:
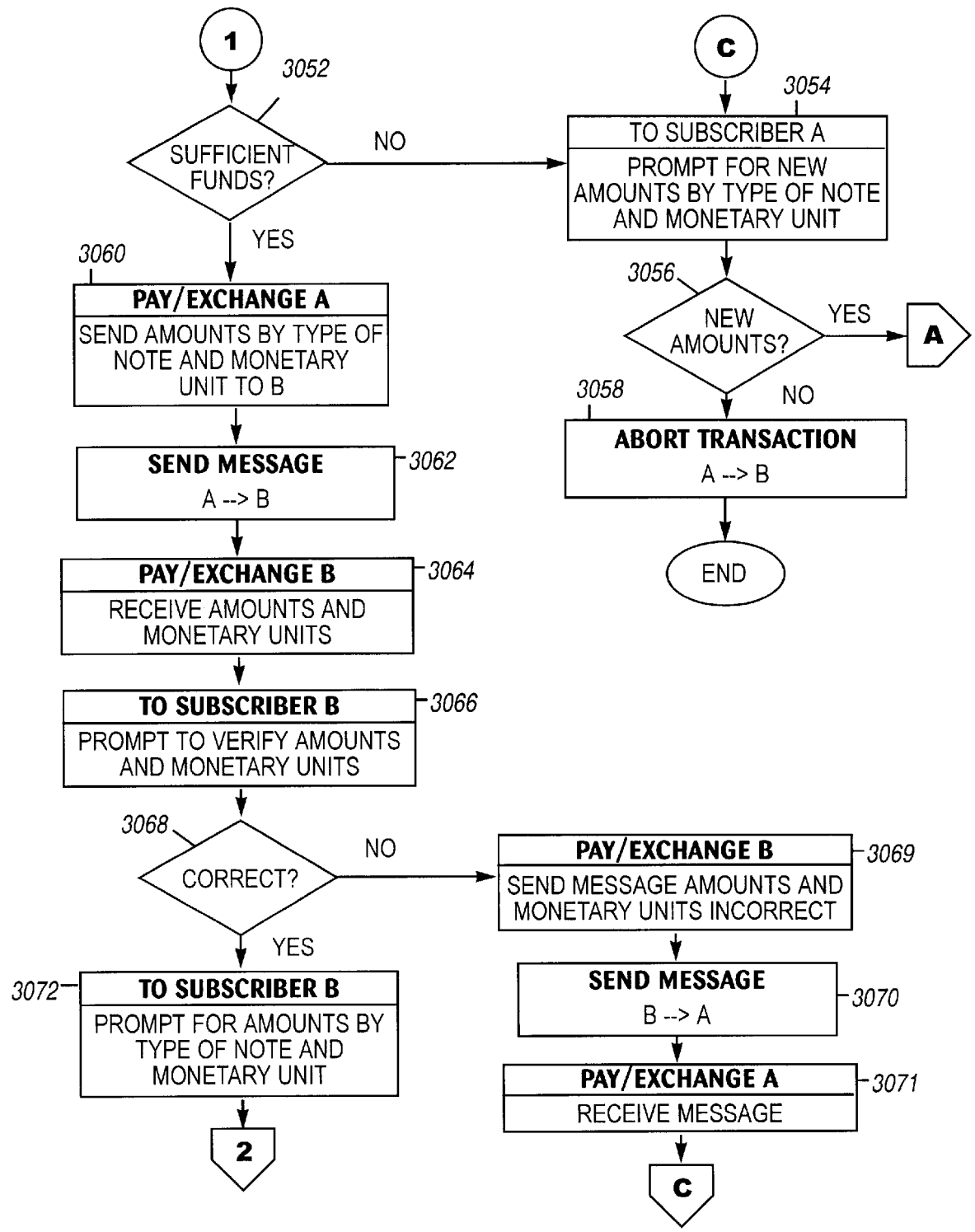
Figure 27C:
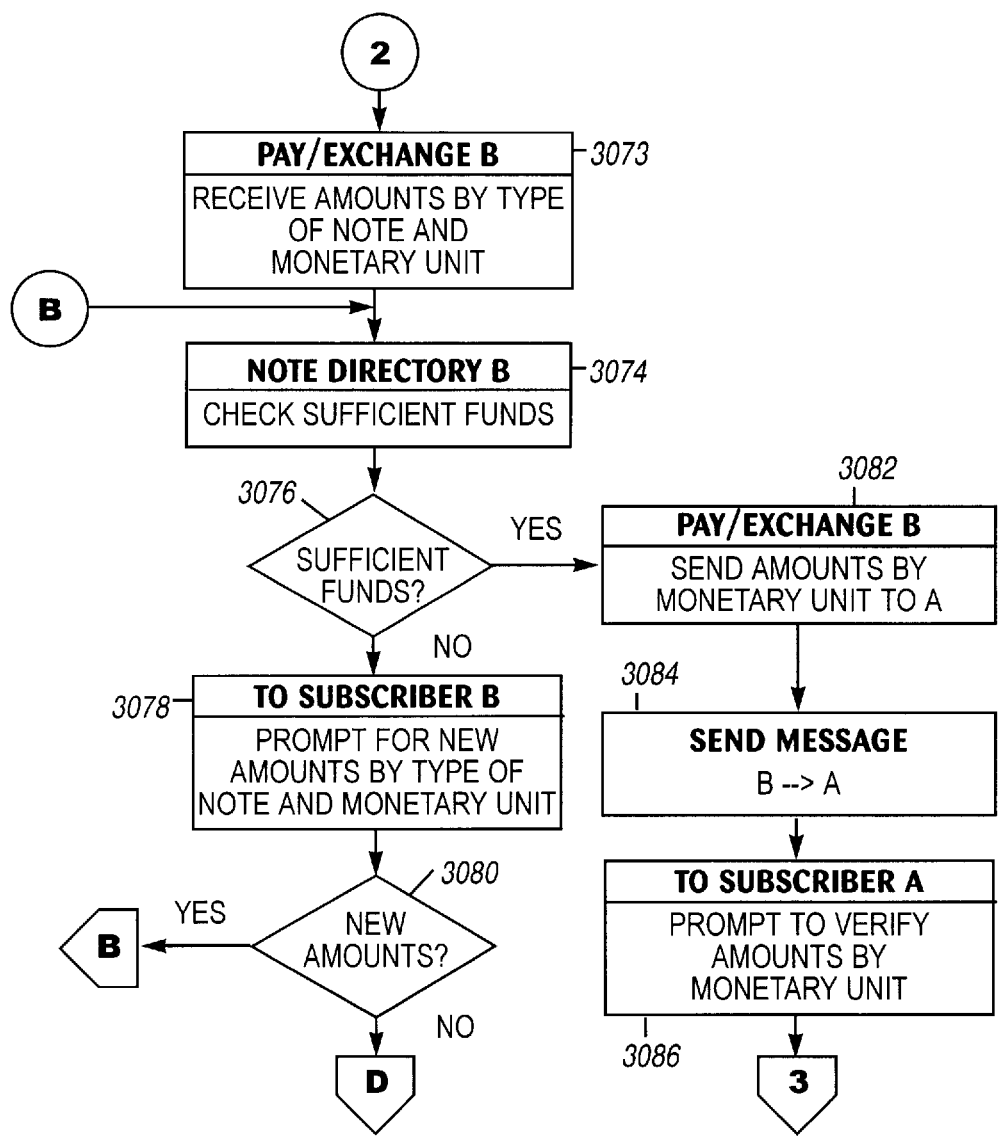
Figure 27D:
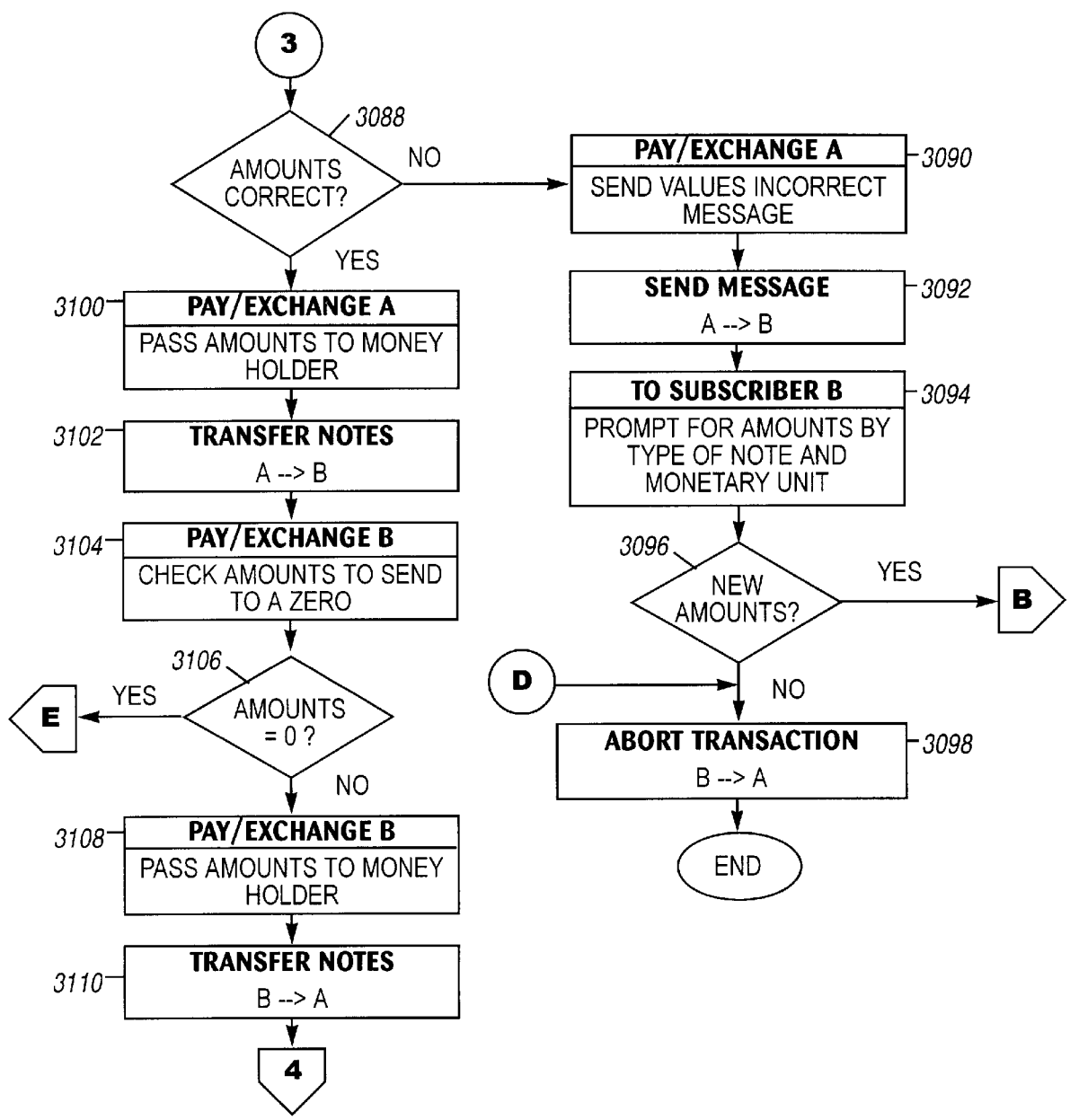
Figure 27E:
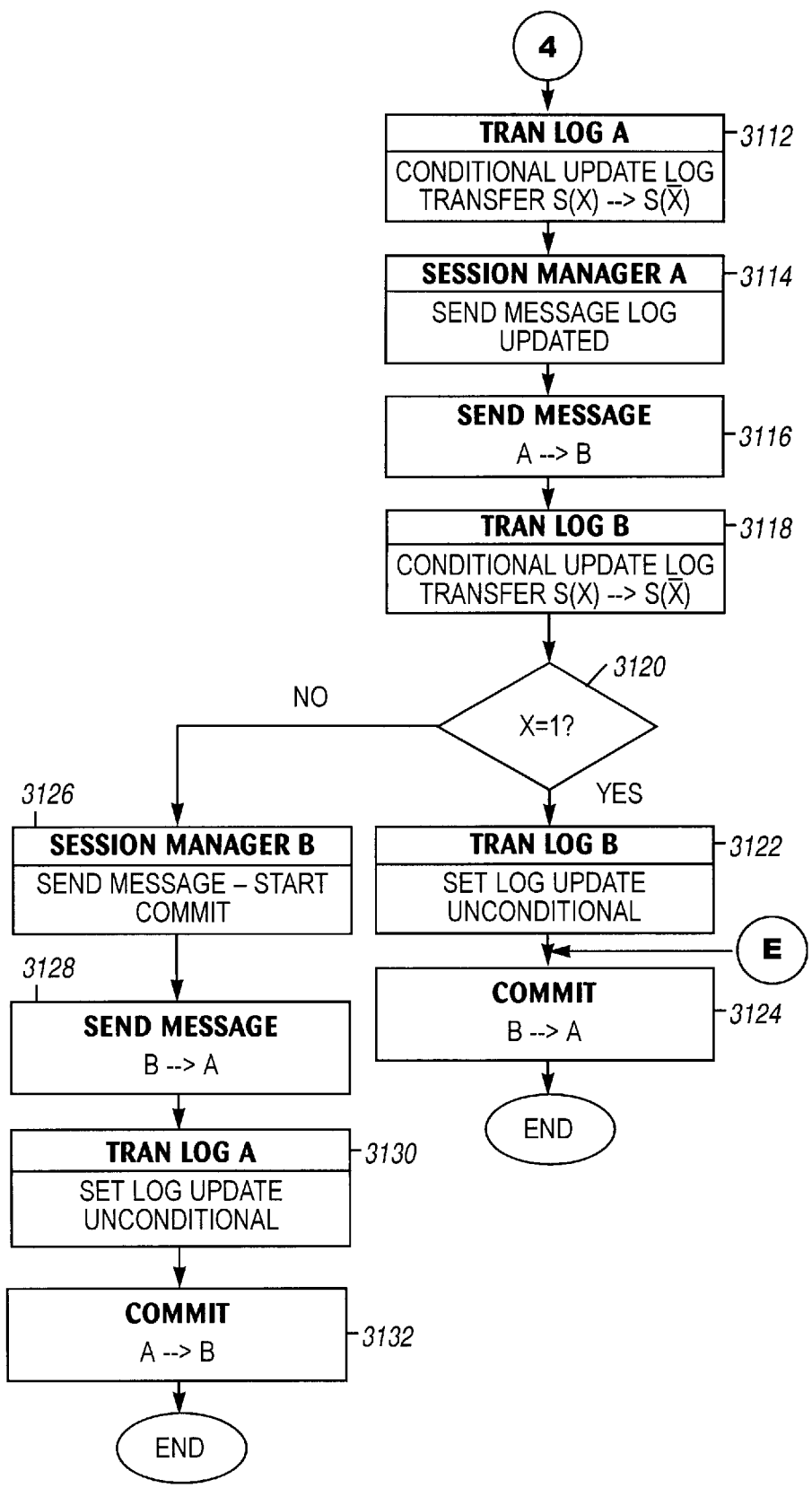

Referring to FIG. 26, for multilateral netting we introduce a multilateral settlement agent 3022 and a multilateral settlement coordinator 3024 which are further variants of the settlement agent 3020 (each having a particular host application and money module 3016), and which will be described in greater detail within the context of the following flow diagrams. Together the multilateral settlement coordinator 3024 and the multilateral settlement agents 3022 form a netting agent 3012. A counterparty settlement agent (CSA) 3020 accesses the multilateral settlement coordinator (MSC) 3024 via one of a plurality of multilateral settlement agents 3022 connected to the MSC. This structure reduces the contention problem of accessing the MSC, though if few enough CSAs are involved, then the MSC could be accessed directly.

In the preferred embodiment of the present invention, the issuing banks in the EMS are the Central Banks. EMS allows the correspondent banking relationships for non-home-based payments to be preserved so that no new banking relationships have to be established. The reason that Herstatt risk is eliminated is based on the assumption that the acceptance of central bank electronic money is final and that the exchanges can be accomplished 24 hours a day, seven days a week with payment versus payment coordinated to a final success or failure. Failure means nobody has lost their money even though the settlement was not consummated.

Settle Foreign Exchange

In accordance with the present invention, the EMS money modules have a Settle Foreign Exchange protocol that allows the secure confirmation of exchange terms and the secure realtime exchange of electronic money denominated in multiple monetary units (e.g., dollars, yen, and pounds exchanged for lira and swiss francs). Such an exchange may be implemented as a money module transaction between the owners of the money modules (e.g., where the To Subscriber function prompts the holder of the money module) or as part of one of the later described gross, bilateral, or multilateral settlements (i.e., where the To Subscriber function prompts the Realtime Settlement host application 3018).

As illustrated in FIG. 27, A agrees to settle foreign exchange transactions with B (step 3026). This agreement occurs either between owners of the money modules, or between the Realtime Settlement applications of each money module's host. A signs on to money module A, is prompted for the type of transaction (steps 3028–3030), and selects settle foreign exchange and start session (steps 3028–3032). Similarly, B signs on to money module B, is prompted for transaction, and selects settle foreign exchange and join session (steps 3034–3038). The money module Session Managers then establish a session (steps 3040–3044).

To Subscriber A prompts for amounts by type of note and monetary unit and Pay/Exchange A receives this information (steps 3046–3048). Note Directory A then checks for sufficient funds (steps 3050–3052). If funds are not sufficient, A is prompted for new amounts (step 3054). If new amounts are entered, then the money module again checks for sufficient funds, otherwise the transaction is aborted (steps 3056–3058).

If funds are sufficient, then Pay/Exchange A sends the amounts by type of note and monetary unit to Pay/Exchange B, and B is prompted to verify the amounts and monetary units (steps 3060–3066). If verification is unsuccessful, then Pay/Exchange B sends a message reporting the failure to Pay/Exchange A, where A is again prompted for new amounts (steps 3068–3071).

If the amounts and monetary units are verified, then To subscriber B prompts for amounts by type of note and monetary unit (step 3072). Pay/Exchange B receives the response and Note Directory B checks for sufficient funds (steps 3073–3074). If funds are insufficient, then B is prompted for new amounts, in response to which money module B either rechecks for sufficient funds or aborts (steps 3076–3080).

If funds are sufficient, then Pay/Exchange B sends amounts by monetary unit to A, where To subscriber A prompts for verification (steps 3082–3086). If the amounts are not verified, then Pay/Exchange A sends a message to B reporting the failure, and To subscriber B prompts for new amounts (steps 3090–3094). If new amounts are entered, then money module B again checks for sufficient funds, otherwise it aborts the transaction (steps 3096–3098).

If A verifies the amounts by monetary unit, then Pay/Exchange A passes the amounts to the Money Holder (step 3100). A then transfers the appropriate electronic notes to B (step 3102). Pay/Exchange B checks if the amount it is to send is zero, i.e., one-way payment (step 3106). If so, then the transaction is complete and the money modules commit (step 3124). If the amount to be sent is not zero, Pay/Exchange B passes the amounts to the Money Holder and the specified electronic notes are transferred from B to A (steps 3108–3110).

Tran Log A then performs a conditional log update on the transfer $S(X)$ to $S(\overline{X})$ (step 3112), were again $S(X)$ is defined so that $S(0)=A$ and $S(1)=B$, and X is randomly 0 or 1 for each transaction, and common to both money modules A and B. Session Manager A sends the message "Log Updated" to B (steps 3114–3116) and Tran Log B conditionally updates its log to record the transfer $S(X)$ to $S(\overline{X})$ (step 3118).

If $X=1$, then Tran Log B sets the log update to unconditional (steps 3120–3122). Next, B follows the Commit protocol (step 3124), so that A will commit to both its transfers and B will commit to its one outstanding transfer.

If, however, $X=0$, then Session Manager B sends a "Start Commit" message to A (steps 3126–3128). Tran Log A then sets its log update to unconditional (step 3130), thus committing to its transfer. The Commit protocol is then called (step 3132). During this protocol B commits to both its transfers and A commits to its one outstanding transfer.

Gross/Bilateral Settlement

Figure 28:
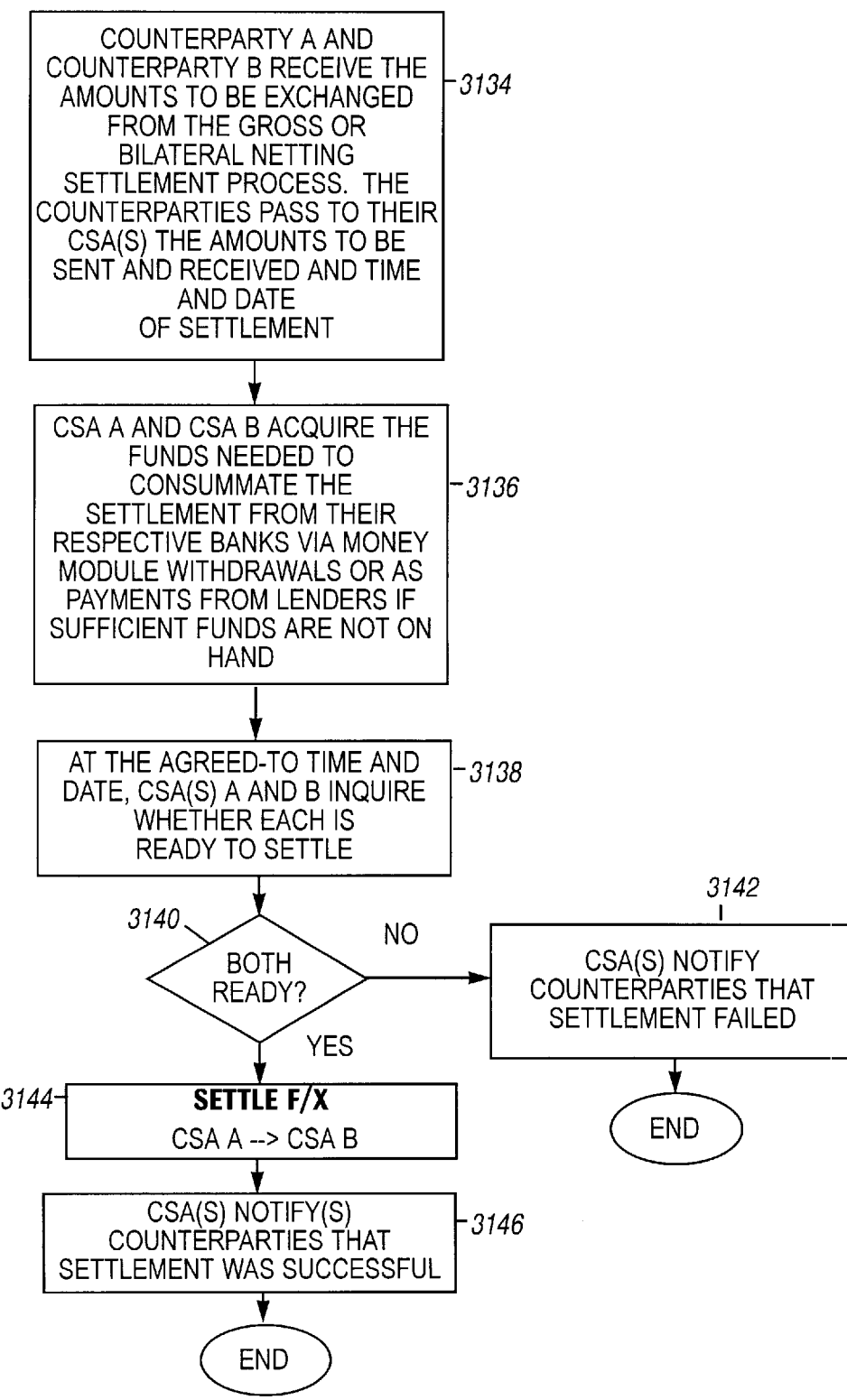
FIG. 28 illustrates a gross/bilateral foreign exchange settlement protocol.
Figure 29A:
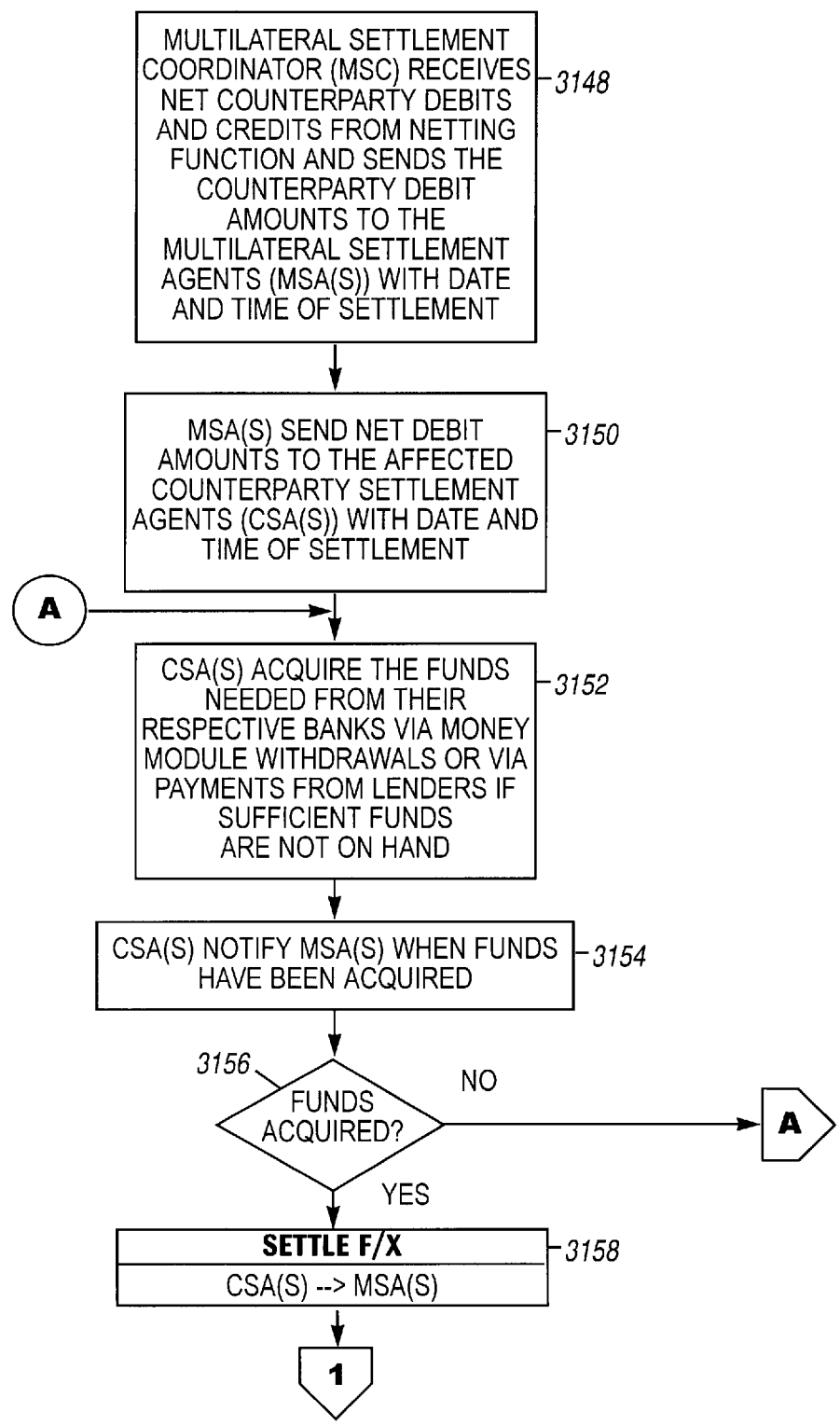
FIGS. 29A–29D illustrate a multilateral foreign exchange settlement protocol.
Figure 29B:
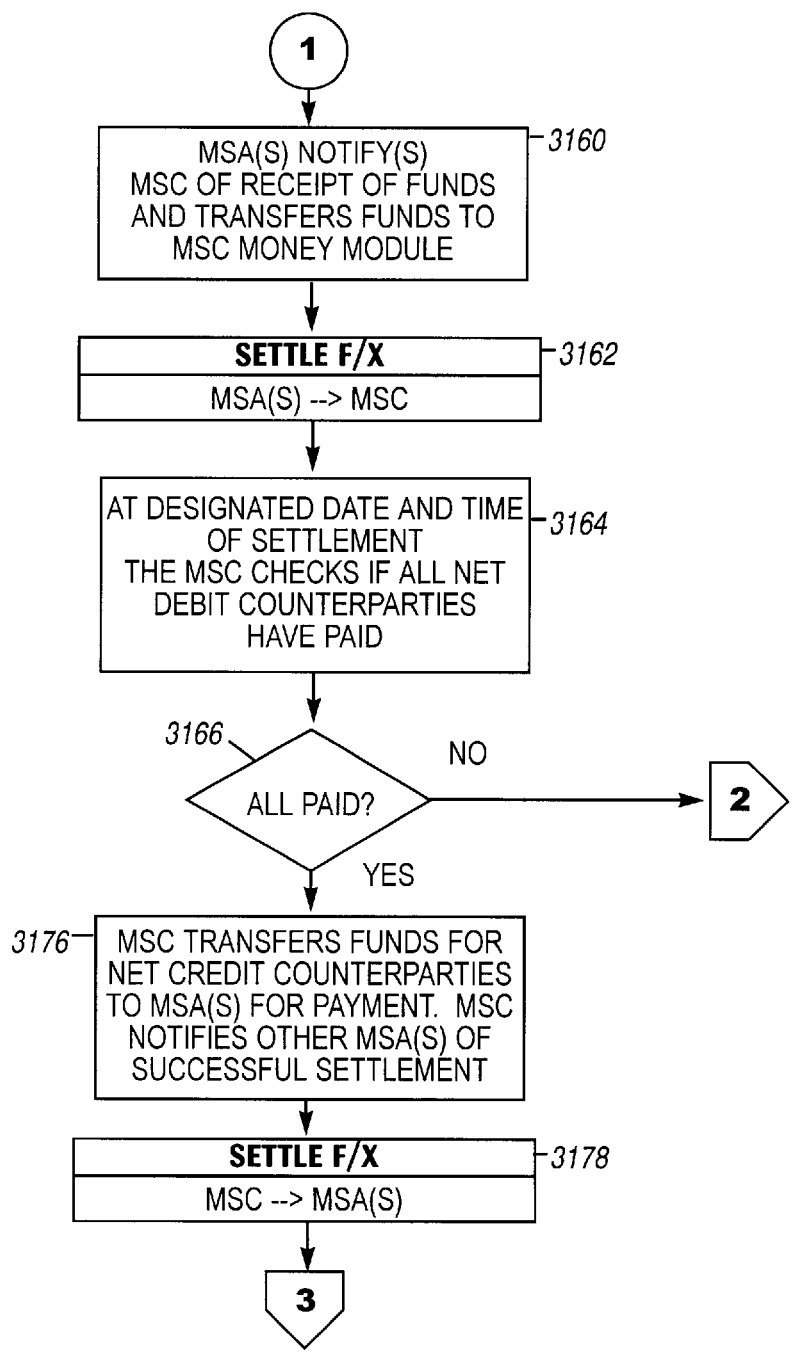
Figure 29C:
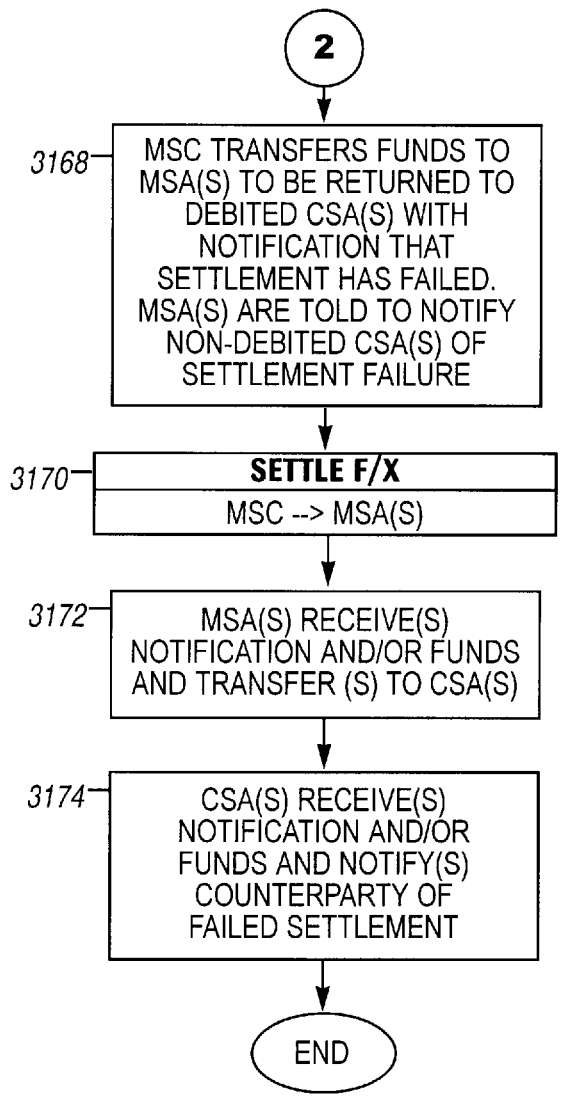
Figure 29D:
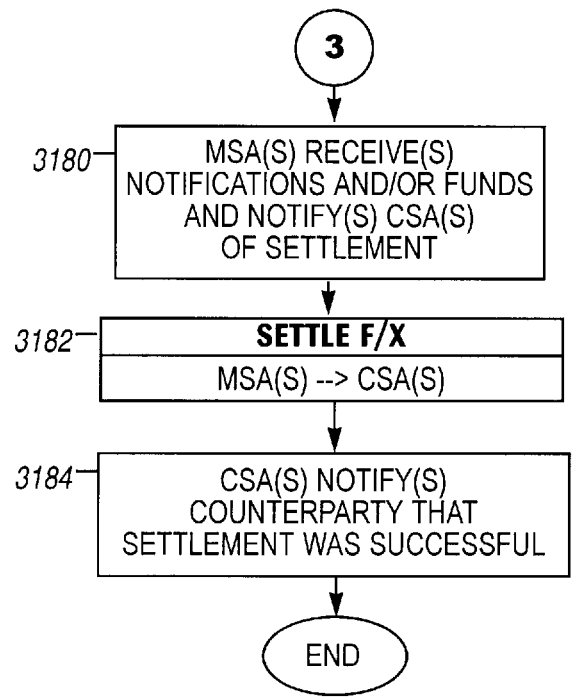

FIG. 28 illustrates the steps for implementing either a gross or bilateral foreign exchange settlement using counterparty settlement agents 3020 (see FIG. 25). Initially, counterparties A and B receive the amounts to be exchanged from the gross or bilateral netting settlement process 3006 or 3008. The term counterparties refers to the owners of the counterparty settlement agents (CSAs) which, for example, may be represented by a computerized trading system. The counterparties then pass to their CSAs the amounts to be sent and received and the time and date of settlement (step 3134).

CSA A and CSA B then acquire the funds needed to consummate the settlement from their respective banks via money module withdrawals or as payments from lenders if sufficient funds are not on hand (step 3136).

At the agreed upon time and date, the host applications 3018 of CSA A and CSA B inquire and determine whether each is ready to settle (steps 3138–3140). If both CSAs are not ready then they notify their counterparties that the settlement has failed (step 3142).

If both CSAs are ready, then their money modules perform the Settle Foreign Exchange protocol (step 3144) and the realtime funds exchange is accomplished. The CSAs then notify their counterparties that settlement was successful (step 3146), for example, by printout or notifying a trading/reconciliation computer system.

Multilateral Settlement

FIG. 29 illustrates the steps for implementing a multilateral foreign exchange settlement using CSAs 3020, MSAs 3022, and a MSC 3024 (see FIG. 26). Initially, the MSC 3024 receives net counterparty debits and credits from the netting process 3010 (similar information is reported to the CSAs 3020). The counterparty debit amounts are then sent to the MSAs 3022 along with the date and time of settlement (step 3148). The MSAs send the net debit amounts to the affected CSAs with the date and time of settlement (step 3150).

The CSAs 3020 then acquire the needed funds from their respective banks (e.g., electronic money issued for the appropriate central bank) from their respective banks via money module withdrawals, or via payments from lenders if sufficient funds are not on hand (step 3152). The CSAs 3020 notify the MSAs 3022 when the funds have been acquired and then transfer the electronic money to the MSAs using the Settle Foreign Exchange protocol (steps 3154–3158). The MSAs 3022 then notify the MSC 3024 of receipt of funds and transfers the electronic money to the MSC by the Settle Foreign Exchange protocol (steps 3160–3162).

At the designated date and time of settlement, the MSC 3024 checks if all net debit counterparties have paid (steps 3164–3166). If all counterparties have not paid, then the MSC 3024 transfers funds to the MSAs 3022 to be returned to the debited CSAs along with notification that settlement has failed (step 3168). Such funds transfer is via the Settle Foreign Exchange protocol (step 3170). The MSAs are also told to notify non-debited CSAs of the settlement failure. The MSAs 3022 receive such notification and (when appropriate) funds for transfer to the CSAs 3020 (step 3172). Funds transfer back to the debited CSAs is via the Settle Foreign Exchange protocol. CSAs then receive notification of settlement failure and the debited CSAs receive their funds. Finally, the CSAs notify the counterparties of the failed settlement (step 3174).

In the event that the MSC 3024 has received payments from all net debit counterparties, then the MSC transfers funds for the net credit counterparties to the MSAs 3022 for payment (step 3176). Such funds transfer is via the Settle Foreign Exchange protocol (step 3178). The MSC also notifies other MSAs of successful settlement.

The MSAs 3022 receive notification of the successful settlement and the funds where appropriate. These are, in turn, sent to the CSAs 3020, which notify their counterparties of successful settlement (steps 3180–3184).

In the described invention, we assume that the foreign exchange process is among known counterparties with appropriate communication security. However, if the parties wish to communicate over open insecure networks then trusted agents could be employed to protect and authenticate transactions and provide proof of transaction.

In an additional aspect to the present invention, the EMS could be used to compress the trade and settlement into realtime if both counterparties have sufficient funds in their money modules to settle the trade. This could be valuable to corporate traders that are normally on one side of the trade, i.e., buying foreign exchange. Dealers who are normally on both sides of the trade, i.e., both buying and selling the same currency, would have liquidity problems settling trade by trade.

Although the above description provides many specificities, these enabling details should not be construed as limiting the scope of the invention, and it will be readily understood by those persons skilled in the art that the present invention is susceptible to many modifications, adaptations, and equivalent implementations without departing from this scope and without diminishing its attendant advantages. It is therefore intended that the present invention is not limited to the disclosed embodiments but should be defined in accordance with the claims which follow.

I claim:

1. A method for foreign exchange settlement using a first money module and a second money module, comprising:

(a) establishing a cryptographically secure session between said first money module and said second money module;

(b) a first subscriber sending first exchange data, including a plurality of amounts by different monetary units, to said first money module;

(c) said first money module sending said first exchange data to said second money module, via said cryptographically secure session;

(d) said second money module prompting a second subscriber for verification of said first exchange data;

(e) said second subscriber sending second exchange data, including a plurality of amounts by different monetary units, to said second money module;

(f) said second money module sending said second exchange data to said first money module, via said cryptographically secure session;

(g) said first money module prompting said first subscriber for verification of said second exchange data;

(h) in a first transfer, said first money module transferring first electronic representations of money to said second money module via said cryptographically secure session, wherein each of said first electronic representations of money have a monetary unit identifier, and wherein said first electronic representations of money are in said amounts and in said monetary units specified by said first exchange data;

(i) in a second transfer, said second money module transferring second electronic representations of money to said first money module via said cryptographically secure session, wherein each of said second electronic representations of money have a monetary unit identifier, and wherein said second electronic representations of money are in said amounts and in said monetary units specified by said second exchange data; and (j) said first and second money modules each unconditionally updating a transaction log to separately finalize said first transfer and said second transfer.

2. The method of claim 1, wherein for both said first and second transfer, the transferor money module unconditionally updates its log to finalize said first or second transfer prior to the transferee money module.

3. The method of claim 2, wherein the order of unconditionally updating logs for said first and second transfers is random.

4. The method of claim 3, wherein the first of said transfers to be unconditionally updated in said logs is conditionally updated before being unconditionally updated.

5. The method of claim 1, wherein said first and second subscribers are the holders of the money modules or realtime settlement host applications.

6. The method of claim 1, wherein said second money module checks if said amounts specified in said second exchange data are zero, and if so, said first transfer is the only electronic money transfer for the transaction.

7. The method of claim 1, wherein said first subscriber is a first realtime host settlement application and said second subscriber is a second realtime host settlement application, and further including the steps of:

a settlement processing system sending said first and second exchange data to said first and second realtime host settlement applications; and said first and second money modules acquiring electronic money needed to consummate the settlement transaction.

8. The method of claim 7, where said settlement processing system performs a gross or bilateral netting process.

9. The method of claim 7, where said electronic money is acquired via a money module withdrawal.

10. The method of claim 7, where said electronic money is acquired via a money module payment.

11. The method of claim 7, where time and date of settlement information is passed to said first and second realtime host applications.

12. The method of claim 11, where at the time and date specified by said time and date of settlement information, said first and second realtime host applications inquire whether each is ready to settle.

13. A method for realtime multilateral foreign exchange settlement using a processor-based multilateral settlement coordinator (MSC) having a first money module, a plurality of processor-based multilateral settlement agents (MSAs) each having a second money module, and a plurality of processor-based counterparty settlement agents (CSAs) each having a third money module, comprising the steps:

(a) said MSC receiving net counterparty debit and credit data from a netting system;

(b) said MSC sending said net counterparty debit data to said MSAs;

(c) said MSAs sending said net counterparty debit data to net debit CSAs;

(d) said net debit CSAs transferring electronic money to said MSAs, via first cryptographically secure sessions established between said second and third money modules, in accordance with said net counterparty debit data;

(e) said second money modules of said MSAs transferring said electronic money to said first money module of said MSC;

(f) said first money module of said MSC transferring said electronic money to said second money modules of said MSAs, for net credit counterparties; and (g) said MSAs transferring said electronic money to said net credit counterparty CSAs, via second cryptographically secure sessions established between said second and third money modules, in accordance with said net counterparty credit data.

14. The method of claim 13, wherein said MSC, MSAs and CSAs each have a host application.

15. The method of claim 13, wherein step (b) further comprises said MSC sending settlement data and time data to said MSAs, and step (c) further comprises said MSAs sending said settlement data and time data to said net debit CSAs.

16. The method of claim 15, further comprising the step:

after step (e), at the date and time specified by said data and time data, said MSC checking if all said net debit counterparty CSAs have paid.

17. The method of claim 16, further comprising the steps:

if not all said debit counterparty CSAs have paid, said MSC transferring said electronic money to said MSAs to be returned to debited CSAs along with a notification that settlement has failed.

18. The method of claim 13, further comprising the steps:

after step (c), said net debit CSAs acquiring electronic money via money module withdrawal or payment.

19. The method of claim 13, wherein step (f) further comprises the step of said MSC notifying said MSAs of successful settlement for reporting to said net debit counterparty CSAs.

20. A method for realtime multilateral foreign exchange settlement using a processor-based multilateral settlement coordinator (MSC) having a first money module and a first host application, and a plurality of processor-based counterparty settlement agents (CSAs) each having a second money module and a second host application, comprising the steps:

(a) said first host application receiving net counterparty debit and credit data from a netting system;

(b) said first host application sending said net counterparty debit data and settlement date and time data to said second host applications of net debit CSAs;

(c) establishing first cryptographically secure sessions between said first and second money modules of said net debit CSAs;

(d) said net debit CSAs transferring electronic money to said MSC, via said cryptographically secure session, in accordance with said net counterparty debit data;

(e) said first host application checking if all said net debit CSAs have paid;

(f) establishing second cryptographically secure sessions between said first and second money modules of net credit CSAs; and (g) said MSC transferring said electronic money to said net credit CSAs, via said second cryptographically secure sessions, in accordance with said net counterparty credit data.

21. A realtime multilateral foreign exchange settlement system, comprising;

a computer implemented netting system;

a processor-based multilateral settlement coordinator (MSC) having a first money module and a first host application, where said first host application receives debit and credit data from said netting system;

a plurality of processor-based multilateral settlement agents (MSAs) each having a second money module and a second host application; and a plurality of processor-based counterparty settlement agents (CSAs) each having a third money module and a third host application;

wherein said second and third money modules communicate via cryptographically secure sessions;

where said first money module receives electronic money from said third money modules of net debit CSAs via said second money modules;

where when all net debit counterparties have paid, said first money module sends said electronic money to said third money modules of net credit CSAs via said second money modules.

22. The system of claim 21, wherein said first host application checks whether all net counterparties have paid at a particular settlement date and time which had been reported to said third host applications of net debit CSAs.

23. A processor-based counterparty settlement agent, comprising:

a money module that stores, transfers, and receives electronic representations of money, where said money module establishes cryptographically secure sessions with other money modules; and a realtime host application that receives net debit data and accordingly instructs said money module to transfer electronic representations of money, and that receives net credit data and accordingly instructs said money module to receive electronic representations of money.

* * * * *